United States Patent
Awai

(10) Patent No.: US 7,987,327 B2
(45) Date of Patent: Jul. 26, 2011

(54) BACKUP SYSTEM AND ASSOCIATED METHODOLOGY FOR STORING BACKUP DATA BASED ON DATA QUALITY

(75) Inventor: Shoichi Awai, Kanagawa (JP)

(73) Assignee: Sony Corporation, Tokyo (JP)

( * ) Notice: Subject to any disclaimer, the term of this patent is extended or adjusted under 35 U.S.C. 154(b) by 624 days.

(21) Appl. No.: 12/056,478

(22) Filed: Mar. 27, 2008

(65) Prior Publication Data

US 2008/0256315 A1 Oct. 16, 2008

(30) Foreign Application Priority Data

Apr. 13, 2007 (JP) .................. 2007-106276

(51) Int. Cl.
*G06F 12/02* (2006.01)
(52) U.S. Cl. .................. 711/162; 711/161; 711/165
(58) Field of Classification Search .......... 711/161–162, 711/165
See application file for complete search history.

(56) References Cited

U.S. PATENT DOCUMENTS

| | | | |
|---|---|---|---|
| 2004/0030725 A1 | 2/2004 | Sakamoto | |
| 2006/0114763 A1 | 6/2006 | Nakamae et al. | |
| 2008/0310628 A1* | 12/2008 | Fujioka et al. | 380/201 |

FOREIGN PATENT DOCUMENTS

| | | |
|---|---|---|
| EP | 1 158 410 A1 | 11/2001 |
| JP | 2001-195509 | 7/2001 |
| JP | 2004-71062 | 3/2004 |
| JP | 2006-185575 | 7/2006 |

* cited by examiner

*Primary Examiner* — Jasmine Song
(74) *Attorney, Agent, or Firm* — Oblon, Spivak, McClelland, Maier & Neustadt, L.L.P.

(57) ABSTRACT

In a backup system, a backup request device includes: a storage section that stores a piece of content data; and a transmission section that regards the piece of content data as a piece of backup target data and transmits, along with a piece of device identification information, a piece of backup information including a piece of data quality information and a piece of content identification information, while a backup device includes: a storage section that stores a piece of backup data that is the same content as the piece of backup target data and whose data quality is higher than or equal to the piece of backup target data such that it is associated with the piece of content identification information; and a control section that stores the received piece of backup information in the storage section such that it is associated with the received piece of device identification information.

21 Claims, 23 Drawing Sheets

2A1 (2A2 TO 2AN)

3

|  | DATA QUALITY INFORMATION | DQ |
|---|---|---|
| DH1 → | DATA PROVIDER | CD |
| CT → | CODEC TYPE | PCM |
| SR → | SAMPLING RATE | 44.1 kHz |
| BR → | BIT RATE | FIXED-xkbps |
| BN → | RESOLUTION | 16 BIT |
| CH → | CHANNEL | 2 CH |
| PE → | PRE-EMPHASIS | OFF |

FIG. 6

| DATA QUALITY INFORMATION (DQ) | MUSIC IDENTIFICATION (MID) | BACKUP COMPLETION INFORMATION (BUE) |
|---|---|---|
| DATA QUALITY INFORMATION a1 | MUSIC IDENTIFICATION b1 | OK |
| DATA QUALITY INFORMATION a2 | MUSIC IDENTIFICATION b2 | OK |
| DATA QUALITY INFORMATION a3 | MUSIC IDENTIFICATION b3 | OK |
| ⋮ | ⋮ | ⋮ |
| DATA QUALITY INFORMATION an | MUSIC IDENTIFICATION bn | NO |

ATB1

FIG. 7

| SID | BUR |
|---|---|
| DEVICE IDENTIFICATION X | BACKUP INFORMATION X1 |
| | BACKUP INFORMATION X2 |
| | BACKUP INFORMATION X3 |
| | ⋮ |
| | BACKUP INFORMATION XN |
| ⋮ | ⋮ |
| DEVICE IDENTIFICATION Y | BACKUP INFORMATION Y1 |
| | BACKUP INFORMATION Y2 |
| | BACKUP INFORMATION Y3 |
| | ⋮ |
| | BACKUP INFORMATION YM |

BTB1

FIG.9

FIG.10A — PROCEDURE OF FIRST BACKUP REQUEST PROCESS BY BACKUP REQUEST DEVICE

FIG.10B — PROCEDURE OF FIRST BACKUP PROCESS BY BACKUP DEVICE

FIG.11A PROCEDURE OF FIRST BACKUP REQUEST PROCESS BY BACKUP REQUEST DEVICE

FIG.11B PROCEDURE OF FIRST BACKUP PROCESS BY BACKUP DEVICE

FIG.14A PROCEDURE OF FIRST BACKUP REQUEST PROCESS BY BACKUP REQUEST DEVICE

FIG.14B PROCEDURE OF SECOND BACKUP PROCESS BY BACKUP DEVICE

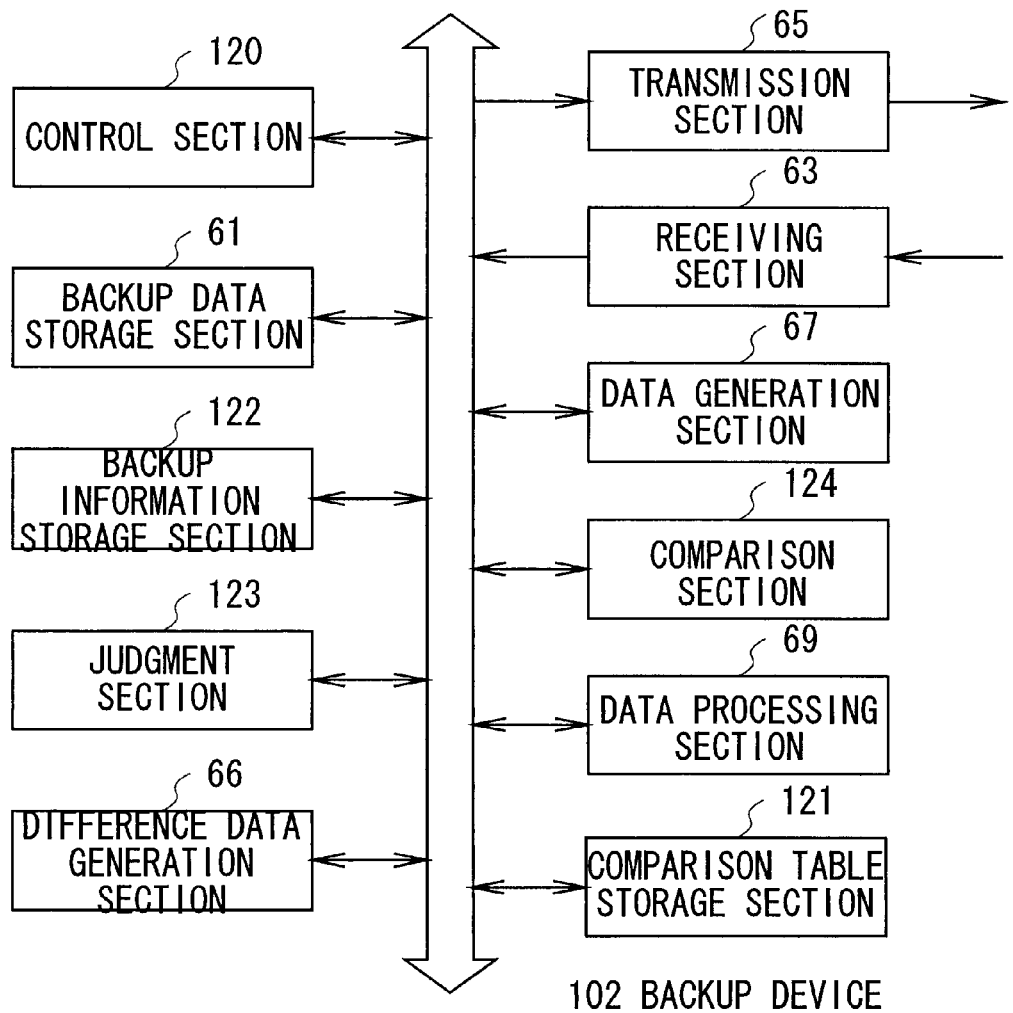

| MID | HS | DQ |
|---|---|---|
| MUSIC IDENTIFICATION M1 | HASH VALUE MH1 | DATA QUALITY INFORMATION MA1 |
| | HASH VALUE MH2 | DATA QUALITY INFORMATION MA2 |
| | HASH VALUE MH3 | DATA QUALITY INFORMATION MA3 |
| | ⋮ | ⋮ |
| | HASH VALUE MHR | DATA QUALITY INFORMATION MAR |
| ⋮ | ⋮ | ⋮ |
| MUSIC IDENTIFICATION MQ | HASH VALUE MQH1 | DATA QUALITY INFORMATION MQA1 |
| | HASH VALUE MQH2 | DATA QUALITY INFORMATION MQA2 |
| | HASH VALUE MQH3 | DATA QUALITY INFORMATION QMA3 |
| | ⋮ | ⋮ |
| | HASH VALUE MQHS | DATA QUALITY INFORMATION MQAS |

FIG.21A — PROCEDURE OF SECOND BACKUP REQUEST PROCESS BY BACKUP REQUEST DEVICE

FIG.21B — PROCEDURE OF THIRD BACKUP PROCESS BY BACKUP DEVICE

FIG.22A — PROCEDURE OF FIRST BACKUP REQUEST PROCESS BY BACKUP REQUEST DEVICE

FIG.22B — PROCEDURE OF SECOND BACKUP PROCESS BY BACKUP DEVICE

FIG.24A — PROCEDURE OF SECOND BACKUP REQUEST PROCESS BY BACKUP REQUEST DEVICE

FIG.24B — PROCEDURE OF FOURTH BACKUP PROCESS BY BACKUP DEVICE

201A1 (201A2 TO 201AN) BACKUP REQUEST DEVICE

202 BACKUP DEVICE

BACKUP SYSTEM AND ASSOCIATED METHODOLOGY FOR STORING BACKUP DATA BASED ON DATA QUALITY

CROSS REFERENCES TO RELATED APPLICATIONS

The present invention contains subject matter related to Japanese Patent Application JP2007-106276 filed in the Japanese Patent Office on Apr. 13, 2007, the entire contents of which being incorporated herein by reference.

BACKGROUND OF THE INVENTION

1. Field of the Invention

The present invention relates to a backup system, backup device, backup request device, backup method, backup request method, backup program and backup request program, and is preferably applied to a backup system that makes the backup of music data or content data, for example.

2. Description of the Related Art

Typically, a backup system is designed to save in a hard disk drive music data the personal computer read out from a Compact Disc or purchased from a server on a network. The backup system is also designed to upload to a server a list of music identifications related to all pieces of music data the personal computer has stored in the hard disk drive.

When the personal computer cannot play back music data due to failure of the hard disk or the like, the backup system delivers, following the list of music identifications, music data to the personal computer for example after the hard disk drive is fixed and the personal computer requests to be restored. In this manner, the backup system allows the personal computer to store music data in the fixed hard disk drive again and to play back them (see Jpn. Pat. Laid-open Publication No. 2001-195509 [Page 21], for example).

SUMMARY OF THE INVENTION

By the way, in the above backup system, a server offers a predetermined data format of music data for sale. And in the backup system, when the server receives a purchase request from the personal computer, the server delivers, without changing its data format, a piece of music data to the personal computer, which then saves that piece of music data.

However, in the above backup system, the personal compute can store music data read out from a CD in a different format or the same format as that of the purchased music data. Therefore in the backup system, there may be various data formats of music data stored in the personal computer. If there is a plurality of personal computers that uses the server, each may have the same piece of music data in a different format.

The size and quality of music data vary according to data format even if their original data are the same. That means, in the backup system, those personal computers may have the same piece of music data in a different quality of data format.

In the backup system, the server has many pieces of music data, which are prepared for a restoring request from the personal computer. In order to respond to the restoring requests from those personal computers, each of which had pieces of music data in different-quality formats, the server should have each piece of music data in different-quality formats. Accordingly, it is hardly said that the way the backup system stores pieces of music data in different-quality formats is efficient.

The present invention has been made in view of the above points and is intended to provide a backup system, backup device, backup request device, backup method, backup request method, backup program and backup request program that can efficiently back up each piece of content data in different-quality formats.

In one aspect of the present invention, a backup system in which a plurality of backup request devices is connected to a backup device, wherein: the backup request device includes: a content data storage section that stores a piece of content data; and a transmission section that regards the piece of content data as a piece of backup target data and transmits to the backup device, along with a piece of device identification information, a piece of backup information that includes a piece of data quality information indicating the data quality of the piece of backup target data and a piece of content identification information, and the backup device includes: a storage section that stores a piece of backup data that is the same content as the piece of backup target data and whose data quality is higher than or equal to the piece of backup target data such that the piece of backup data is associated with the piece of content identification information; a receiving section that receives from the backup request device the piece of backup information and the piece of device identification information; and a control section that stores, when the receiving section receives the piece of backup information and the piece of device identification information, the piece of backup information in the storage section such that the piece of backup information is associated with the piece of device identification information.

In that manner, since the backup device keeps a piece of backup data that is the same content as the piece of backup target data and whose data quality is higher than or equal to the piece of backup target data, the backup device can efficiently back up the piece of backup target data by just storing the corresponding piece of backup information, which is much smaller, in size, than the piece of backup data.

According to one aspect of the present invention, a backup system in which a plurality of backup request devices is connected to a backup device, wherein: the backup request device includes: a content data storage section that stores a piece of content data; and a transmission section that regards the piece of content data as a piece of backup target data and transmits to the backup device, along with a piece of device identification information, a piece of backup information that includes a piece of data quality information indicating the data quality of the piece of backup target data and a piece of content identification information, and the backup device includes: a storage section that stores a piece of backup data that is the same content as the piece of backup target data and whose data quality is higher than or equal to the piece of backup target data such that the piece of backup data is associated with the piece of content identification information; a receiving section that receives from the backup request device the piece of backup information and the piece of device identification information; and a control section that stores, when the receiving section receives the piece of backup information and the piece of device identification information, the piece of backup information in the storage section such that the piece of backup information is associated with the piece of device identification information. In this manner, since the backup device keeps a piece of backup data that is the same content as the piece of backup target data and whose data quality is higher than or equal to the piece of backup target data, the backup device can efficiently back up the piece of backup target data by just storing the corresponding piece of backup information, which is much smaller, in size, than the piece of backup data. This can realize a backup system, backup device, backup request device, backup method, backup request method, backup program and backup request program that can efficiently back up each piece of content data in different-quality formats.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 6 is a schematic diagram illustrating the configuration of data quality information;

FIG. 7 is a schematic diagram illustrating the configuration of an attribute information table;

FIG. 9 is a schematic diagram illustrating the configuration of a backup information table;

FIG. 17 is a schematic diagram illustrating the configuration of an attribute information table;

FIG. 18 is a block diagram illustrating the hardware circuit configuration of a backup device by using functional circuit blocks;

FIG. 19 is a schematic diagram illustrating the configuration of a correlation table;

DETAILED DESCRIPTION OF PREFERRED EMBODIMENTS

An embodiment of the present invention will be described in detail with reference to the accompanying drawings.

(1) Overview of a Backup System

Figure 1:
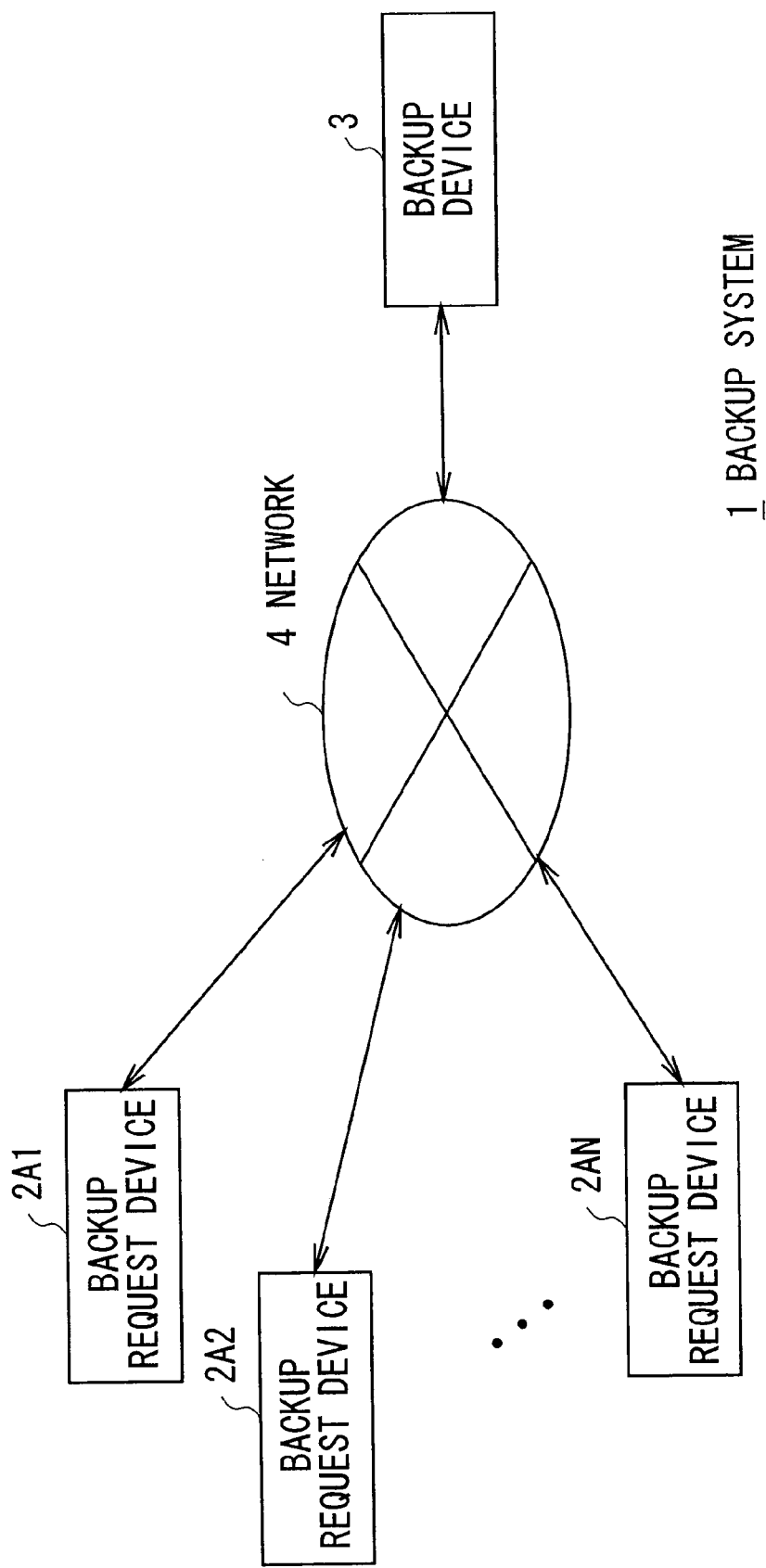
FIG. 1 is a block diagram illustrating the concept of a backup system.

In FIG. 1, the reference numeral 1 denotes, as a whole, a backup system according to an embodiment of the present invention. In the backup system 1, a plurality of backup request devices 2A1 to 2AN is connected to a backup device 3 via a network 4.

Figure 2:
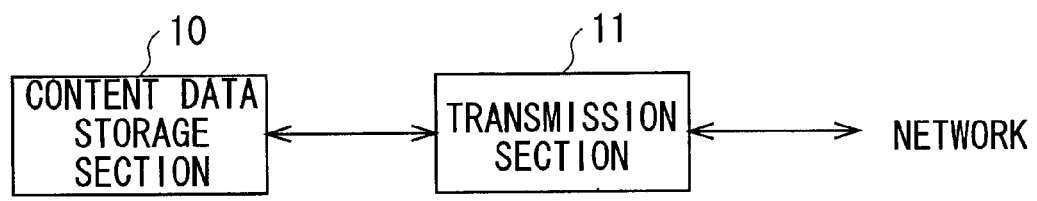
FIG. 2 is a block diagram illustrating the concept of a backup request device.

Since the backup request devices 2A1 to 2AN have the same structure in this case, one of them, the backup request device 2A1, will be described with reference to FIG. 2, which illustrates its circuit configuration. Since the other backup request devices 2A2 to 2AN have the same circuit configuration, they will not be described.

A content data storage section 10 of the backup request device 2A1 is designed to store one or more pieces of content data. A transmission section 11 of the backup request device 2A1 transmits, when a backup is requested, a piece or pieces of content data stored in the content data storage section 10, data quality information indicating the quality of content data, a content identification and a device identification to the backup device 3 via the network 4: The piece or pieces of content data transmitted are regarded as backup target files (or backup target data) while the transmitted data quality information and content identifications are collectively regarded as backup information.

Figure 3:
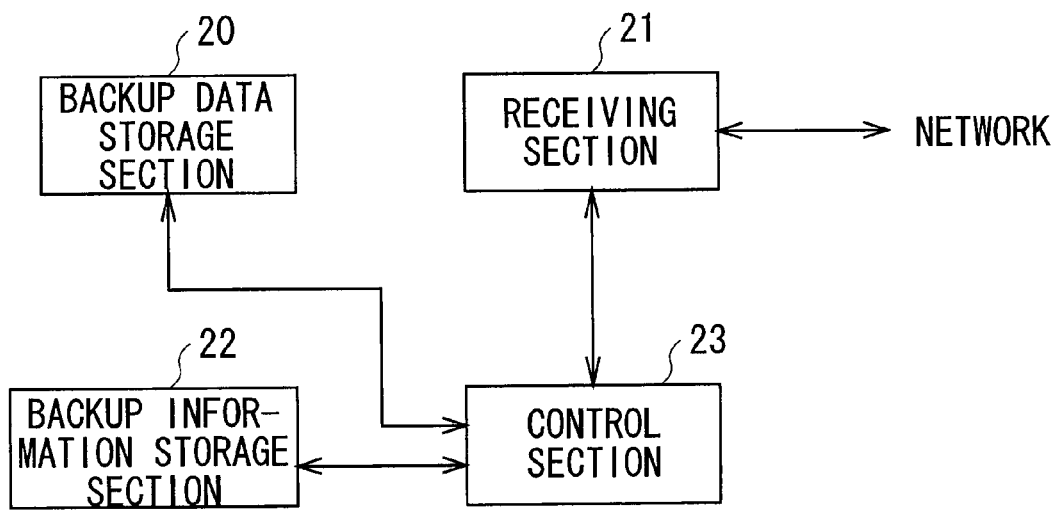
FIG. 3 is a block diagram illustrating the concept of a backup device.

On the other hand, as shown in FIG. 3, out of a group of many pieces of content data that includes each piece of content data in different-quality formats, a backup data storage section 20 of the backup device 3 saves a piece of content data whose quality is equal to or greater than the corresponding piece of backup target data, along with its content identification. A receiving section 21 of the backup device 3 receives the backup information and the device identification from the backup request devices 2A1 to 2AN via the network 4. A backup information storage section 22 of the backup device 3 is designed to store the backup information along with the device identification. When the receiving section 21 receives the backup information and the device identification, a control section 23 of the backup device 3 saves the backup information in the backup information storage section 22 along with the device identification.

With the above configuration, the backup device 3 of the backup system 1 can produce a piece of backup target data, whose quality is equal to what the data quality information indicates, from a corresponding piece of backup data whose quality is equal to or greater than that of the backup target data. Accordingly, what the backup device 3 should store for each piece of content data is a piece of backup data and the backup information acquired from the backup request device 2A1 to 2AN, the size of the backup information way smaller than the piece of backup data. Still it can offer the same level of service as if storing each piece of content data in different-quality formats to be offered as backup target data. In this manner, the backup system 1 can efficiently backup each piece of content data in different-quality formats to be offered as backup target data.

(2) First Embodiment (2-1) Configuration of Backup System of First Embodiment

Figure 4:
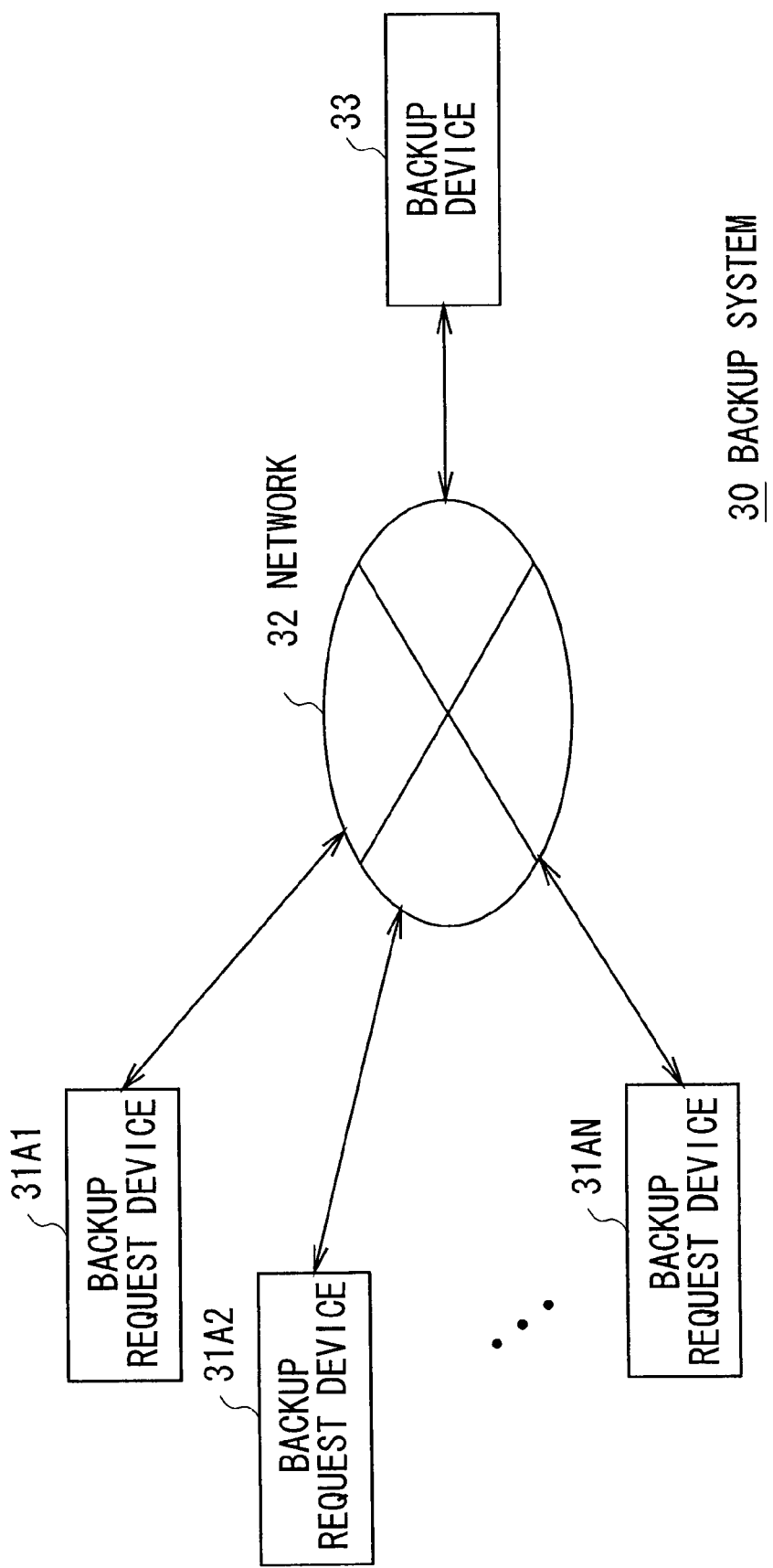
FIG. 4 is a block diagram illustrating the configuration of a backup system according to a first embodiment of the present invention.

In FIG. 4, the reference numeral 30 denotes a backup system according to a first embodiment of the present invention. In the backup system 30, a plurality of backup request devices 31A to 31AN, each of which is used by a different user, is connected to a backup device 33 via a network 32.

Figure 5:
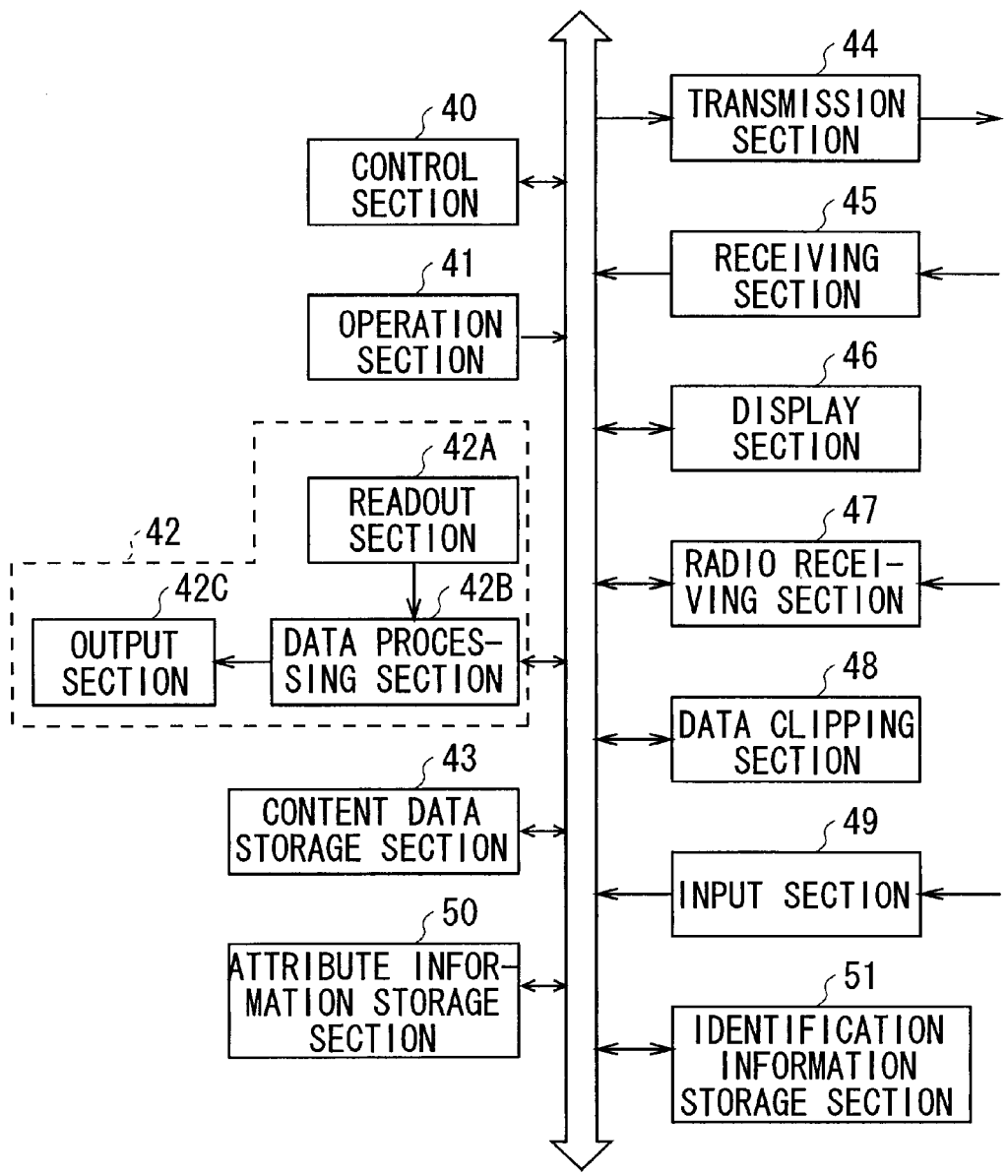
FIG. 5 is a block diagram illustrating the hardware circuit configuration of a backup request device by using functional circuit blocks.

Since the backup request devices 31A1 to 31AN have the same structure in this case, one of them, the backup request device 31A1, will be described with reference to FIG. 5, which uses functional circuit blocks to illustrate its hardware circuit configuration. Since the other backup request devices 31A2 to 31AN have the same hardware circuit configuration, they will not be described.

When a user operates an operation section 41, which includes various operation keys and the like, and inputs various commands, a control section 40 of the backup request device 31A1 takes overall control of the device in accordance with the input commands to perform various processes. When a user inputs a CD playback command through the operation section 41 after a CD (not shown) is inserted into the backup request device 31A1, the control section 40 controls a playback section 42 to perform a playback process.

A readout section 42A of the playback section 42 reads out from the CD a piece of music data in Pulse Code Modulation (PCM) format and transmits it to a data processing section 42B. The data processing section 42B performs a playback process, such as digital-to-analog conversion or amplification, to the piece of music data and outputs resulting music signals from an output section 42C as sound. In this manner, the control section 40 can play a CD and a user can listen to music.

When a user inputs a CD recording command through the operation section 41 after a CD is inserted into the backup request device 31A1, the control section 40 performs a recording process in cooperation with the playback section 42. The readout section 42A of the playback section 42 reads out a piece of music data from the CD and transmits it to the data processing section 42B. In accordance with the setting of the device or the setting set by a user, the data processing section 42B does not convert the piece of music data whose format is the same as the one stored in the CD or PCM format, or performs an encoding process (or a compression coding process) to convert it into a different format, such as an irreversible compression cording format like Adaptive Transform Acoustic Coding 3 (ATRAC3), Advanced Audio Coding (AAC), Windows (Registered Trademark) Media Audio (WMA) and MPEG Audio Layer-3 (MP3), before transmitting it to the control section 40.

The control section 40 subsequently transmits the piece of music data supplied from the data processing section 42B of the playback section 42 to a content data storage section 43 which then stores the piece of music data. In this manner, the control section 40 record one or more pieces of music data from a CD.

By the way, a CD has on its data recording surface a music data recording area and a control data recording area. The CD's music data recording area records a plurality of pieces of music data in PCM format while the control data recording area records control data, which are used for controlling pieces of music data recorded on the music data recording area: The control data include playback time for each piece of music data, playback order, and Table Of Contents (TOC) indicating playback start locations of the music data recording area or the like.

When reading out music data from the CD's music data recording area, the readout section 42A of the playback section 42 also reads out control data from the CD's control data recording area and transmits the control data to the control section 40 via the data processing section 42B. After receiving the control data from the playback section 42, the control section 40 generates control information, which is unique to the CD, from the control data. A transmission section 44 subsequently transmits the control information to a disc information provision device (not shown) via the network 32.

In response, the disc information provision device transmits music related information, which is related to the pieces of music recorded on the CD, and the like via the network 32 and the control section 40 receives them as disc information through a receiving section 45. The control section 40 subsequently transmits the disc information to the content data storage section 43. In this manner, the control section 40 stores the music related information, which was acquired as disc information, in the content data storage section 43 such that it is linked to the pieces of music data recorded from the CD.

The music related information actually includes various kinds of information, such as a music identification, which is unique to each piece of music data; a music title of each piece of music data; an artist name; a genre name represents the genre of those pieces of music data; and an album title of an album that contains those pieces of music data. Each music identification is unique to each piece of music and is associated with each piece of music data whatever the data format is. Accordingly, each piece of music data can be identified.

When a user inputs through the operation section 41 an acquisition command for the acquisition of a music introduction screen, the control section 40 controls the transmission section 44 to transmit via the network 32 to a music data delivery device (not shown) a piece of introduction screen request information that requests a piece of music introduction screen data of a music introduction screen. In response, the music data delivery device transmits the piece of music introduction screen data via the network 32. The control section 40 receives it through the receiving section 45 and transmits it to a display section 46, which then displays a music introduction screen based on the piece of music introduction screen data.

When a user operates the operation section 41 to select his/her desired piece of music data on the music introduction screen, the control section 40 controls the transmission section 44 to transmit via the network 32 to the music data delivery device a piece of purchase screen request information that requests a piece of music purchase screen data, which allow the user to buy the selected piece of music data. In response, the music data delivery device transmits the piece of music purchase screen data via the network 32. The control section 40 receives it through the receiving section 45 and transmits it to the display section 46, which then displays a music purchase screen based on the piece of music purchase screen data.

When a user operates the operation section 41 to input various kinds of information into the music purchase screen to buy his/her desired piece of music data, the control section 40 produces a piece of music purchase request information from the input information to buy that piece of music data. The control section 40 controls the transmission section 44 to transmit the piece of music purchase request information to the music data delivery device via the network 32.

In response, the music data delivery device performs a fee-charging process for the requested piece of music data and then transmits that piece of music data in a predetermined data format along with the corresponding piece of music related information via the network 32: The data format was previously determined by people on the delivery side. The control section 40 receives them through the receiving section 45 and transmits them to the content data storage section 43. In this manner, the control section 40 stores the piece of music data and the piece of music related information in the content data storage section 43 such that they are linked to one another. In that manner, the control section 40 buys a piece of music data from the music data delivery device and stores it in the content data storage section 43.

When a user operates the operation section 41 to input a listening command to listen to a radio program, the control section 40 controls a radio receiving section 47 to tune in a target frequency of radio wave coming from a radio station selected by the user operating the operation section 41, out of frequencies of radio wave coming from a plurality of radio stations. In this manner, the radio receiving section 47 tunes in, out of the frequencies of radio wave it receives from a plurality of radio stations, a target frequency of radio wave coming from a radio station selected by the user, and performs a predetermined receiving process such as demodulation. The radio receiving section 42 transmits resulting radio program signals to the data processing section 42B of the playback section 42.

The data processing section 42B performs a digital process, such as analog-to-digital conversion and equalizing, to the radio program signals supplied from the radio receiving section 47. The data processing section 42B subsequently performs an analog process, such as digital-to-analog conversion and amplification, to resultant radio program data. This produces radio program signals, and the data processing section 42B transmits the radio program signals to the output section 42C, which then outputs sound of the radio program. In this manner, the control section 40 can offer a user a radio program broadcast from his/her desired radio station.

By the way, when a user who is listening to a radio program operates the operation section 41 to input a radio recording command, the control section 40 performs a recording process in cooperation with the playback section 42 and a data clipping section 48. The data processing section 42B of the playback section 42 transmits, after performing a digital process and an analog process, the radio program signals supplied from the radio receiving section 47 to the output section 42C while supplying the radio program data, which was acquired as a result of the digital process, to the data clipping section 48.

The data clipping section 48 for example divides the radio program data supplied from the playback section 42 into predetermined processing units (each of which is the equivalent of one-second radio program data, for example) and performs spectral analysis on them. Based on the result of analysis, the data clipping section 48 quantifies the degree to which each processing unit is likely to represent music aired in a radio program, as music-likely values.

Moreover, the data clipping section 48 compares a music-likely value of each processing unit with a predetermined threshold and detects a series of processing units whose music-likely values are equal to or greater than the threshold. Subsequently, the data clipping section 48 clips the series of processing units from the radio program data as a piece of music data and transmits the piece of music data to the data processing section 42B of the playback section 42.

After receiving the piece of music data from the data clipping section 48, the data processing section 42B of the playback section 42 performs an analog-to-digital conversion process to it and analyzes the waveform of resultant music signals. Based on the result of analysis, the data processing section 42 produces a piece of music fingerprint information that identifies the piece of music data. The data processing section 42B performs, in accordance with the setting of the device or the setting set by a user, an encoding process to transform the piece of music data into a different data format. The data processing section 42B transmits to the control section 40 the piece of music data whose data format has been transformed, along with the piece of music fingerprint information.

After receiving the piece of music data (or the one clipped from the radio program data) and the piece of music fingerprint information from the data processing section 42B of the playback section 42, the control section 40 controls the transmission section 44 to transmit via the network 32 to a music information retrieval device (not shown) a piece of retrieval request information that includes the piece of music fingerprint information to request the retrieval of music related information. The music information retrieval device has a database that associates many pieces of music fingerprint information, each of which is unique to a different piece of music data, with pieces of music related information, each of which is a piece of information related to a corresponding piece of music data.

After receiving the piece of retrieval request information from the backup request device 31A1, the music information retrieval device compares the piece of music fingerprint information inside the piece of retrieval request information (also referred to as a piece of "device-presenting music fingerprint information") with the pieces of music fingerprint information the music information retrieval device has kept (also referred to as pieces of "comparison-purpose music fingerprint information"). The music information retrieval device finds out a piece of comparison-purpose music fingerprint information that is the same as that piece of device-presenting music fingerprint information and then retrieves a piece of music related information associated with that piece of comparison-purpose music fingerprint information. The music information retrieval device subsequently transmits the retrieved piece of music related information to the backup request device 31A1 via the network 32. In this manner, the music information retrieval device can provide the backup request device 31A1 with the retrieval service of music related information, like those provided by the U.S.-based Gracenote and Moodlogic, Inc.

The control section 40 controls the receiving section 45 to receive the piece of music related information from the music information retrieval device via the network 32. The control section 40 subsequently transmits to the content data storage section 43 the piece of music related information along with the piece of music data (or the one clipped from the radio program data). The content data storage section 43 stores the piece of music data and the piece of music related information such that they are associated with one another. In that manner, the control section 40 allows a user to listen to a radio program while recording a piece of music aired in the radio program.

Furthermore, when receiving, through an input section 49, a piece of music data in a predetermined data format from an electronic device connected to the backup request device 31A1 along with a piece of music related information, the control section 40 transmits them to the content data storage section 43. The content data storage section 43 stores the piece of music data and the piece of music related information such that they are associated with one another.

Furthermore, when receiving analog music signals from an electronic device, the control section 40 transmits them to the data processing section 42B of the playback section 42. The data processing section 42B of the playback section 42 analyzes the waveform of the analog music signals and then produces a piece of music fingerprint information in the same way as described above.

Meanwhile, the data processing section 42B performs an analog-to-digital conversion process to the music signals and, in accordance with the setting of the device or the setting set by a user, performs an encoding process to a resulting piece of music data to transform it into a different data format. The data processing section 42B subsequently transmits the transformed piece of music data and the piece of music fingerprint information to the control section 40.

After receiving the piece of music data and the piece of music fingerprint information from the data processing section 42B of the playback section 42, the control section 40 controls the transmission section 44 to transmit via the network 32 to the music information retrieval device the piece of retrieval request information that includes the piece of music fingerprint information to request the retrieval of music related information. When the music information retrieval device transmits a piece of music related information via the network 32, the control section 40 controls the receiving section 45 to receive it. The control section 40 subsequently transmits the piece of music related information to the content data storage section 43 along with the piece of music data.

The content data storage section 43 stores the piece of music data and the piece of music related information such that they are associated with one another. In that manner, the control section 40 can store music signals acquired form an external electronics device in the content data storage section 43 as a piece of digital music data along with a piece of music related information.

When a user operates the operation section 41 to input an acquired music playback command, the control section 40 in response reads out all pieces of music related information from the content data storage section 43. Based on the pieces of music related information, the control section 40 produces a piece of playback music specification screen data, which is used for displaying a playback music specification screen in which a user can specify a piece of music with its music title, album title, genre name or the like. The control section 40 supplies the piece of playback music specification screen data to the display section 46, which then displays a playback music specification screen based on the piece of playback music specification screen data.

When a user operates the operation section 41 to specify a piece of music data by its music title or the like on the playback music specification screen, the control section 40 in response reads out the specified piece of music data from the content data storage section 43 and transmits it to the data processing section 42B of the playback section 42. The data processing section 42 performs a playback process, such as decoding, digital-to-analog conversion and amplification, to the piece of music data supplied from the control section 40 and outputs resultant music signals to the output section 42C, which then outputs the sound of music. In that manner, the control section 40 can provide a user with various kinds of music acquired from CDs or purchased through the music delivery service.

By the way, there various music data formats, such as the digital-format one generated from analog music signals that were generated as a result of recording a live performance or the like, and the compressed-and-coded one generated from digital music data that were generated from analog music signals. Actually, the data formats indicate the following as codec types: a conversion method, which is used to transform analog music signals into digital formats: and an irreversible compression coding method, which is used to transform those digital formats into compressed-and-coded formats. In addition, the data formats also indicate sampling rates of music data, bit rates and the like. There are various combinations of codec types, sampling rates, bit rates and the like.

In this case, there are pieces of music data in different formats generated from the same piece of music. If analog music signals, which were for example acquired by recording a piece of music, are converted into a digital format such that a resultant piece of digital music data represents the original piece of music as precisely as possible, it becomes large in data size with the quality of sound maintained at high levels. It means that the bigger one has a better sound quality, representing the sound of a live performance or the like more precisely.

By contrast, if analog music signals are converted into a piece of digital music data and this piece of digital music data are converted again into a compressed-and-coded format, the resultant piece of music data becomes small in data size but the quality of sound is not good, especially compared to the original sound quality; and, since it is an irreversible format, the piece of compressed-and-coded music data cannot be restored to the original quality. It means that a piece of music data in a compressed-and-coded format is small in size but the quality of sound is at low levels, not representing the sound of a live performance or the like well.

In this manner, the data format of music data is considered to represent not only the structure of music data (such as codec types, sampling rates, bit rates and the like) but also the quality of music data.

A piece of music data whose data quality is high is large in data size. Therefore, a piece of music data whose data quality is low can be generated from the piece of high-quality music data by reducing its data size. But a piece of high-quality music data cannot be produced from a piece of low-quality music data because the piece of low-quality music data does not have enough information to restore.

In addition, a piece of music data acquired from a radio program may be affected by not only data formats but also noises of radio waves, voice of a disc jockey and other factors. As a result, the acquired piece of music data may be completely different from the original one with the low quality sound. Accordingly, information indicating a provider of music data, such as the one indicating a radio station, can be considered to represent the quality of data (This kind of information is also referred to as "data provider information").

A piece of music data recorded on a CD has a header and footer on its top and bottom ends, respectively. The header and footer include format information indicating its data format (PCM format, in this case). A piece of music data acquired from the music data delivery device and an external electronic device too has a header and footer that include format information indicating its data format. When acquiring a piece of music data from a CD or clipping a piece of music data from a radio program, the data processing section 42B of the playback section 42 converts it into a different format and adds the piece of format information indicating the format to its header and footer.

When a piece of music data is supplied from the data processing section 42C of the playback section 42 to be stored in the content data storage section 43, the control section 40 copies the piece of format information from the header and footer of the piece of music data. In addition, the control section 40 acquires a piece of music related information corresponding to the piece of music data in the same way as described above, and copies its music identification from the piece of music related information.

When acquiring a piece of music data and a corresponding piece of music related information from the music data delivery device or an external electronic device, the control section 40 copies the piece of format information from the header or hooter of the piece of music data and its music identification from the piece of music related information. In addition, when acquiring a piece of music data from the data processing section 42B of the playback section 42 or from the outside, the control section 40 determines a provider of the piece of music data in accordance with the operational state of the backup request device 31A1 at that time.

And as shown in FIG. 6, the control section 40 puts together a piece of data provider information DH1, which indicates a provider of music data, and the piece of format information DF to generate a piece of data quality information DQ indicating the quality of music data. The piece of data provider information DH1 specifically indicates a CD, a radio station, a music data delivery device, a digital input, an analog input or the like.

The piece of format information DF1, indicating a data format of music data, includes: a codec type CT, such as PCM, ATRACC3, AAC, WMA and MP3; a sampling rate SR, such as 44.1 KHz, 44 KHz and 96 KHz; a bit rate BR, such as Fixed-X Kbps and Variable; a resolution BN, such as 16-bit and 24-bit; a channel CH, such as 1-channel, 2-channel or Joint; and a pre-emphasis PE, which is aimed at reducing noise.

After producing the piece of data quality information DQ, the control section 40 transmits it to an attribute information storage section 50 along with the corresponding music identification. As a result, the control section 40 stores them in the attribute information storage section 50, as shown in FIG. 7, such that each piece of data quality information DQ for each piece of music data is associated with a corresponding music identification MID and also with a piece of backup completion information BUE indicating whether a backup copy of a corresponding piece of music data has been made.

In this manner, the control section 40 produces a data table (also called an attribute information table) ATB1 in the attribute information storage section 50 such that each piece of data quality information DQ for each piece of music data is associated with a music identification MID and a piece of backup completion information BUE, in order to present attribute information of each piece of music data. By the way, before the backup device 33 completes the backup of a piece of music data stored in the content data storage section 43, a corresponding piece of backup completion information BUE stored in the attribute information storage section 50 indicates, under the control of the control section 40, the fact that its backup copy has not been made yet.

After the backup device 33 completes the backup of a piece of music data stored in the content data storage section 43, a corresponding piece of backup completion information BUE stored in the attribute information storage section 50 indicates, under the control of the control section 40, the fact that its backup copy has been made. In this manner, the control section 40 performs backup management of one or more pieces of music data stored in the content storage section 43 by using the attribute information table ATB1, which indicates whether a backup copy of each piece of music data has been made.

When a user operates the operation section 41 to input a switch-off command to turn off the backup request device 31A1, the control section 40 turns off most of the circuits in the device. It looks to a user as if it has been turned off completely. Meanwhile the control section 40 performs a backup request process. In this case, the control section 40 checks the attribute information table ATB1 (or more specifically pieces of backup completion information BUE) in the attribute information storage section 50 to find out a piece of music data whose backup has been not made yet, out of all pieces of music data stored in the content data storage section 43.

If there is a piece of music data in the content data storage section 43 whose backup file has not been made yet, the control section 40 regards that piece of music data as a backup target file and reads out from the attribute information storage section 50 a corresponding piece of data quality information DQ and a corresponding music identification MID, which are associated with a piece of backup completion information BUE indicating the fact that the backup file has not been made yet. By the way, the control section 40 has stored in an identification information storage section 51 a device identification that is unique to itself, or the backup request device 31A1.

The control section 40 also reads out the device identification from the identification information storage section 51. The control section 40 then puts together the piece of data quality information DQ and the music identification MID to produce a piece of backup information, which is used for making a backup copy of the backup target file or the piece of music data identified by the music identification MID. The control section 40 subsequently controls the transmission section 44 to transmit via the network 32 to the backup device 33 a piece of backup information and the device identification SID along with a piece of backup request information that requests a backup process.

When receiving from the backup request device 31A1 a piece of backup information and the device identification along with a piece of backup request information, the backup device 33 performs a backup process for backup target files (except those provided from a radio station, as described later) by using the piece of backup information and the device identification. After completing the backup of the backup target files, the backup device 33 produces a piece of backup completion notification information that includes the music identifications MID of the backup-completed pieces of music data to indicate the fact that backup copies of those backup target files have been made, and then transmits the backup completion notification information via the network 32.

The control section 40 controls the receiving section 45 to receive the piece of backup completion notification information via the network 32 from the backup device 33. Based on the piece of backup completion notification information, the control section 40 accesses the attribute information table ATB1 stored in the attribute information storage section 50 and changes the corresponding pieces of backup completion information BUE (or those corresponding to the music identifications MID indicated by the piece of backup completion notification information) such that each indicates a backup copy of a corresponding piece of music data has been made.

If a backup target file is a piece of music data provided from a radio station, the backup device 33 performs a backup process by using a corresponding piece of data quality information DQ, a corresponding music identification MID and the backup target file or the piece of music data (described later). Accordingly, if a backup target file is a piece of music data provided from a radio station, the backup device 33 produces a piece of acquisition request information that includes a corresponding music identification MID (or part of the backup information corresponding to the backup target file) to request the acquisition of the backup target file and transmits it via the network 32.

The control section 40 controls the receiving section 45 to receive the piece of acquisition request information via the network 32 from the backup device 33. And the control section 40 reads out from the content data storage section 43 a piece of music data whose music identification MID is the same as the one included in the piece of acquisition request information (i.e. a piece of music data provided from a radio station). The control section 40 then controls the transmission section 44 to transmit the piece of music data, along with the corresponding music identification MID, to the backup device 33 via the network 32 as a backup target file.

After the backup device 33 completes the backup of the backup target file (or the piece of music data provided from a radio station) and transmits a piece of backup completion notification information via the network 32, the control section 40 receives the piece of backup completion notification information through the receiving section 45. Based on the piece of backup completion notification information, the control section 40 accesses the attribute information table ATB1 stored in the attribute information storage section 50 and changes a corresponding piece of backup completion information BUE (or the one corresponding to the piece of music data provided from a radio station) such that it indicates a backup copy of a corresponding piece of music data has been made.

After completing the backup of those backup target files, the control section 40 ends the backup request process and then turns off itself to switch off the backup request device 31A1.

By the way, if there is no piece of music data whose backup file has not been made at the time when the control section 40 starts a backup request process, the control section 40 immediately ends the backup request process and then turns off itself to switch off the backup request device 31A1.

In this manner, if a new piece of music data is recorded on the content data storage section 43 before the backup request device 31A1 is turned off, a backup file of that piece of music data (as a backup target file) is going to be made by the backup device 33 when a switch-off command is input.

By the way, if the content data storage section 43 of the backup request device 31A1 breaks down, the pieces of music data stored in the content data storage section 43 may be damaged or lost and they probably cannot be played back again. If the content data storage section 43 breaks down, it may be fixed or replaced with a new one, depending on its condition.

After the content data storage section 43 is fixed or replaced with a new one, a user for example operates the operation section 41 to input a restore command to regain the pieces of music data lost. In response, the control section 40 reads out the device identification from the identification information storage section 51. The control section 40 then controls the transmission section 44 to transmit the device identification to the backup device 33 via the network 32 along with a piece of restore request information that requests the restoring of backup target files.

In response, the backup device 33 transmits via the network 32 a piece of data total number notification information indicating a total number of backup target files that are going to be restored. The control section 40 receives the piece of data total number notification information through the receiving section 45. Subsequently, the backup device 33 transmits via the network 32 the backup target files (or the pieces of music data) and the corresponding pieces of music related information via the network 32. The control section 40 receives them through the receiving section 45. The control section 40 then stores the backup target files (or the pieces of music data) along with the corresponding pieces of music related information in the fixed or new content data storage section 43.

In this manner, the control section 40 can restore a piece of music data and a corresponding piece of music related information in the content data storage section 43 such that they are associated with one another. In this manner, the control section 40 receives backup target files (or pieces of music data) and the corresponding pieces of music related information until the number of targets received becomes equal to the total number notified by the backup device 33, and stores them in the content data storage section 43. In this manner, the control section 40 restores the pieces of music data that the content data storage section 43 had once lost in a way that they can be played back again.

Figure 8:
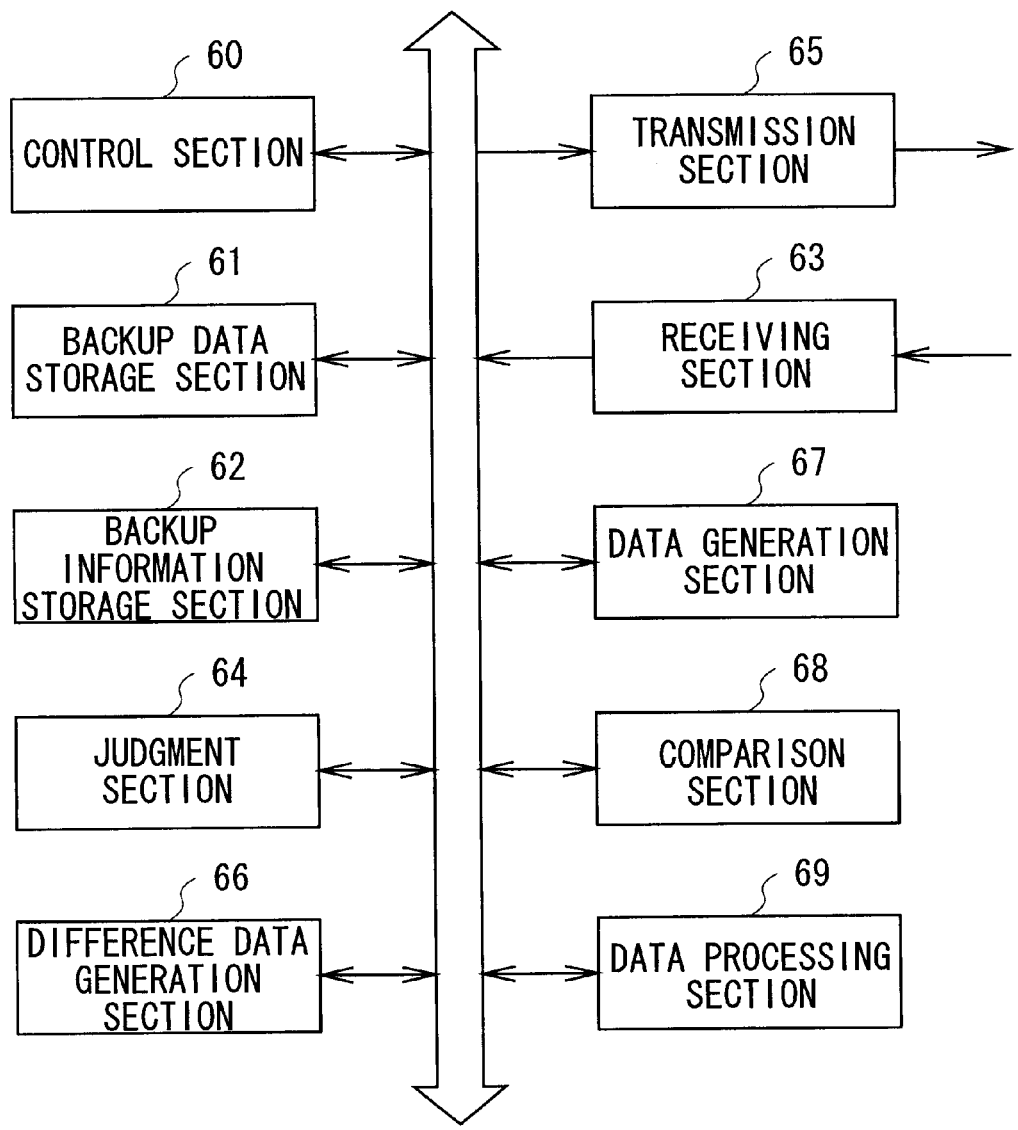
FIG. 8 is a block diagram illustrating the hardware circuit configuration of a backup device by using functional circuit blocks.

With reference to FIG. 8, the hardware circuit configuration of the backup device 33 will be described by using functional circuit blocks. A control section 60 of the backup device 33 takes overall control of the device and performs various processes. The control section 60 stores in a backup data storage section 61 each piece of music data in the highest-quality format as backup data: In one example of the highest-quality format, the codec type CT is set at PCM, with the sampling rate SR 44.1 [KHz], the resolution BN 16-bit, and the cannel CH 2-channel.

Under the control of the control section 60, each piece of backup data (or each piece of music data) stored in the backup data storage section 61 is associated with a corresponding music identification MID, a piece of data qualification information indicating the data quality of a corresponding piece of backup data, and a corresponding piece of music related information.

By the way, an operator of the backup device 33 has previously registered users who use the backup device 33 to make a backup file of backup target files. The control section 60 has stored for example in a backup information storage section 62 the device identifications of the backup request devices 31A1 to 31AN that the registered users use.

When the backup request device 31A1 to 31AN transmits the device identification and a piece of backup information via the network 32 along with a piece of backup request information, the control section 60 receives them through the receiving section 63 and transmits the piece of backup information and the device identification to the backup information storage section 62. The control section 60 retrieves from the backup information storage section 62 a device identification that is identical to the one received.

The control section 60 then stores in the backup information storage section 62 the piece of backup information such that it is associated with the retrieved device identification. In this manner, as shown in FIG. 9, the control section 60 produces in the backup information storage section 62 a data table (also referred to as a backup information table) BTB1 that associates the device identification of each backup request device 31A1 to 31AN and the corresponding piece of backup information BUR. In this manner, the pieces of backup information BUR are registered in the backup information table BTB1 for the backup of the backup target files.

When receiving a piece of backup information BUR and a device identification SID along with a piece of backup request information, the control section 60 also transmits the piece of backup information BUR and the device identification SID to a judgment section 64. The judgment section 64 judges whether a backup target file whose backup is requested was provided from a radio station, based on the piece of data quality information DQ included in the piece of backup information BUR supplied from the control section 60. If the judgment section 64 recognizes that the backup target file does not come from a radio station, then it transmits the result of judgment to the control section 60 along with the piece of backup information BUR and the device identification SID.

If the data quality of the backup target file is the same as the corresponding piece of backup data (or the one generated from the same original piece of music and associated with the same music identification MID), it means that the backup target file is identical to the corresponding piece of backup data. Accordingly, if the quality of the backup target file is the same as the corresponding piece of backup data (or the one generated from the same original piece of music), it means that the backup data storage section 61 has just stored the backup target file as a piece of backup data.

If the data quality of the backup target file is lower than the corresponding piece of backup data, the backup target file can be restored from the corresponding piece of backup data in accordance with a piece of data quality information DQ (or format information DF1) corresponding to the backup target file. In this manner, the control section 60 secures different formats of data for each piece of music by just storing a piece of backup data and a corresponding piece of backup information BUR in the backup data storage section 61 and the backup information storage section 62, respectively.

Therefore, if the judgment section 64 determines that the backup target file is not the one provided from a radio station, the control section 60 just stores the piece of backup information BUR in the backup information storage section 62 for the backup of the backup target file. And the control section 60 generates a piece of backup completion notification information that includes a part of the backup information BUR (more specifically the music identification MID) supplied from the judgment section 64 to inform that the backup of the backup target file corresponding to the music identification MID has been completed.

By the way, the control section 60 previously memorizes pieces of address information that indicates network addresses of the backup request devices 31A1 to 31AN such that each is associated with a corresponding device identification SID. Accordingly, based on a piece of address information corresponding to the device identification SID supplied from the judgment section 64, the control section 60 controls the transmission section 65 to transmit via the network 32 the piece of backup completion notification information to the one of the backup request devices 31A1 to 31AN that requested backup.

However, a backup target file or piece of music data clipped from the radio program data includes not only music but also other sounds such as noise and voices of disc jockeys. However, this kind of music may not be restored from the corresponding piece of backup data even if the data quality information DQ (i.e. the format information) is used.

When the backup of the backup target file or piece of music data clipped from radio program data is requested, the control section 60 stores in the backup data storage section 61 a piece of difference data that represents the difference between the backup target file and the corresponding piece of backup data, along with the music identification MID that identifies this piece of music. By the way, in this case, the backup request devices 31A1 to 31AN have substantially the same configuration: If a radio recording command is input into them at the same time while tuning in a radio program, they may be clipping the same piece of music data from the radio program data.

The backup request devices 31A1 to 31AN may record the same piece of music data in a different format. Accordingly, when storing a piece of difference data in the backup data storage section 61, the control section 60 associates it with a piece of data quality information DQ that indicates the data quality of the backup target file or piece of music data clipped from the radio program data. Even if it stores a piece of difference data in the backup data storage section 61, the control section 60 does not generate (and store) the same piece of difference data from the same quality piece of backup target file in accordance with the corresponding piece of data quality information DQ.

That is, if the judgment section 64 determines that the source of a backup target file is a radio station, the judgment section 64 checks if a piece of difference data that is associated with the piece of backup information BUR supplied from the control section 60 (more specifically the music identification MID and the piece of data quality information DQ) is stored in the backup data storage section 61. If the judgment section 64 determines that the piece of difference data is not stored in the backup data storage section 61, the judgment section 64 transmits to the control section 60 the result of checking along with the piece of backup information BUR and the device identification SID.

If the judgment section 64 determines that the backup data storage section 61 does not have a piece of difference data corresponding to a backup target file whose source is a radio station, the control section 60 generates a piece of acquisition request information that includes a part of the backup information BUR (more specifically a music identification MID) supplied from the judgment section 64 to request the acquisition of the backup target file. Following a piece of address information corresponding to the device identification supplied from the judgment section 64, the control section 60 controls the transmission section 65 to transmit via the network 32 the piece of acquisition request information to one of the backup request devices 31A1 to 31AN that requested backup.

In response, the backup request device 31A1 to 31AN that has received the piece of acquisition request information transmits via the network 32 the backup target file whose source is a radio station, along with the corresponding music identification MID. The control section 60 receives the backup target file and the music identification MID through the receiving section 63 and supplies them to a difference data generation section 66.

When receiving the backup target file and the music identification MID from the control section 60, the difference data generation section 66 reads out from the backup data storage section 61 a piece of backup data corresponding to the music identification MID. The backup data generation section 66 then generates a piece of difference data by calculating the difference between the backup target file and the piece of backup data, and transmits the piece of difference data to the control section 60 along with the music identification MID.

After receiving the piece of difference data and the music identification MID from the difference data generation section 66, the control section 60 transmits the piece of difference data to the backup data storage section 61 along with a piece of backup information BUR including that music identification MID (or a piece of backup information already supplied from the judgment section 64). And the control section 60 retrieves from the backup data storage section 61 a music identification MID that is identical to the one included in the backup information BUR. The control section 60 therefore stores the piece of difference data in the backup data storage section 61 such that it is associated with the retrieved music identification MID and a piece of data quality information DQ included in the piece of backup information BUR.

In this manner, for the backup of a backup target file, the control section 60 just stores in the backup data storage section 61 a corresponding piece of difference data and a corresponding piece of data quality information DQ. The control section 60 subsequently produces a piece of backup completion notification information that includes a music identification MID corresponding to the backup target file (or piece of data clipped from the radio program data) which has been backed up. In the same way as described above, the control section 60 then controls the transmission section 65 to transmit the piece of backup completion notification information via the network 32 to one of the backup request devices 31A1 to 31AN that requested backup.

Even if the judgment section 64 determines that the source of a backup target file is a radio station, it may also recognize that the backup data storage section 61 has already stored, as a piece of backup information BUR, a corresponding music identification MID and a corresponding piece of difference data associated with a piece of data quality information DQ. In this case, the judgment section 64 transmits the result of judgment to the control section 60 along with the piece of backup information BUR and the device identification SID. If the judgment section 64 determines that the piece of difference data corresponding to the backup target file whose source is a radio station has already been stored in the backup data storage section 61, the control section 60 determines the backup has already been made.

Accordingly, in the same way as described above, the control section 60 generates a piece of backup completion notification information that includes a music identification MID corresponding to the backup target file (or piece of data clipped from the radio program data) whose backup has been completed. In the same way as described above, the control section 60 then controls the transmission section 65 to transmit the piece of backup completion notification information via the network 32 to one of the backup request devices 31A1 to 31AN that requested backup.

In this manner, when the backup of a backup target file or piece of music data is requested from the backup request devices 31A1 to 31AN, the control section 60 performs a backup process by storing, instead of the backup target file or piece of music data, a piece of difference data and a piece of backup information BUR. This reduces the amount of data to be stored for backup.

On the other hand, when the backup request device 31A1 to 31AN transmits via the network 32 a piece of restore request information along with the device identification SID, the control section 60 receives them through the receiving section 63 and reads out from the backup information storage section 62 all pieces of backup information BUR associated with the device identification SID.

The control section 60 then regards the total number of the pieces of backup information BUR read out from the backup information storage section 62 as a total number of backup target files to be restored in the target backup request device 31A1 to 31AN. The control section 60 generates a piece of data total number notification information indicating the total number of backup target files and then controls the transmission section 65 to transmit it via the network 32 to the backup request device 31A1 to 31AN. In addition, the control section 60 transmits the pieces of backup information BUR read out from the backup information storage section 62 to the judgment section 64.

When receiving the pieces of backup information BUR from the control section 60, the judgment section 64 checks whether they (or the backup target files for which restoring is requested) include a backup target file or piece of data whose source is a radio station, based on the pieces of data quality information DQ included in the pieces of backup information BUR. If there is, among the backup target files for which restoring is requested (or those corresponding to the pieces of backup information BUR supplied from the control section 60), a backup target file or piece of data whose source is a radio station, the judgment section 64 transmits to a data generation section 67 a piece of backup information BUR corresponding to the backup target file whose source is a radio station.

When receiving the piece of backup information BUR from the judgment section 64, the data generation section 67 reads out from the backup data storage section 61 a piece of backup data corresponding to a music identification MID included in the piece of backup information BUR. In addition, the data generation section 67 reads out from the backup data storage section 61 a piece of difference data corresponding to both the piece of data quality information DQ and the music identification MID included in the piece of the backup information BUR. The data generation section 67 adds the piece of difference data to the piece of backup data to produce an original piece of data or an original backup target file. Each time the backup target file is restored, the data generation section 67 transmits it to the control section 60 along with a corresponding piece of backup information BUR.

On the other hand, if there is, among the backup target files for which restoring is requested (or those corresponding to the pieces of backup information BUR supplied from the control section 60), a backup target file or piece of data whose source is not a radio station, the judgment section 64 transmits to a comparison section 68 a piece of backup information BUR corresponding to the backup target file.

When receiving the piece of backup information BUR from the judgment section 64, the comparison section 68 reads out from the backup data storage section 61 a piece of data quality information associated with a piece of backup data corresponding to a music identification MID included in the piece of backup information BUR. Based on a piece of data quality information DQ included in the piece of backup information BUR and the piece of data quality information associated with the corresponding piece of backup data, the comparison section 68 compares the data quality of the backup target file (for which restoring is requested) with the corresponding piece of backup data.

If the comparison section 68 determines that the data quality of the backup target file is the same as the piece of backup data, it transmits the result of comparison to a data processing section 69 along with the corresponding piece of backup information BUR. Whereas if the comparison section 68 determines that the data quality of the backup target file is lower than the piece of backup data, it transmits the result of comparison to the data processing section 69 along with the corresponding piece of backup information BUR.

The data processing section 69 receives the result of comparison from the comparison section 68 along with the piece of backup information BUR. If the data processing section 69 recognizes from the result of comparison that the data quality of the backup target file is the same as the piece of backup data, it reads out from the backup data storage section 61 a piece of backup data corresponding to the music identification MID included in the piece of backup information BUR (or a piece of data whose quality is the same as the backup target file). And the data processing section 69 regards the piece of backup data as the backup target file.

If the data processing section 69 recognizes from the result of comparison that the data quality of the backup target file is lower than the piece of backup data, it reads out from the backup data storage section 61 a piece of backup data corresponding to the music identification MID included in the piece of backup information BUR (or a piece of data whose quality is higher than the backup target file). The data processing section 69 then processes the piece of backup data in accordance with a piece of data quality information DQ included in the corresponding piece of backup information BUR to generate a backup target file or piece of data whose quality matches the piece of data quality information DQ. Each time a backup target file or piece of data is restored from a piece of backup data, the data processing section 69 transmits it to the control section 60 along with a corresponding piece of backup information BUR.

When receiving a backup target file or piece of data restored and a corresponding piece of backup information BUR from the data generation section 67 or data processing section 69, the control section 60 reads out from the backup data storage section 61 a piece of music related information corresponding to a music identification MID included in the piece of backup information BUR. The control section 60 then controls the transmission section 65 to transmit the backup target file or piece of data restored via the network 32 to the backup request device 31A1 to 31AN that requested restoring, along with the corresponding piece of music related information.

In this manner, the control section 60 keeps transmitting, to the backup request device 31A1 to 31AN that requested restoring, backup target files along with the corresponding pieces of music related information until the number of backup target files it has transmitted reaches the total number that it had already informed. In this manner, the original pieces of music data can be restored in the backup request device 31A1 to 31AN that requested restoring.

FIGS. 10A and 10B are flowcharts illustrating a first backup request execution process, in which the backup device 33 performs the backup of backup target files in concert with the backup request devices 31A1 to 31AN. When a user operates the operation section 41 to input a switch-off command, the control section 40 of the backup request device 31A1 to 31AN starts a procedure RT1 of first backup request process as shown in FIG. 10A. The control section 40 of the backup request device 31A1 to 31AN subsequently, at step SP1, checks whether there is a backup target file or piece of music data left which has not been backed up yet.

If the affirmative result is obtained at step SP1, then it means that there is a new piece of music data which may be stored in the content data storage section 43 during a period of time from when the backup request device 31A1 to 31AN started running immediately after receiving a switch-on command until when it received the switch-off command. In this case, the control section 40 proceeds to step SP2.

At step SP2, the control section 40 reads out from the attribute information storage section 50 a piece of data quality information DQ and music identification MID corresponding to the backup target file which has not been backed up yet, and regards them as a piece of backup information BUR. In this manner, the control section 40 may produce the pieces of backup information BUR for each backup target file which has not been backed up yet. The control section 40 also reads out from the identification information storage section 51 the device identification SID. The control section 40 then controls the transmission section 44 to transmit the piece (or pieces) of backup information BUR and the device identification SID to the backup device 33 along with a piece of backup request information, and proceeds to step SP3.

After establishing the communication connection with the backup request device 31A1 to 31AN, the control section 60 of the backup device 33 starts a procedure RT2 of first backup process as shown in FIG. 10B. The control section 60 subsequently, at step SP11, receives through the receiving section 63 from the backup request device 31A1 to 31AN the piece (or pieces) of backup information BUR, the device identification SID and the piece of backup request information. The control section 60 then transmits the piece of backup information BUR and the device identification SID to the backup information storage section 62, which then stores them such that the piece of backup information BUR is associated with the device identification SID. The control section 60 subsequently proceeds to step SP12.

At step SP12, the control section 60, by using the judgment section 64, decides whether it should request the backup target file from the backup request device 31A1 to 31AN that requested backup. If the affirmative result is obtained at step SP12, then it means that, among the backup target files whose backup have not been completed yet, there is a backup target file or piece of music data whose source is a radio station. In this case, the control section 60 proceeds to step SP13.

At step SP13, the control section 60 controls the transmission section 65 to transmit, to the backup request device 31A1 to 31AN requesting backup, a piece of acquisition request information that contains a music identification MID corresponding to the backup target file whose source is a radio station, and then proceeds to step SP14. If the negative result is obtained at step SP12, then it means that, among the backup target files whose backup have not been completed yet, there is no backup target file or piece of music data whose source is a radio station, or that, even if there is a backup target file or piece of music whose source is a radio station, its difference data already exist as backup data. In this case, the control section 60 skips the processes of step SP13 and SP14 and then proceeds to step SP15.

At step SP3, the control section 40 of the backup request device 31A1 to 31AN checks if it has received the piece of acquisition request information from the backup device 33. If the affirmative result is obtained at step SP3, then it means that the receiving section 45 has received the piece of acquisition request information because there is a backup target file or piece of music whose source is a radio station among those the backup request device 31A1 to 31AN requested to backup. In this case, the control section 40 proceeds to step SP4.

At step SP4, the control section 40 reads out from the content data storage section 43 the backup target file or piece of music data (whose source is a radio station) corresponding to the music identification MID stored in the piece of acquisition request information. The control section 40 then controls the transmission section 44 to transmit the backup target file to the backup device 33 along with the music identification MID, and proceeds to step SP5.

At step SP14, the control section 60 of the backup device 33 receives through the receiving section 63 the backup target file and the corresponding music identification MID from the backup request device 31A1 to 31AN. The control section 60 then produces a piece of difference data by calculating the difference between the backup target file and a corresponding piece of backup data. The control section 60 then stores in the backup data storage section 61 the piece of difference data such that it is associated with the music identification MID and the piece of data quality information DQ, and proceeds to step SP15.

At step SP15, the control section 60 generates a piece of backup completion notification information that contains the music identification MID whose corresponding backup target file or piece of music data has been backed up. The control section 60 subsequently controls the transmission section 65 to transmit to the backup request device 31A1 to 31AN the piece of backup completion notification information, and then proceeds to step SP16 to end the procedure RT2 of first backup process.

If the negative result is obtained at step SP3, then it means that the receiving section 45 has not received the piece of acquisition request information because there is no backup target file or piece of music whose source is a radio station among those the backup request device 31A1 to 31AN requested to backup. In this case, the control section 40 proceeds to step SP5 without performing the process of step SP4.

Therefore, the control section 40 of the backup request device 31A1 to 31AN at step SP5 receives through the receiving section 45 a piece of backup completion notification information from the backup device 33. The control section 40 subsequently accesses the attribute information table ATB1 stored in the attribute information storage section 50 to change the piece of backup information BUE corresponding to the music identification MID included in the piece of backup completion notification information such that it indicates the fact that the corresponding piece of music data has been backed up, and then proceeds to step SP6 to end the procedure RT1 of first backup request process.

If the negative result is obtained at step SP1, then it means that there is not a new piece of music data which is stored in the content data storage section 40 during a period of time from when the backup request device 31A1 to 31AN started running immediately after receiving a switch-on command to when it received the switch-off command. In this case, the control section 40 proceeds to step SP6 to end the procedure RT1 of first backup request process. In that manner, the backup request device 31A1 to 31AN and the backup device 33 complete the first backup request execution process.

Figure 11:
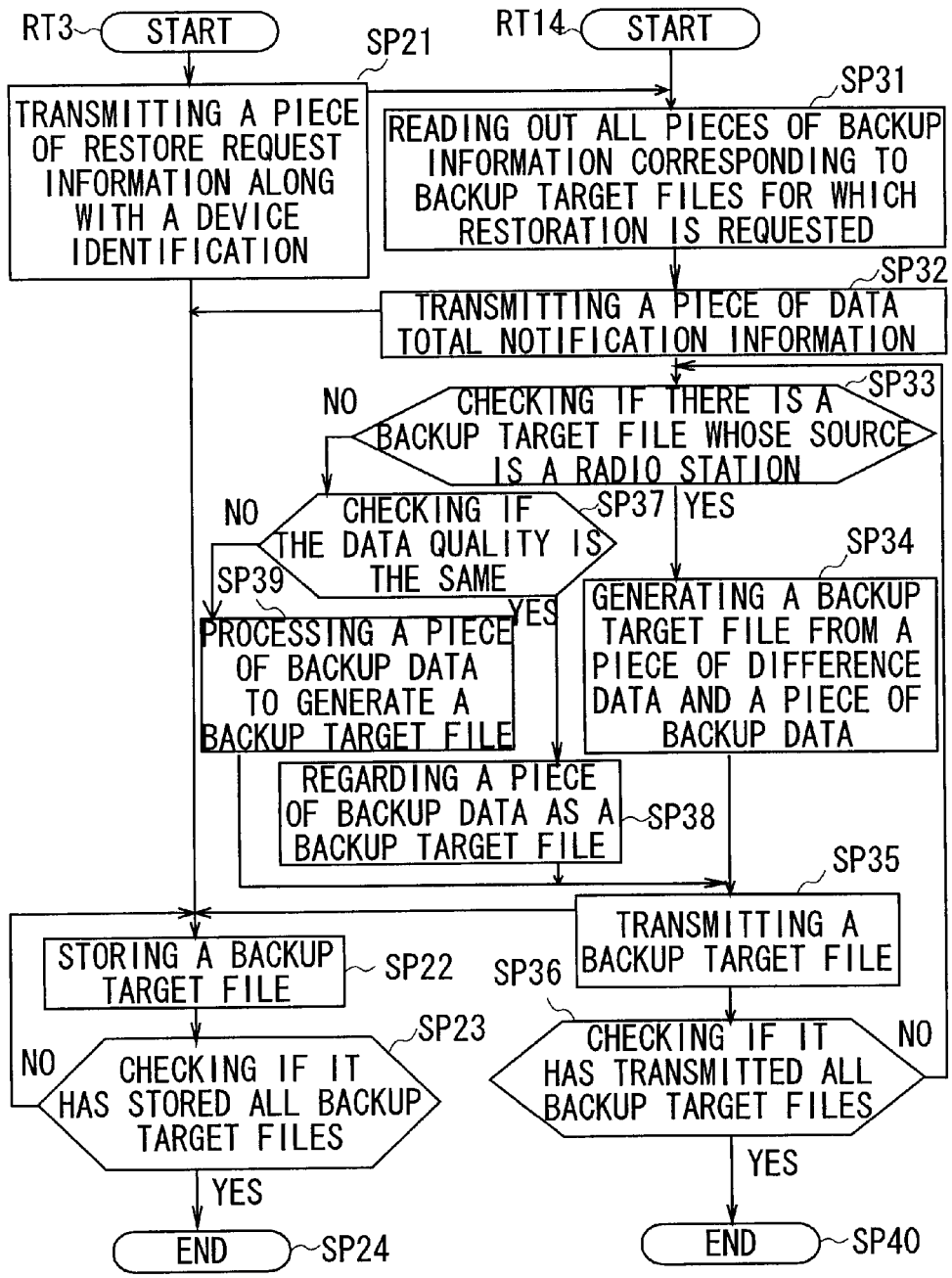
FIGS. 11A and 11B are flowcharts illustrating the procedure of a first restore request execution process.

FIGS. 11A and 11B are flowcharts illustrating a first restore request execution process, in which the backup request device 31A1 to 31AN and the backup device 33 restore the backup target files. When a user operates the operation section 41 to input a restore command, the control section 40 of the backup request device 31A1 to 31AN starts a procedure RT3 of first restore request process as shown in FIG. 11A. And the control section 40 of the backup request device 31A1 to 31AN at step SP21 reads out from the identification information storage section 51 the device identification SID. The control section 40 then controls the transmission section 44 to transmit to the backup device 33 the device identification SID along with a piece of restore request information, and subsequently proceeds to step SP22.

After establishing the communication connection with the backup request device 31A1 to 31AN, the control section 60 of the backup device 33 starts a procedure RT4 of first restore process as shown in FIG. 11B. And the control section 60 of the backup device 33 at step SP31 receives through the receiving section 63 the device identification SID and the piece of restore request information from the backup request device 31A1 to 31AN. The control section 60 subsequently reads out from the backup information storage section 62 all pieces of backup information BUR corresponding to the device identification SID, and then proceeds to step SP32.

At step SP32, the control section 60 regards a total number of the pieces of backup information BUR read out from the backup information storage section 62 as a total number of backup target files to be restored in the backup request device 31A1 to 31AN. The control section 60 controls the transmission section 65 to transmit, to the backup request device 31A1 to 31AN that requested restoring, a piece of data total number notification information indicating that total number, and then proceeds to step SP33.

At step SP33, the control section 60, by using the judgment section 64, checks whether there is a backup target file whose source is a radio station among those to be restored in the backup request device 31A1 to 31AN. If the affirmative result is obtained at step SP33, it means that there is at least one backup target file whose source is a radio station among those to be restored in the backup request device 31A1 to 31AN. In this case, the control section 60 proceeds to step SP34.

At step SP34, the control section 60, by using the data generation section 67, reads out from the backup data storage section 61 a piece of backup data corresponding to a music identification information MID contained in a piece of backup information BUR, and then reads out a piece of difference data corresponding to the piece of backup information BUR. Subsequently, the control section 60, by using the data generation section 67, generates a backup target file, or a piece of music data, by adding the piece of difference data to the piece of backup data, and then proceeds to step SP35. At step SP35, the control section 60 controls the transmission section 65 to transmit to the backup request device 31A1 to 31AN the backup target file along with a corresponding piece of music related information, and then proceeds to step SP36.

At step SP36, the control section 60 checks if it has transmitted to the backup request device 31A1 to 31AN all backup target files to be restored. If the negative result is obtained at step SP36, then it means that it has not yet transmitted to the backup request device 31A1 to 31AN all backup target files to be restored. In this case, the control section 60 returns to step SP33. In this manner, the control section 60 repeats the processes of SP33 to SP36 until it completes the transmission of those backup target files whose sources are radio stations.

If the negative result is obtained at step SP33, then it means that it has already transmitted to the backup request device 31A1 to 31AN all backup target files whose sources are radio stations, as part or all of the backup target files to be restored. In addition, the negative result also means that, among all the backup target files to be restored in the backup request device 31A1 to 31AN, there is no backup target file whose source is a radio station. In this case, the control section 60 proceeds to step SP37.

At step SP37, the control section 60, by using the comparison section 68, reads out from the backup data storage section 61 a piece of data quality information corresponding to a music identification MID contained in a piece of backup information BUR. Based on the piece of data quality information and a piece of data quality information DQ included in the corresponding piece of backup information BUR, the control section 60, by sing the comparison section 68, checks if the data quality of the backup target file to be restored in the backup request device 31A1 to 31AN is the same as the corresponding piece of backup data.

If the affirmative result is obtained at step SP37, then it means that the backup target file to be restored in the backup request device 31A1 to 31AN is identical to the corresponding piece of backup data (i.e. their data qualities are the same). In this case, the control section 60 proceeds to step SP38. At step SP38, the control section 60, by using the data processing section 69, reads out from the backup data storage section 61 the piece of backup data, whose quality was compared, as a backup target file, and then proceeds to step SP35.

If the negative result is obtained at step SP37, then it means that the data quality of the backup target file to be restored in the backup request device 31A1 to 31AN is lower than the corresponding piece of backup data. In this case, the control section 60 proceeds to step SP39. At step SP39, the control section 60, by using the data processing section 69, reads out from the backup data storage section 61 the piece of backup data, whose quality was compared. And the control section 60, by using the data processing section 69, processes the piece of backup data in accordance with the piece of data quality information DQ included in the corresponding piece of backup information BUR to generate a backup target file whose quality matches the piece of data quality information DQ, and then proceeds to step SP35.

In this manner, the control section 60 repeats the processes (starting from step SP33, through SP37, SP39 and SP35 to SP36) until it has transmitted all the backup target files (whose sources are not radio stations) to the backup request device 31A1 to 31AN for restoring. And when the affirmative result is obtained at step SP36, then it means that it has transmitted all the backup target files to the backup request device 31A1 to 31AN for restoring. In this case, the control section 60 proceeds to step SP40 to end the procedure RT4 of first restore process.

On the other hand, at step SP22, the control section 40 of the backup request device 31A1 to 31AN receives through the receiving section 45 the piece of data total notification information from the backup device 33. And the control section 40 receives through the receiving section 45 a backup target file and a corresponding piece of music related information from the backup device 33. The control section 40 stores in the new or fixed content data storage section 43 the backup target file as a piece of music data such that it is associated with the piece of music related information, and then proceeds to step SP23.

At step SP23, the control section 40 checks if it has received through the receiving section 45 and stored in the content storage section 43 all the backup target files, along with the corresponding pieces of music related information, the total number of which is indicated by the piece of data total number notification information received from the backup device 33. If the negative result is obtained at step SP23, then it means that it has not received all the backup target files, along with the corresponding pieces of music related information. In this case, the control section 40 proceeds to step SP22.

The control section 40 repeats the processes of step SP22 and SP23 until it has received all the backup target files, along with the corresponding pieces of music related information, from the backup device 33. If the affirmative result is obtained at step SP23, then it means that it has received and stored in the content storage section 43 all the backup target files, along with the corresponding pieces of music related information, the total number of which is indicated by the piece of data total number notification information received from the backup device 33. In this case, the control section 60 proceeds to step SP24 to end the procedure RT3 of first restore request process. In this manner, the backup request device 31A1 to 31AN and the backup device 33 complete the first restore request execution process.

(2-2) Operation and Effect of First Embodiment

As described above, the backup device 33 of the backup system 30 has stored in the backup data storage section 61 a highest-data-quality piece of music data as backup data for each piece of music, such that each is associated with a corresponding music identification MID.

Before requesting backup, the backup request device 31A1 to 31AN of the backup system 30 regards the pieces of music data stored in the content data storage section 43 as backup target files, and puts together each piece of data quality information indicating the data quality of each backup target file and a corresponding music identification MID as a piece of backup information BUR. The backup request device 31A1 to 31AN transmits to the backup device 33 the pieces of backup information BUR along with the device identification SID.

After receiving the pieces of backup information BUR along with the device identification SID from the backup request device 31A1 to 31AN, the backup device 33 stores in the backup information storage section 62 the pieces of backup information BUR such that they are associated with the device identification SID.

By the way, from a highest-data-quality piece of music data, a lower-data-quality piece of music data can be produced. Therefore, in the backup system 33, even though the backup device 33 just stores a highest-data-quality piece of music data as backup data for each piece of music and a corresponding piece of backup information BUR, which is acquired from the backup request device 31A1 to 31AN and is much smaller than the piece of backup data in size, the backup device 33 can restore a piece of music data in a different data quality format.

According to the above configuration, the backup device 33 of the backup system 30 has stored in the backup data storage section 61 a highest-data-quality piece of music data for each piece of music as backup data, such that each is associated with a corresponding music identification MID. After receiving the pieces of backup information BUR indicating the data qualities of the backup target files along with the device identification SID from the backup request device 31A1 to 31AN, the backup device 33 stores in the backup information storage section 62 the pieces of backup information BUR such that they are associated with the device identification SID. By the way, from a higher-data-quality piece of backup data, the backup device 33 can produce a piece of music data whose data quality matches the one indicated by the piece of data quality information DQ. Therefore, in the backup system 33, even though the backup device 33 just stores a highest-data-quality piece of music data as backup data for each piece of music and a corresponding piece of backup information BUR, which is acquired from the backup request device 31A1 to 31AN and is much smaller than the piece of backup data in size, the backup device 33 can restore a piece of music data in a different data quality format. In this manner, the backup system 30 can efficiently backup the pieces of music data, even if there are various data qualities of music data, in the backup device 33.

In addition, in the backup system 30, the backup request device 31A1 to 31AN can clip a piece of music data from a radio program or its radio program data and save it. When the backup request device 31A1 to 31AN requests the backup of a backup target file or piece of music data whose source is a radio station (i.e. the one clipped from radio program data), the backup device 33 acquires the backup target file, generates a piece of difference data by calculating the difference between the backup target file and a corresponding piece of backup data, and stores the piece of difference data in the backup data storage section 61. In this manner, instead of storing the backup target file, the backup device 33 stores a corresponding piece of difference data whose size is smaller than the backup target file. In this manner, the backup system 30 can efficiently backup the pieces of music data even if they are clipped from a radio program.

In addition, when storing the piece of difference data for the backup of the piece of music data whose source is a radio station, the backup device 33 associates the piece of difference data with a piece of data quality information DQ corresponding to the original piece of music data. And if the backup device 33 recognizes from the associated pieces of data quality information DQ that it has already had the same piece of difference data generated from the same quality piece of music data, it does not store the same piece again to prevent duplication. In this manner, the backup system 30 can efficiently backup the pieces of music data even if they are clipped from a radio program.

Moreover, the backup device 33 of the backup system 30 has previously stored in the backup data storage section 61 a highest-data-quality piece of music data as backup data for each piece of music. Accordingly, there is no need to replace it with another piece of backup data later (because it has the highest data quality) each time the backup device 33 receives a backup request from the backup request device 31A1 to 31AN. Thus, the dramatic increase of the processing load of the backup device 33 can be prevented.

Furthermore in the backup system 30, when receiving a restore request from the backup request device 31A1 to 31AN, the backup device 33, following a piece of data quality information DQ, processes a piece of backup data to generate a backup target file or piece of music data whose data quality is equal to the one when its backup was requested. The backup device 33 subsequently supplies it to the backup request device 31A1 to 31AN for restoring. Accordingly, in the backup system 30, the backup device 33, which actually does not keep the backup target files but keeps the corresponding pieces of backup information BUR, can restore the requested backup target files or pieces of music data.

Furthermore in the backup system 30, when receiving from the backup request device 31A1 to 31AN a restore request of a backup target file (or a piece of music data) whose source is a radio station, the backup device 33 generates the backup target file (or the piece of music data) by adding a piece of difference data and a corresponding piece of backup data and then supplies it to the backup request device 31A1 to 31AN for restoring. Accordingly, in the backup system 30, the backup device 33, which actually does not keep the backup target files whose sources are radio stations but instead keeps the corresponding pieces of backup information BUR and difference data, can restore the requested backup target files or pieces of music data whose sources are radio stations.

(2-3) Other Embodiments

In the above-noted first embodiment, when receiving a restore request from the backup request device 31A1 to 31AN, the backup device 33 restores a corresponding backup target file (or a piece of music data). However, the present invention is not limited to this. The backup device 33 may automatically restore a backup target file after a predetermined period of time (a backup period).

If the content data storage section 43 is a magnetic disk that uses patterns of magnetization to store the pieces of music data, they may be removed from the content data storage section 43 due to the weakening of magnetization as the time goes by (about ten years later, for example). The above automatic restoring function can restore them (or the pieces of music data backed up by the backup device 33) without replacing the content data storage section 43 with a new one.

Accordingly in the backup system 30, the control section 60 of the backup device 33 may automatically restore in the content data storage section 43 of the backup request device 31A1 to 31AN all pieces of music data the backup device 33 had backed up for a predetermined period of time (i.e. the backup period) from when it first received a backup request from the backup request device 31A1 to 31AN until those stored in the content data storage section 43 are believed to become unavailable for playback. Therefore, in the backup system 30, a user can enjoy the pieces of music data stored in the content data storage section 43 of the backup request device 31A1 to 31AN without being worried about the weakening of magnetization of the content data storage section 43.

Moreover, in the above-noted first embodiment, when receiving a restore request from the backup request device 31A1 to 31AN, the backup device 33 restores all backup target files at once. However, the present invention is not limited to this. The control section 40 of the backup request device 31A1 to 31AN may select backup target files to be restored, or allow a user to choose those to be restored. This is effective when only a few pieces of music data become unavailable in the content data storage section 43 of the backup request device 31A1 to 31AN, because restoring a few pieces of music data does not increase the processing load so much compared to restoring all pieces of music data.

Furthermore, in the above-noted first embodiment, the attribute information storage section 50 of the backup request device 31A1 to 31AN stores the attribute information table ATB1 illustrated in FIG. 7. However, the present invention is not limited to this. The attribute information storage section 50 of the backup request device 31A1 to 31AN may instead store an attribute information table that lists a piece of data quality information DQ and a music identification MID for each piece of music data that has been stored in the content data storage section 43 during a period of time from when the backup request device 31A1 to 31AN starts running until a switch-off command is input; and the pieces of data quality information DQ and the corresponding music identifications MID will be removed from the attribute information table after the backup target files indicated by the attribute information table have been backed up. Accordingly, with this kind of attribute information table, the pieces of music data that have not been backed up yet can be easily recognized. In addition, when the backup of them is completed, the backup request device 31A1 to 31AN does not have to update the corresponding pieces of backup completion information BUE. This simplifies the backup request process and decreases the processing load.

Furthermore, in the above-noted first embodiment, the backup device 33 is designed to acquire from the backup request device 31A1 to 31AN a backup target file whose source is a radio station for backup. However, the present invention is not limited to this. Alternatively, the backup device 33 may be equipped with a data processing and radio receiving sections, which are the same configuration as the data processing section 42B and the radio receiving section 47 of the backup request device 31A1 to 31AN; and the backup device 33 may clip all pieces of music data from radio programs broadcast from all radio stations and store those various qualities of music data, and the pieces of difference data generated by calculating the differences between the acquired pieces of music data and the corresponding pieces of backup data, along with the corresponding pieces of data quality information DQ.

Furthermore, in the above-noted first embodiment, the backup data storage section 61 of the backup device 33 previously stores a highest-data-quality piece of music data for each piece of music as backup data. However, the present invention is not limited to this. Alternatively, each time when a higher-data-quality piece of music data is supplied in response to a backup request from the backup request device 31A1 to 31AN, the backup device 33 may replace the lower-data-quality piece of music data stored in the backup data storage section 61 with the supplied higher-data-quality one.

Figures 12, 13:
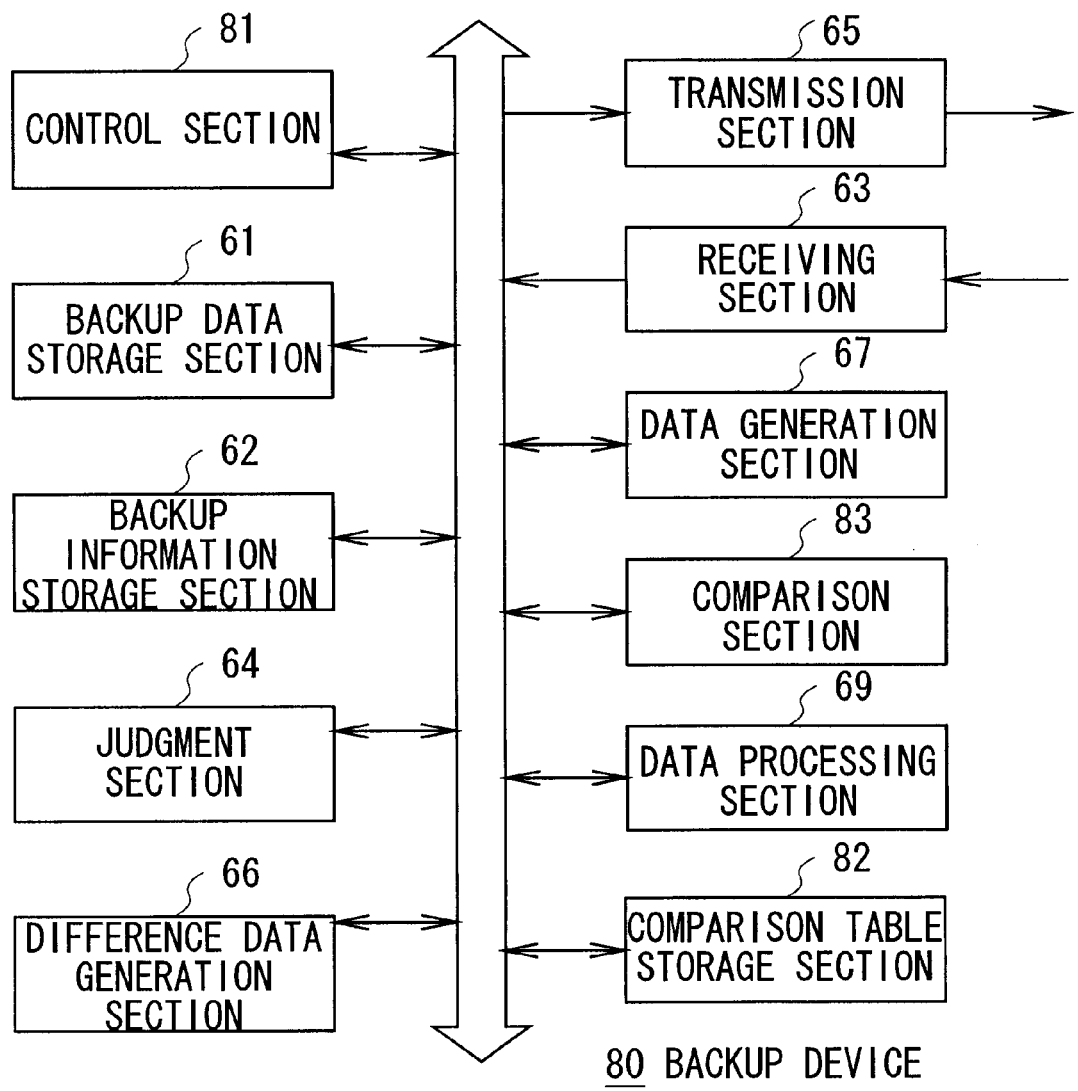
FIG. 12 is a block diagram illustrating the hardware circuit configuration of a backup device according to another embodiment of the present invention, by using functional circuit blocks.
FIG. 13 is a schematic diagram illustrating the configuration of a data quality comparison table.

The following describes how a backup device stores a backup target file as backup data. As shown in FIG. 12 whose corresponding parts have been designated by the same reference numerals and symbols as the corresponding parts of FIG. 8, a control section 81 of a backup device 80 stores in a comparison table storage section 82 a data quality comparison table QCL (FIG. 13) that lists pieces of data quality information DQ, each of which indicates the data quality of each piece of music data, in order of quality.

Figure 10:
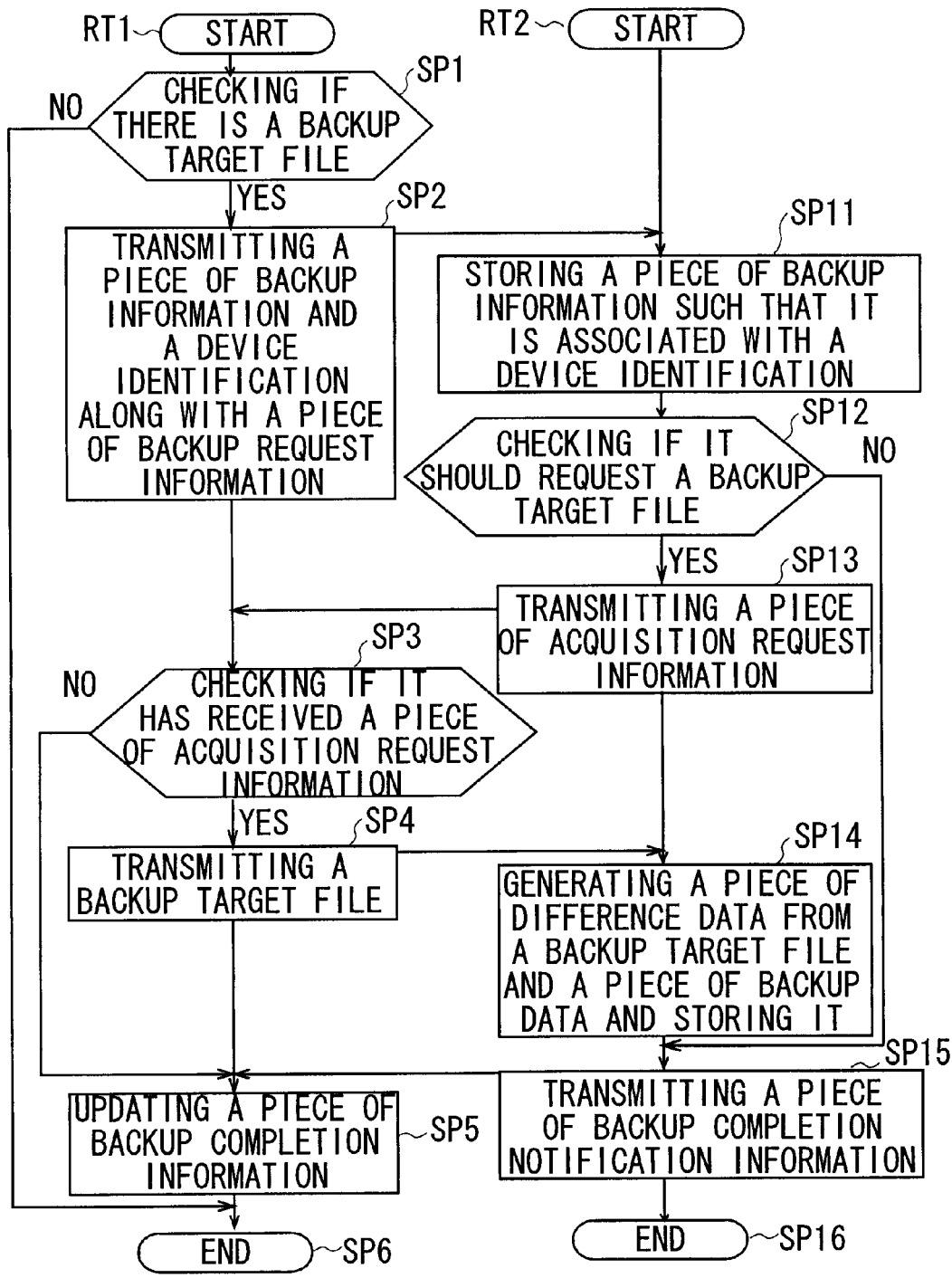
FIGS. 10A and 10B are flowcharts illustrating the procedure of a first backup request execution process.
Figure 14:
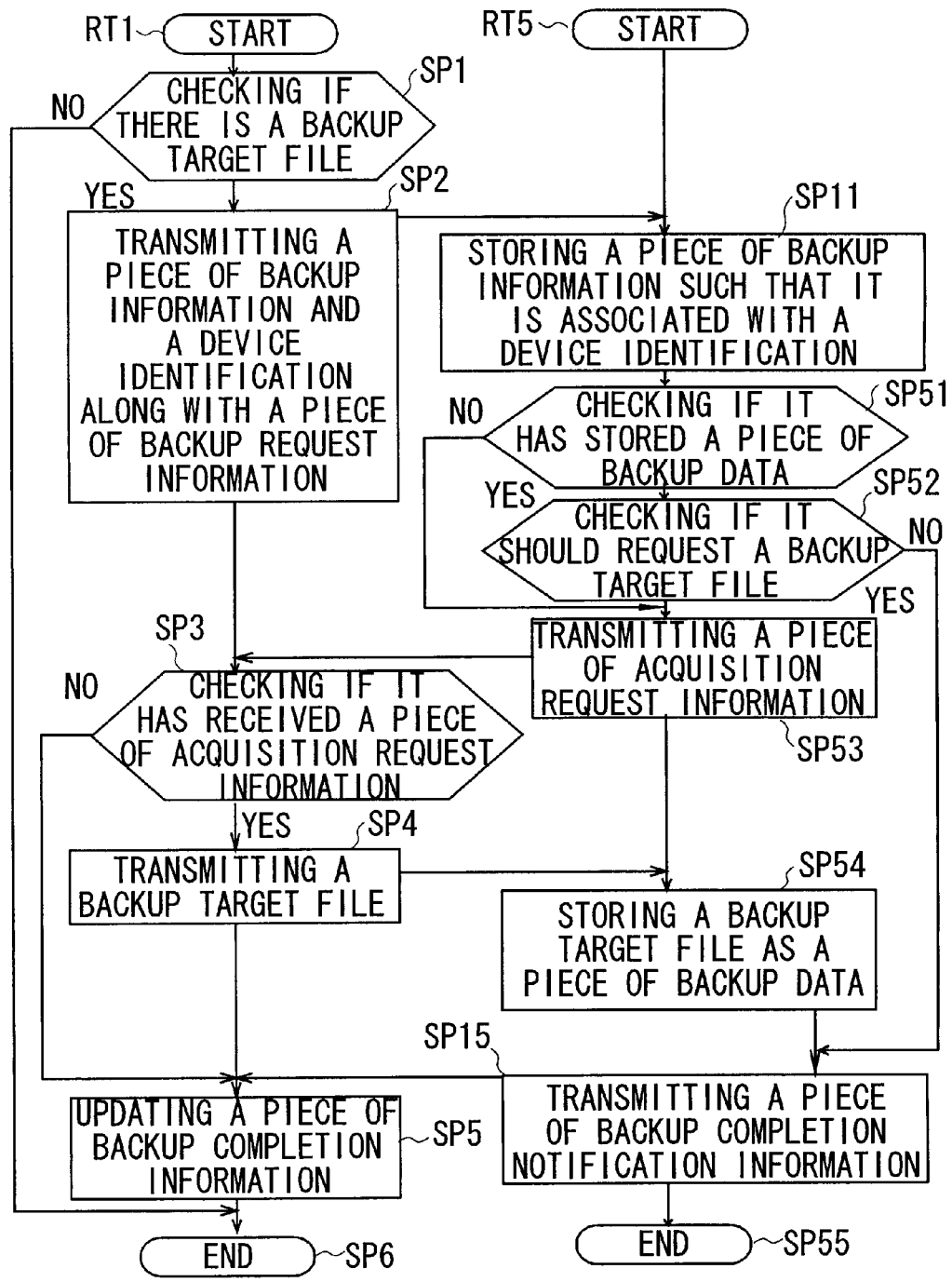
FIGS. 14A and 14B are flowcharts illustrating the procedure of a second backup request execution process.

Following a procedure RT5 of second backup request process illustrated in FIGS. 14A and 14B whose parts have been designated by the same reference numerals and symbols as the corresponding parts of FIG. 10, the control section 81 of the backup device 80 starts the process (FIG. 14B) after establishing the communication connection with the backup request device 31A1 to 31AN. The control section 81 of the backup device 80 proceeds to step SP51 after completing the process of step SP11.

At step SP51, the control section 81 checks if the backup data storage section 61 keeps a piece of backup data corresponding to a music identification MID included in the piece of backup information BUR the control section 81 has just received at this time. If the negative result is obtained at step SP51, then it means that the backup data storage section 61 does not have the piece of backup data (regardless of its data quality) because it is the first time for the backup device 80 to receive a backup request for the backup target file (or piece of music data). In this case, the control section 81 skips the process of step SP52 and proceeds to step SP53.

Whereas if the affirmative result is obtained at step SP51, then it means that the backup data storage section 61 already keeps a highest-data-quality piece of music data as the piece of backup data (the one corresponding to the music identification MID included in the piece of backup information BUR) because the backup of the backup target file (or backup target files), whose source is not a radio station and which corresponds to the music identification MID included in the piece of backup information BUR, had already been requested. In this case, the piece of backup data stored in the backup data storage section 61 is associated with the corresponding music identification MID.

By the way, even if the backup data storage section 61 has already kept a piece of backup data or backup target file whose source is not a radio station, the control section 81 is designed to replace it with a higher-data-quality piece of backup data (whose source is not a radio station) when its backup is requested. Accordingly, even if the control section 81 stores in the backup data storage section 61 a piece of backup data whose source is not a radio station and which does not have the highest data quality, the control section 81 keeps various qualities of backup target files whose sources are radio stations as backup data until it stores a highest-data-quality piece of backup data whose source is not a radio station.

Accordingly, the above affirmative result also means that a backup target file of a certain quality, which corresponds to the music identification MID included in the piece of backup information BUR and whose source is a radio station, has been already stored as backup data. Thus, after obtaining the affirmative result, the control section 81 proceeds to step SP52.

At step SP52, the control section 81 checks if it should request the acquisition of a backup target file corresponding to the music identification MID included in the piece of backup information BUR from the backup request device 31A1 to 31AN that requested backup. If the affirmative result is obtained at step SP52, then it means that the backup data storage section 61 has already stored a piece of backup data which corresponds to the music identification MID included in the piece of backup information BUR and whose source is not a radio station; but after the comparison section 82, based on the data quality comparison table QCL stored in the comparison table storage section 82, compares the data quality of the backup target file, for which backup was requested and whose source is not a radio station, with the data quality of a corresponding piece of backup data (this data quality is indicated by a piece of data quality information DQ that is stored in the backup data section 61 along with the music identification MID such that it is associated with the piece of backup data), it is revealed that the data quality of the backup target file is higher than the piece of backup data.

In addition, the above affirmative result also means that the source of the backup target file, for which backup was requested, is a radio station; and that the backup data storage section 61 has not stored a piece of backup data identical to the backup target file (or a piece of backup data whose data quality is the same as the backup target file and whose source is a radio station). In this case, the control section 81 proceeds to step SP53.

At step SP53, the control section 81 controls the transmission section 65 to transmit a piece of acquisition request information containing the music identification MID included in the piece of backup information BUR to the backup request device 31A1 to 31AN that requested backup, and then proceeds to step SP54. In response, the backup request device 31A1 to 31AN transmits a backup target file and a corresponding music identification MID, and the control section 81 at step SP54 receives them through the receiving section 63. The control section 81 stores in the backup data storage section 61 the backup target file as backup data such that it is associated with the music identification MID. The control section 81 subsequently performs the process of step SP15 and then proceeds to step SP55 to end the procedure RT5 of second backup process. In that manner, the backup device 80 completes the second backup request process in concert with the backup request device 31A1 to 31AN.

By the way, if the control section 81 at step SP54 has not stored in the backup data storage section 61 backup data of any data quality which corresponds to the music identification MID included in the piece of backup information BUR yet, it stores a backup target file, which was acquired from the backup request device 31A1 to 31AN, as backup data. The control section 81 also stores in the backup data storage section 61 a piece of data quality information DQ, which was included in the piece of backup information BUR, such that it is associated with the piece of backup data.

Whereas if the control section 81 at step SP54 has already stored in the backup data storage section 61 a backup target file or piece of backup data, which corresponds to the music identification MID included in the piece of backup information BUR and whose source is not a radio station, the control section 81 replaces the piece of backup data with a backup target file, which was acquired from the backup request device 31A1 to 31AN at this time, as new backup data because its data quality is higher than that piece of backup data and its source is not a radio station. The control section 81 also stores in the backup data storage section 61 a new corresponding piece of data quality information DQ such that it is associated with the new piece of backup data.

Whereas if the control section 81 at step SP54 has already stored in the backup data storage section 61 a piece of backup data that corresponds to the music identification MID included in the piece of backup information BUR but has yet to store a backup target file for which backup was requested and whose source is a radio station, the control section 81 stores, along with the existing piece of backup data, a backup target file, which was acquired from the backup request device 31A1 to 31AN at this time and whose source is a radio station, as a piece of backup data such that it is associated with the music identification MID. The control section 81 also associates it with a corresponding piece of data quality information DQ in the backup data storage section 61.

By the way, if the control section 81 has already stored in the backup data storage section 61 a highest-data-quality piece of backup data (whose source is not a radio station) for each piece of music, it is designed to store, in the same way as described in the first embodiment, a piece of difference data, when the backup of a piece of music data whose source is a radio station is requested, by calculating the difference between it and a highest-data-quality piece of backup data. In that manner, the control section 81 had first stored in the backup data storage section 61 a piece of difference data by calculating the difference between a piece of backup data (or music data) whose source is not a radio station and a lower-data-quality piece of backup data whose source is a radio station; and then the control section 81 replaces the lower-data-quality piece of backup data with a higher-data-quality piece of backup data. This allows the piece of difference data to be restored to be the same as the original backup target file.

By the way, if the negative result is obtained at step SP52, then it means that, after the comparison section 82, based on the data quality comparison table QCL stored in the comparison table storage section 82, compares the data quality of the backup target file, for which backup was requested and whose source is not a radio station, with the data quality of a corresponding piece of backup data (or the one whose source is not a radio station), it is revealed that the data quality of the backup target file is less than or equal to the piece of backup data.

In addition, the above negative result also means that the source of the backup target file, for which backup was requested, is a radio station; and that the backup data storage section 61 has already stored a piece of backup data identical to the backup target file (or a piece of backup data whose data quality and source are the same as the backup target file). In this case, the control section 81 proceeds to step SP15.

With the above configuration, the backup device 80 only makes backup files of backup target files the backup request devices 31A1 to 31AN requested to backup. Accordingly, the backup device 80 can efficiently use storage space because it does not store pieces of music data (as backup data) that the backup request devices 31A1 to 31AN have not acquired yet. Thus, the backup device 80 can back up various qualities of music data (as backup target files) more efficiently than the above-noted first embodiment.

(3) Second Embodiment (3-1) Configuration of Backup System of Second Embodiment

Figure 15:
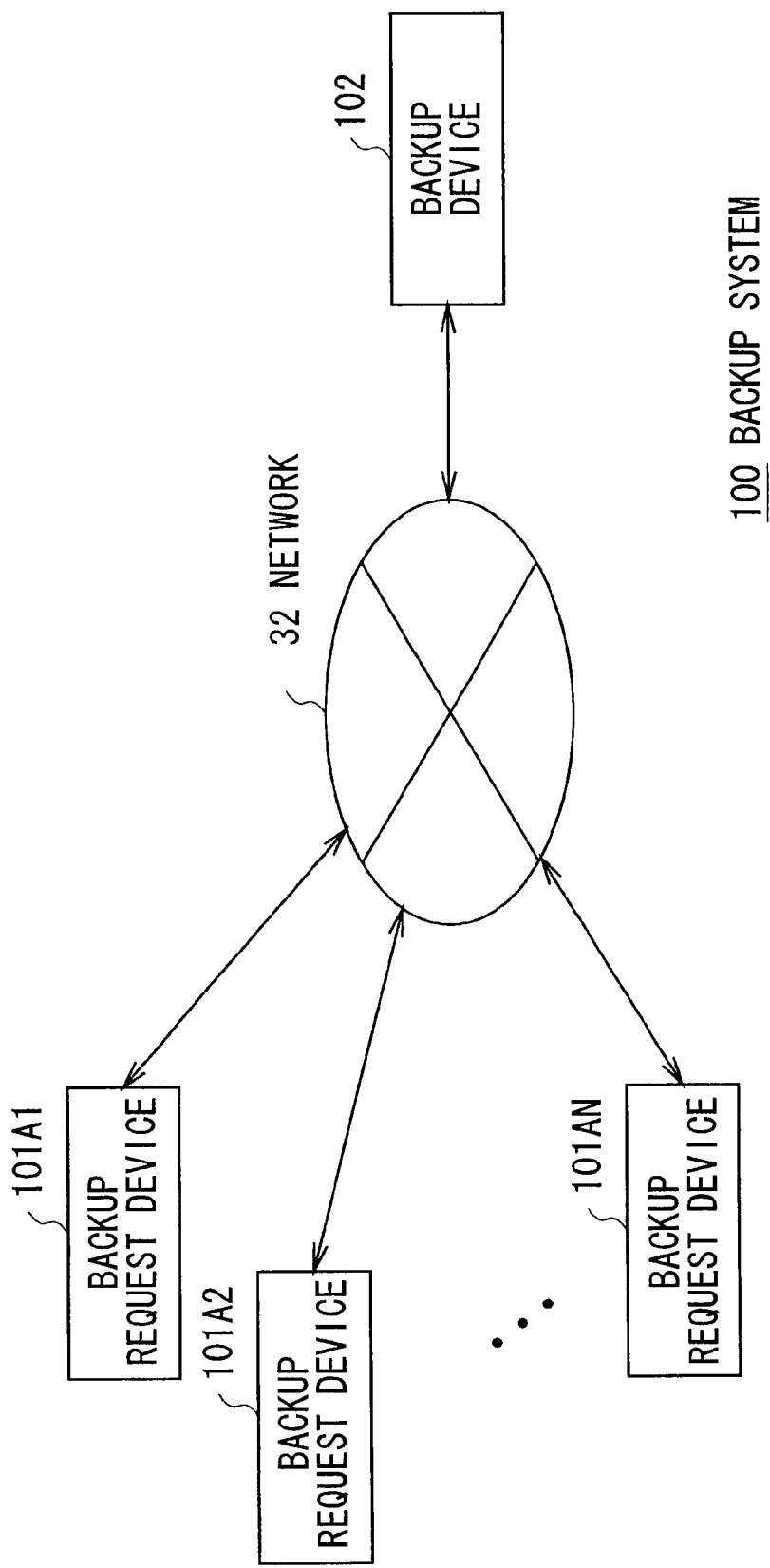
FIG. 15 is a block diagram illustrating the configuration of a backup system according to a second embodiment of the present invention.

In FIG. 15, the reference numeral 100 denotes a backup system according to a second embodiment of the present invention. In the backup system 100, a plurality of backup request devices 101A to 101AN, each of which is used by a different user, is connected to a backup device 102 via a network 32.

Figure 16:
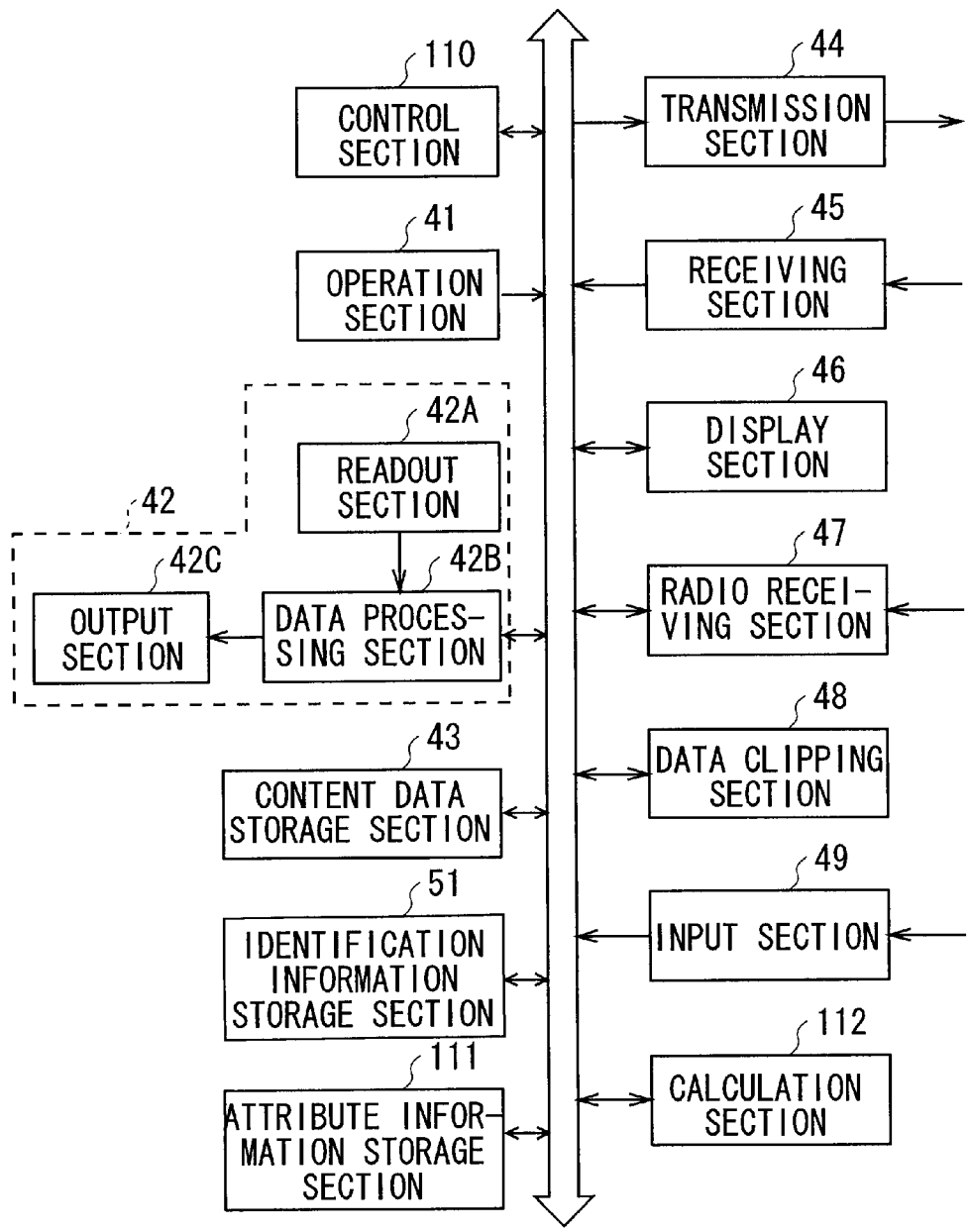
FIG. 16 is a block diagram illustrating the hardware circuit configuration of a backup request device by using functional circuit blocks.

Since the backup request devices 101A to 101AN have the same structure in this case, one of them, the backup request device 101A1, will be described with reference to FIG. 16 (in which parts have been designated by the same reference numerals and symbols as the corresponding parts of FIG. 5), which uses functional circuit blocks to illustrate its hardware circuit configuration. Since the other backup request devices 101A2 to 101AN have the same hardware circuit configuration, they will not be described.

When a user operates an operation section 41, which includes various operation keys and the like, and inputs various commands, a control section 110 of the backup request device 101A1 takes overall control of the device in accordance with the input commands to perform various processes. When a piece of music data, which is to be stored in a content data storage section 43, is supplied from a data processing section 42C of a playback section 42 to the control section 110, the control section 110 copies a music identification MID included in a piece of music related information corresponding to the piece of music data.

When having acquired a piece of music data and a corresponding piece of music related information from a music data delivery device or an external electronic device, the control section 110 copies a music identification MID included in the piece of music related information. After copying the music identification MID, the control section 110 transmits it to an attribute information storage section 111. Under the control of the control section 110, as shown in FIG. 17, the attribute information storage section 111 stores a music identification MID for each piece of music and a corresponding piece of backup completion information BUE indicating whether a piece of music data identified by a corresponding music identification MID has been already backed up, such that they are associated with one another.

In this manner, the control section 110 produces in the attribute information storage section 111 an attribute information table ATB2 in which a music identification MID and a piece of backup completion information BUE are associated for each piece of music. Therefore, the control section 110 can check if a piece (or pieces) of music data stored in the content data storage section 43 has been already backed up by the backup device 102, based on the attribute information table ATB2 stored in the attribute information storage section 111.

After a user operates the operation section 41 for example to input a switch-off command, the control section 110, while the backup request device 101A1 appears to be turned off, performs a backup request process for music data. In this case, the control section 110, based on the attribute information table ATB2 (or the pieces of the backup completion information BUE) stored in the attribute information storage section 111, checks whether there is a piece of music data in the content storage section 43 which has not been backed up yet.

If there is a piece of music data in the content storage section 43 which has not been backed up yet, the control section 110 reads out from the content data storage section 43 the piece of music data as a backup target file. The control section 110 then transmits it to a calculation section 112.

After receiving the backup target file from the control section 110, the calculation section 112 acquires a hash value by performing one-directional hash calculation for the backup target file. If backup target files are the same, their hash values are identical to one another. However, if backup target files are different from one another, their hash values are also different.

If there are two backup target files which are identical to one another in terms of data quality and source, they have the same sequence of data: If not, they have different sequences. Therefore, a hash value is only associated with the pieces of music data whose sources and data qualities are the same. Accordingly, the hash value can serve as not only a music identification MID but also a piece of data quality information DQ to identify the pieces of music data whose sources and data qualities are the same.

By the way, if there is a one-bit difference between backup target files, their hash values are totally different. Accordingly, the control section 110, in this case, only reads out part of a backup target file (i.e. it extracts only a few bits or bytes from the top, middle and end parts of the backup target file) from the content storage section 43 and transmits it to the calculation section 112 as a backup-target portion. The calculation section 112 then performs one-directional hash calculation for the backup-target portion.

This allows the control section 110 to read out the backup target file from the content data storage section 43 faster than before. That also reduces the amount of calculation to calculate a hash value. After calculating a hash value from the backup target file, the calculation section 112 transmits it to the control section 110.

After receiving the hash value from the calculation section 112, the control section 110 reads out from an identification information storage section 51 a device identification SID. The control section 110 regards the hash value as a piece of backup information, which is used for backing up a corresponding backup target file. The control section 110 subsequently controls the transmission section 44 to transmit via the network 32 to the backup device 102 a piece of backup information (or a hash value) and the device identification SUD along with a piece of backup request information.

When receiving from the backup request device 101A1 a hash value and the device identification SID along with a piece of backup request information, the backup device 102 performs a backup process for backup target files (except those provided from a radio station, as described later) by using the hash value and the device identification SID. After completing the backup of the backup target files, the backup device 102 produces a piece of backup completion notification information that includes the music identifications MID of the backup-completed pieces of music data to indicate the fact that backup copies of those backup target files have been made, and then transmits the piece of backup completion notification information via the network 32.

The control section 110 controls the receiving section 45 to receive the piece of backup completion notification information via the network 32 from the backup device 102. Based on the piece of backup completion notification information, the control section 110 accesses the attribute information table ATB2 stored in the attribute information storage section 111 and changes the corresponding pieces of backup completion information BUE (or those corresponding to the music identifications MID indicated by the piece of backup completion notification information) such that each indicates a backup copy of a corresponding piece of music data has been made.

If a backup target file is a piece of music data provided from a radio station, the backup device 102 performs a backup process by using a corresponding hash value, a corresponding music identification MID and the backup target file or the piece of music data (described later). In this manner, if a backup target file is a piece of music data whose source is a radio station, the backup device 102 produces a piece of acquisition request information that includes a corresponding music identification MID and transmits it via the network 32.

The control section 110 controls the receiving section 45 to receive the piece of acquisition request information via the network 32 from the backup device 102. And the control section 110 reads out from the content data storage section 43 a piece of music data whose music identification MID is the same as the one included in the piece of acquisition request information (i.e. a piece of music data provided from a radio station). The control section 110 then controls the transmission section 44 to transmit the piece of music data, along with the corresponding music identification MID, to the backup device 102 via the network 32 as a backup target file.

After the backup device 102 completes the backup of the backup target file (or the piece of music data provided from a radio station) and transmits a piece of backup completion notification information via the network 32, the control section 110 receives the piece of backup completion notification information through the receiving section 45. Based on the piece of backup completion notification information, the control section 110 accesses the attribute information table ATB2 stored in the attribute information storage section 111 and changes a corresponding piece of backup completion information BUE (or the one corresponding to the piece of music data provided from a radio station) such that it indicates a backup copy of a corresponding piece of music data has been made.

After completing the backup of those backup target files, the control section 110 ends the backup request process and then turns off itself to switch off the backup request device 101A1.

By the way, if there is no piece of music data whose backup file has not been made at the time when the control section 110 starts a backup request process, the control section 110 immediately ends the backup request process and then turns off itself to switch off the backup request device 101A1.

In this manner, if a new piece of music data is recorded on the content data storage section 43 before the backup request device 101A1 is turned off, the backup of that piece of music data (as a backup target file) is going to be made by the backup device 102 when a switch-off command is input.

On the other hand, after the content data storage section 43 is fixed or replaced with a new one, a user for example operates the operation section 41 to input a restore command. In response, the control section 110 reads out the device identification SID from the identification information storage section 51. The control section 110 then controls the transmission section 44 to transmit the device identification SID to the backup device 102 via the network 32 along with a piece of restore request information.

In response, the backup device 102 transmits via the network 32 a piece of data total number notification information indicating a total number of backup target files that are going to be restored. The control section 110 receives the piece of data total number notification information through the receiving section 45. Subsequently, the backup device 102 transmits via the network 32 the backup target files (or the pieces of music data) and the corresponding pieces of music related information via the network 32. The control section 110 receives them through the receiving section 45. The control section 110 then stores the backup target files (or the pieces of music data) along with the corresponding pieces of music related information in the fixed or new content data storage section 43.

In this manner, the control section 110 can restore a piece of music data and a corresponding piece of music related information in the content data storage section 43 such that they are associated with one another. In this manner, the control section 110 receives backup target files (or pieces of music data) and the corresponding pieces of music related information until the number of targets received becomes equal to the total number notified by the backup device 102, and stores them in the content data storage section 43. In this manner, the control section 110 restores the pieces of music data that the content data storage section 43 had once lost in a way that they can be played back again.

With reference to FIG. 18 (in which parts have been designated by the same reference numerals and symbols as the corresponding parts of FIG. 8), the hardware circuit configuration of the backup device 102 will be described by using functional circuit blocks. A control section 120 of the backup device 102 takes overall control of the device and performs various processes.

As shown in FIG. 19, the control section 120 stores in a correlation table storage section 121 a correlation table TL associating the following items: a music identification MID for each piece of music; a hash value HS, which identifies the pieces of music data whose sources and data qualities are the same; and a piece of data quality information DQ, which indicates the data quality of a corresponding piece of music data.

In this case, the correlation table TL, for example, is previously generated by an external correlation table generation device and provided to the backup device 102. In the same way as the above data processing section 42B of the backup request devices 101A to 101AN, the correlation table generation device generates various data-quality formats of music data from the highest-data-quality piece of music data, such as the one whose codec type CT is set at PCM, with the sampling rate SR 44.1 [KHz], the resolution BN 16-bit, and the cannel CH 2-channel.

In addition, in the same way as the calculation section 112 of backup request device 101A to 101AN, the correlation table generation device performs one-directional hash calculation to obtain hash values from various data-quality formats of music data for each piece of music. Moreover, the correlation table generation device clips all pieces of music data from radio programs or radio data broadcast from all radio stations, and calculates their hash values HS.

Each of the hash values HS calculated by the correlation table generation device is identical to that of the same type of music data stored in the backup request device 101A to 101AN: If two pieces of music data are provided from the same source and have the same data quality, their hash values HS are the same. Moreover, as for a piece of data quality information DQ corresponding to a piece of music data whose source is not a radio station, the correlation table generation device only generates a piece of format information DF1 indicating the data format of the piece of music data. Furthermore, as for a piece of data quality information DQ corresponding to a piece of music data whose source is a radio station, the correlation table generation device combines a piece of format information DF1 indicating the data format of the piece of music data with a piece of data provider information HD1 indicating a provider or a radio station.

After acquiring a new-released piece of music data or clipping a new piece of music data from radio program data, the correlation table generation device updates the correlation table TL and provides it to the backup device 120. Each time the new correlation table TL is supplied, the control section 120 of the backup device 102 replaces the old correlation table TL stored in the correlation table storage section 121 with the new one.

By the way, an operator of the backup device 102 has previously registered users who use the backup device 102 to make a backup copy of backup target files. The control section 120 has stored for example in a backup information storage section 122 the device identifications SID of the backup request devices 101A to 101AN that the registered users use.

When the backup request device 101A to 101AN transmits the device identification SID and a piece of backup information (or a hash value HS) via the network 32 along with a piece of backup request information, the control section 120 receives them through the receiving section 63 and transmits the hash value and the device identification SID to the backup information storage section 122. The control section 120 retrieves from the backup information storage section 122 a device identification that is identical to the one received.

Figure 20:
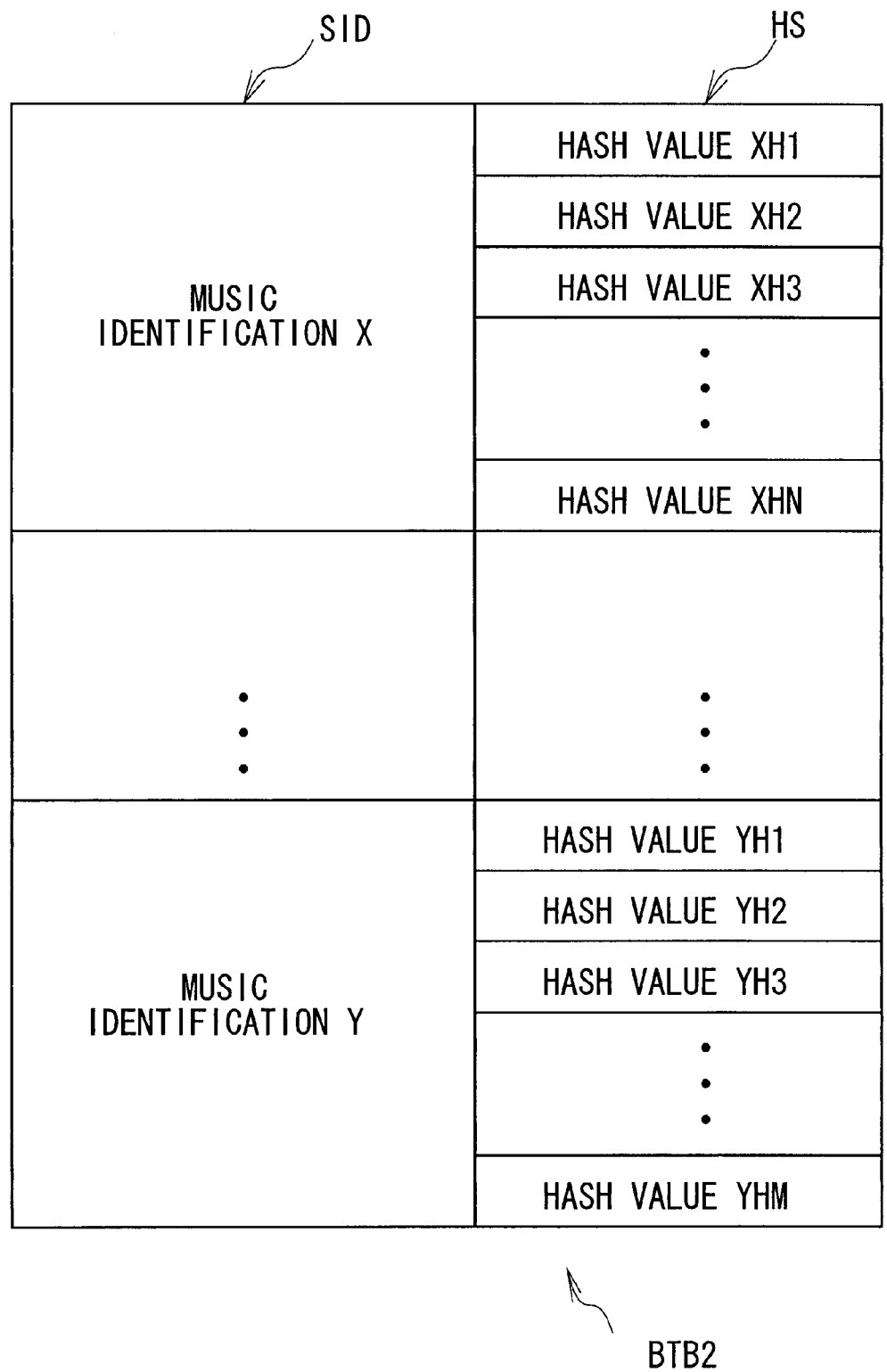
FIG. 20 is a schematic diagram illustrating the configuration of a backup information table.

The control section 120 then stores in the backup information storage section 122 the hash value HS such that it is associated with the retrieved device identification. In this manner, as shown in FIG. 20, the control section 120 produces in the backup information storage section 122 a backup information table BTB2 that associates the device identification of each backup request device 101A to 101AN and the corresponding hash value HS. In this manner, the hash values HS are registered in the backup information table BTB2 for the backup of the backup target files.

When receiving a hash value HS and a device identification SID along with a piece of backup request information, the control section 120 also transmits the hash value HS and the device identification SID to a judgment section 123. The judgment section 123 retrieves from the correlation table TL stored in the correlation table storage section 121 a piece of data quality information DQ corresponding to the hash value HS supplied from the control section 120 (or a piece of data quality information DQ corresponding to the backup target file for which backup was requested). The judgment section 123 judges whether the backup target file for which backup was requested was provided from a radio station, based on the piece of data quality information DQ retrieved. If the judgment section 123 recognizes that the backup target file does not come from a radio station, then it transmits the result of judgment to the control section 120 along with the hash value HS and the device identification SID.

If the judgment section 123 determines that the backup target file does not come from a radio station, the control section 120 just stores the hash value HS in the backup information storage section 122 for the backup of the backup target file. The control section 120 then retrieves from the correlation table TL stored in the correlation table storage section 121 a music identification MID corresponding to the hash value HS supplied from the judgment section 123. And the control section 120 generates a piece of backup completion notification information that includes the music identification MID to inform that the backup of the backup target file corresponding to the music identification MID has been completed.

By the way, the control section 120 previously memorizes pieces of address information that indicates network addresses of the backup request devices 101A to 101AN such that each is associated with a corresponding device identification SID. Accordingly, based on a piece of address information corresponding to the device identification SID supplied from the judgment section 123, the control section 120 controls the transmission section 65 to transmit via the network 32 the piece of backup completion notification information to the one of the backup request devices 101A to 101AN that requested backup.

If the judgment section 123 determines that the source of a backup target file is a radio station, the judgment section 123 retrieves from the correlation table TL stored in the correlation table storage section 121 a music identification MID corresponding to the hash value HS supplied from the control section 120. Based on the retrieved music identification MID, the judgment section 123 checks if a piece of difference data that is associated with both the music identification MID and the piece of data quality information DQ is stored in the backup data storage section 61. If the judgment section 123 determines that the piece of difference data is not stored in the backup data storage section 61, the judgment section 123 transmits to the control section 120 the result of checking along with the hash value HS and the device identification SID.

If the judgment section 123 determines that the backup data storage section 61 does not have a piece of difference data corresponding to a backup target file whose source is a radio station, the control section 120 retrieves from the correlation table TL stored in the correlation table storage section 121 a music identification MID corresponding to the hash value HS supplied from the judgment section 123. The control section 120 subsequently generates a piece of acquisition request information that includes the retrieved music identification MID to request the acquisition of the backup target file. Following a piece of address information corresponding to the device identification SID supplied from the judgment section 123, the control section 120 controls the transmission section 65 to transmit via the network 32 the piece of acquisition request information to one of the backup request devices 101A to 101AN that requested backup.

In response, the backup request device 101A to 101AN that has received the piece of acquisition request information transmits via the network 32 the backup target file whose source is a radio station, along with the corresponding music identification MID. The control section 120 receives the backup target file and the music identification MID through the receiving section 63 and supplies them to a difference data generation section 66.

Accordingly, the backup data generation section 66 generates a piece of difference data by calculating the difference between the backup target file and a corresponding piece of backup data, and transmits the piece of difference data to the control section 120 along with the music identification MID.

After receiving the piece of difference data and the music identification MID from the difference data generation section 66, the control section 120 retrieves from the correlation table TL stored in the correlation table storage section 121 a piece of data quality information DQ corresponding to the music identification MID. The control section 120 then transmits the piece of difference data to the backup data storage section 61 along with the piece of data quality information DQ and the music identification MID. And the control section 120 retrieves from the backup data storage section 61 a music identification MID that is identical to the music identification MID. The control section 120 therefore stores the piece of difference data in the backup data storage section 61 such that it is associated with the retrieved music identification MID and the piece of data quality information DQ.

In this manner, for the backup of a backup target file, the control section 120 just stores in the backup data storage section 61 a corresponding piece of difference data and a corresponding piece of data quality information DQ. The control section 120 subsequently produces, in the same way as described above, a piece of backup completion notification information that includes a music identification MID corresponding to the backup target file (or piece of data clipped from the radio program data) which has been backed up. In the same way as described above, the control section 120 then controls the transmission section 65 to transmit the piece of backup completion notification information via the network 32 to one of the backup request devices 101A to 101AN that requested backup.

If the judgment section 123 determines that the piece of difference data corresponding to the backup target file whose source is a radio station has already been stored in the backup data storage section 61 along with the music identification MID and the piece of data quality information DQ, the control section 120 determines the backup has already been made. Based on the hash value HS and device identification SID supplied from the judgment section 123, in the same way as described above, the control section 120 generates a piece of backup completion notification information. The control section 120 then controls the transmission section 65 to transmit the piece of backup completion notification information via the network 32 to one of the backup request devices 101A to 101AN that requested backup.

In this manner, when the backup of a backup target file or piece of music data is requested from the backup request devices 101A to 101AN, the control section 120 performs a backup process by storing, instead of the backup target file or piece of music data, a piece of difference data and a hash value HS. This reduces the amount of data to be stored for backup.

On the other hand, when the backup request device 101A to 101AN transmits via the network 32 a piece of restore request information along with the device identification SID, the control section 120 receives them through the receiving section 63 and reads out from the backup information storage section 122 all the hash values HS associated with the device identification SID.

The control section 120 then regards the total number of the hash values HS read out from the backup information storage section 122 as a total number of backup target files to be restored in the target backup request device 101A to 101AN. The control section 120 generates a piece of data total number notification information indicating the total number of backup target files and then controls the transmission section 65 to transmit it via the network 32 to the backup request device 101A to 101AN. In addition, the control section 120 transmits the hash values HS read out from the backup information storage section 122 to the judgment section 123.

When receiving the hash values HS from the control section 120, the judgment section 123 retrieves the music identifications MID and pieces of data quality information DQ corresponding to the hash values HS from the correlation table TL stored in the correlation table storage section 121. The judgment section 120 subsequently checks whether they (or the backup target files for which restoring is requested) include a backup target file or piece of data whose source is a radio station, based on the retrieved pieces of data quality information DQ. If there is, among the backup target files for which restoring is requested, a backup target file or piece of data whose source is a radio station, the judgment section 123 transmits to a data generation section 67 a music identification MID and piece of data quality information DQ corresponding to the backup target file whose source is a radio station.

When receiving the music identification MID and the piece of data quality information DQ from the judgment section 123, the data generation section 67 reads out from the backup data storage section 61 a piece of backup data corresponding to the music identification MID. In addition, the data generation section 67 reads out from the backup data storage section 61 a piece of difference data corresponding to both the piece of data quality information DQ and the music identification MID. The data generation section 67 adds the piece of difference data to the piece of backup data to produce an original piece of data or an original backup target file. Each time the backup target file is restored, the data generation section 67 transmits it to the control section 120 along with a corresponding music identification MID and a corresponding piece of data quality information DQ.

On the other hand, if there is, among the backup target files for which restoring is requested, a backup target file or piece of data whose source is not a radio station, the judgment section 123 transmits to a comparison section 124 a hash value HS corresponding to the backup target file.

When receiving the hash value HS from the judgment section 123, the comparison section 124 retrieves from the correlation table TL stored in the correlation table storage section 121 a music identification MID and piece of data quality information DQ corresponding to the hash value HS. The comparison section 124 then reads out from the backup data storage section 61 a piece of data quality information associated with a piece of backup data corresponding to the retrieved music identification MID. Based on the retrieved piece of data quality information DQ and the piece of data quality information associated with the corresponding piece of backup data, the comparison section 124 compares the data quality of the backup target file (for which restoring is requested) with the corresponding piece of backup data.

If the comparison section 124 determines that the data quality of the backup target file is the same as the piece of backup data, it transmits the result of comparison to a data processing section 69 along with the corresponding music identification MID. Whereas if the comparison section 124 determines that the data quality of the backup target file is lower than the piece of backup data, it transmits the result of comparison to the data processing section 69 along with the corresponding music identification MID and the corresponding piece of data quality information DQ.

The data processing section 69 receives the result of comparison from the comparison section 124 along with the music identification MID. If the data processing section 69 recognizes from the result of comparison that the data quality of the backup target file is the same as the piece of backup data, it reads out from the backup data storage section 61 a piece of backup data corresponding to the music identification MID (or a piece of data whose quality is the same as the backup target file). And the data processing section 69 regards the piece of backup data as the backup target file.

If the data processing section 69 recognizes from the result of comparison that the data quality of the backup target file is lower than the piece of backup data after also receiving from the comparison section 124 the piece of data quality information DQ, it reads out from the backup data storage section 61 a piece of backup data corresponding to the music identification MID (or a piece of data whose quality is higher than the backup target file). The data processing section 69 then processes the piece of backup data in accordance with the piece of data quality information DQ to generate a backup target file or piece of data whose quality matches the piece of data quality information DQ. Each time a backup target file or piece of data is restored from a piece of backup data, the data processing section 69 transmits it to the control section 120 along with a corresponding music identification MID and a corresponding piece of data quality information DQ.

When receiving a backup target file or piece of data restored from the data generation section 67 or data processing section 69 along with a corresponding music identification MID and a corresponding piece of data quality information DQ, the control section 120 reads out from the backup data storage section 61 a piece of music related information corresponding to the music identification MID. The control section 120 then controls the transmission section 65 to transmit the backup target file or piece of data restored via the network 32 to the backup request device 101A to 101AN that requested restoring, along with the corresponding piece of music related information.

In this manner, the control section 120 keeps transmitting, to the backup request device 101A to 101AN that requested restoring, backup target files along with the corresponding pieces of music related information until the number of backup target files it has transmitted reaches the total number that it had already informed. In this manner, the original pieces of music data can be restored in the backup request device 101A to 101AN that requested restoring.

FIGS. 21A and 21B (in which parts have been designated by the same reference numerals and symbols as the corresponding parts of FIGS. 10A and 10B) are flowcharts illustrating a third backup request execution process, in which the backup device 102 performs the backup of backup target files in concert with the backup request devices 101A1 to 101AN. When a user operates the operation section 41 to input a switch-off command, the control section 110 of the backup request device 101A1 to 101AN starts a procedure RT6 of second backup request process as shown in FIG. 21A.

The control section 110 of the backup request device 101A1 to 101AN subsequently, at step SP1, checks whether there is a backup target file or piece of music data left which has not been backed up yet. If the affirmative result is obtained at step SP1, the control section 110 proceeds to next step SP61.

At step SP61, the control section 110 reads out from the attribute information storage section 111 a music identification MID corresponding to the backup target file which has not been backed up yet. The control section 110 also reads out from the content storage section 43 a piece of music data corresponding to the music identification MID and extracts a part of it as a backup-target portion.

Based on the backup-target portion, the calculation section 112 calculates a hash value HS and then regards the hash value HS as a piece of backup information for each backup target file. The control section 110 also reads out from the identification information storage section 51 the device identification SID. The control section 110 then controls the transmission section 44 to transmit the hash value HS and the device identification SID to the backup device 102 along with a piece of backup request information, and proceeds to step SP3.

After completing the processes of step SP3 to SP5, the control section 110 proceeds to step SP62 to end the procedure RT6 of second backup request process. By the way, if the negative result is obtained at step SP1, the control section 110 proceeds to step SP62 to end the procedure RT6 of second backup request process.

After establishing the communication connection with the backup request device 101A1 to 101AN, the control section 120 of the backup device 102 starts a procedure RT7 of third backup process as shown in FIG. 21B. The control section 120 subsequently, at step SP71, receives through the receiving section 63 from the backup request device 101A1 to 101AN the hash value HS, the device identification SID and the piece of backup request information. The control section 120 then transmits the hash value HS and the device identification SID to the backup information storage section 122, which then stores them such that the hash value HS is associated with the device identification SID. The control section 120 subsequently proceeds to step SP12.

The control section 120 performs the subsequent processes (step SP12 to SP15) in the same way as the above-noted procedure RT2 of first backup process except that it uses the hash value HS and the correlation table TL stored in the correlation table storage section 121. After that, the control section 120 proceeds to step SP72 to end the procedure RT7 of third backup process. In that manner, the backup request device 101A1 to 101AN and the backup device 102 complete the third backup request execution process.

Figure 22:
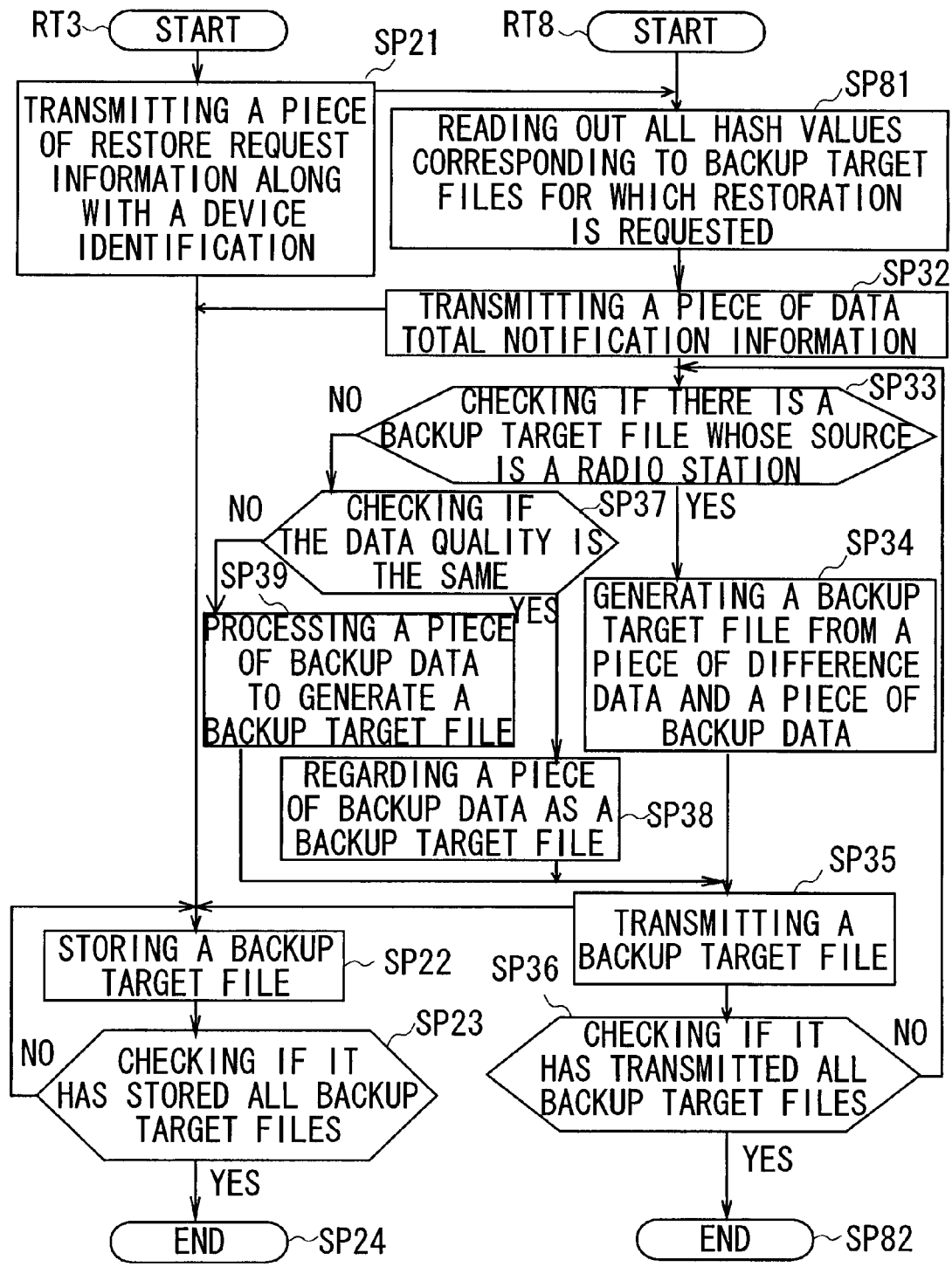
FIGS. 22A and 22B are flowcharts illustrating the procedure of a second restore request execution process.

FIGS. 22A and 22B (in which parts have been designated by the same reference numerals and symbols as the corresponding parts of FIGS. 11A and 11B) are flowcharts illustrating a second restore request execution process, in which the backup request device 101A1 to 101AN and the backup device 102 restore the backup target files. After establishing the communication connection with the backup request device 101A1 to 101AN, the control section 120 of the backup device 102 starts a procedure RT8 of second restore process as shown in FIG. 22B.

After starting the procedure RT8 of second restore process, the control section 120 of the backup device 102 at step SP81 receives through the receiving section 63 the device identification SID and the piece of restore request information from the backup request device 101A1 to 101AN. The control section 120 subsequently reads out from the backup information storage section 122 all the hash values HS corresponding to the device identification SID, and then proceeds to step SP32.

The control section 120 performs the subsequent processes (step SP33 to SP38) in the same way as the above-noted procedure RT4 of first restore process except that it uses the hash value HS and the correlation table TL stored in the correlation table storage section 121. After that, the control section 120 proceeds to step SP82 to end the procedure RT8 of second restore process. In that manner, the backup request device 101A1 to 101AN and the backup device 102 complete the second restore request execution process.

(3-2) Operation and Effect of Second Embodiment

As described above, the backup device 102 of the backup system 100 has stored in the backup data storage section 61 a highest-data-quality piece of music data for each piece of music as backup data, such that each is associated with a corresponding music identification MID. In addition, the backup device 102 stores in the correlation table storage section 121 a correlation table TL in which a music identification MID, a hash value HS calculated from a corresponding piece of music data, and a piece of data quality information DQ indicating the data quality of the piece of music data are associated with one another.

Before requesting backup, the backup request device 101A1 to 101AN of the backup system 100 regards the pieces of music data stored in the content data storage section 43 as backup target files, and performs one-directional hash calculation to a part of the backup target file to obtain a hash value HS, which can be associated with a corresponding piece of data quality information DQ and music identification MID, as a piece of backup information. The backup request device 101A1 to 101AN transmits to the backup device 102 the hash value HS along with the device identification SID.

After receiving the hash value HS along with the device identification SID from the backup request device 101A1 to 101AN, the backup device 102 stores in the backup information storage section 122 the hash value HS such that it is associated with the device identification SID.

Accordingly, in the same way as the above-noted first embodiment, the backup device 102 of the backup system 100 has stored a highest-data-quality piece of music data for each piece of music as backup data, and also stores the hash values acquired from the backup request devices 101A to 101AN. Even though the hash value HS is much smaller than a piece of backup data in data size, the backup device 102 can restore different data qualities of music data from them.

By the way, if a piece of data quality information DQ and a music identification MID are used as a piece of backup information, other people can easily use someone's music identification MID and piece of data quality information DQ to acquire a piece of music data they have not purchased or to restore a higher-data-quality piece of music data they are not allowed to access. By contrast, in the backup system 100 of the second embodiment, the backup request devices 101A to 101AN use a hash value, which is associated with a corresponding piece of data quality information DQ and music identification MID, as a piece of backup information.

The hash value HS cannot be known to other people unless their backup request devices 101A to 101AN actually have the corresponding piece of music data, from which the hash value HS can be produced. In addition, the piece of data quality information DQ and the music identification MID cannot be directly extracted from the hash value HS. Accordingly, the hash value HS is strictly linked to the piece of music data each of the backup request devices 101A to 101AN is entitled to keep. Therefore, the backup system 100 can prevent other people from changing the pieces of backup information. Thus, the backup system 100 can prevent other people from acquiring a piece of music data they have not purchased or restoring a higher-data-quality piece of music data they are not allowed to access.

According to the above configuration, the backup device 102 of the backup system 100 has stored in the backup data storage section 61 a highest-data-quality piece of music data for each piece of music as backup data, such that each is associated with a corresponding music identification MID. In addition, the backup device 102 stores in the correlation table storage section 121 a correlation table TL in which a music identification MID, a hash value HS calculated from a corresponding piece of music data, and a piece of data quality information DQ indicating the data quality of the piece of music data are associated with one another. When receiving from the backup request device 101A1 to 101AN the hash value HS (which is associated with the piece of data quality information DQ and the music identification MID) along with the device identification SID, the backup device 102 stores in the backup information storage section 122 the hash value HS such that it is associated with the device identification SID. This offers the same effect as the above-noted first embodiment. In addition, the hash value HS is strictly linked to the piece of music data each of the backup request devices 101A to 101AN is entitled to keep. This can prevent other people from misusing the backup system 100.

(3-3) Other Embodiments

In the above-noted second embodiment, when receiving a restore request from the backup request device 101A1 to 101AN, the backup device 102 restores a corresponding backup target file (or a piece of music data). However, the present invention is not limited to this. The backup device 102 may automatically restore a backup target file after a predetermined period of time (a backup period). Therefore, in the backup system 100, a user can enjoy the pieces of music data stored in the content data storage section 43 of the backup request device 101A1 to 101AN without being worried about the weakening of magnetization of the content data storage section 43.

Moreover, in the above-noted second embodiment, when receiving a restore request from the backup request device 101A1 to 101AN, the backup device 102 restores all backup target files at once. However, the present invention is not limited to this. The control section 110 of the backup request device 101A1 to 101AN may select backup target files to be restored, or allow a user to choose those to be restored. This is effective when only a few pieces of music data become unavailable in the content data storage section 43 of the backup request device 101A1 to 101AN, because restoring a few pieces of music data does not increase the processing load so much compared to restoring all pieces of music data.

Furthermore, in the above-noted second embodiment, the attribute information storage section 111 of the backup request device 101A1 to 101AN stores the attribute information table ATB2 illustrated in FIG. 17. However, the present invention is not limited to this. The attribute information storage section 111 of the backup request device 101A1 to 101AN may instead store an attribute information table that lists only a music identification MID for each piece of music data that has been stored in the content data storage section 43 during a period of time from when the backup request device 101A1 to 101AN starts running until a switch-off command is input; and the corresponding music identifications MID will be removed from the attribute information table after the backup target files indicated by the attribute information table have been backed up. Accordingly, with this kind of attribute information table, the pieces of music data that have not been backed up yet can be easily recognized. In addition, when they are bucked up, the backup request device 101A1 to 101AN does not have to update the corresponding pieces of backup completion information BUE. This simplifies the backup request process and decreases the processing load.

Furthermore, in the above-noted second embodiment, the backup device 102 is designed to acquire from the backup request device 101A1 to 101AN a backup target file whose source is a radio station for backup. However, the present invention is not limited to this. Alternatively, the backup device 102 may be equipped with a data processing and radio receiving sections, which are the same configuration as the data processing section 42B and the radio receiving section 47 of the backup request device 101A1 to 101AN; and the backup device 102 may clip all pieces of music data from radio program data broadcast from all radio stations and store those various qualities of music data, and the pieces of difference data generated by calculating the differences between the acquired pieces of music data and the corresponding pieces of backup data, along with the corresponding pieces of data quality information DQ.

In addition to that, the backup device 102 may be equipped with a calculation section whose configuration is the same as the calculation section 112 of the backup request devices 101A to 101AN. By acquiring a highest-data-quality piece of music data from the outside, the control section 120 may generate a correlation table TL based on the pieces of music data and hash values acquired by the processes of the data processing section and the calculation section, and then store it in the correlation table storage section 121.

Furthermore, in the above-noted second embodiment, before requesting backup, the backup request device 101A to 101AN calculates a hash value HS from a backup target file. However, the present invention is not limited to this. The backup request device 101A to 101AN may calculate a hash value from a piece of music data when the backup request device 101A to 101AN stores the piece of music data, and then writes the hash value for example in a attribute information table such that it is associated with a corresponding music identification MID. This reduces the processing load when the backup request device 101A to 101AN requests backup.

Furthermore, in the above-noted second embodiment, the backup data storage section 61 of the backup device 102 previously stores a highest-data-quality piece of music data for each piece of music as backup data. However, the present invention is not limited to this. Alternatively, each time when a higher-data-quality piece of music data is supplied in response to a backup request from the backup request device 101A1 to 101AN, the backup device 102 may replace the lower-data-quality piece of music data stored in the backup data storage section 61 with the supplied higher-data-quality one.

Figure 23:
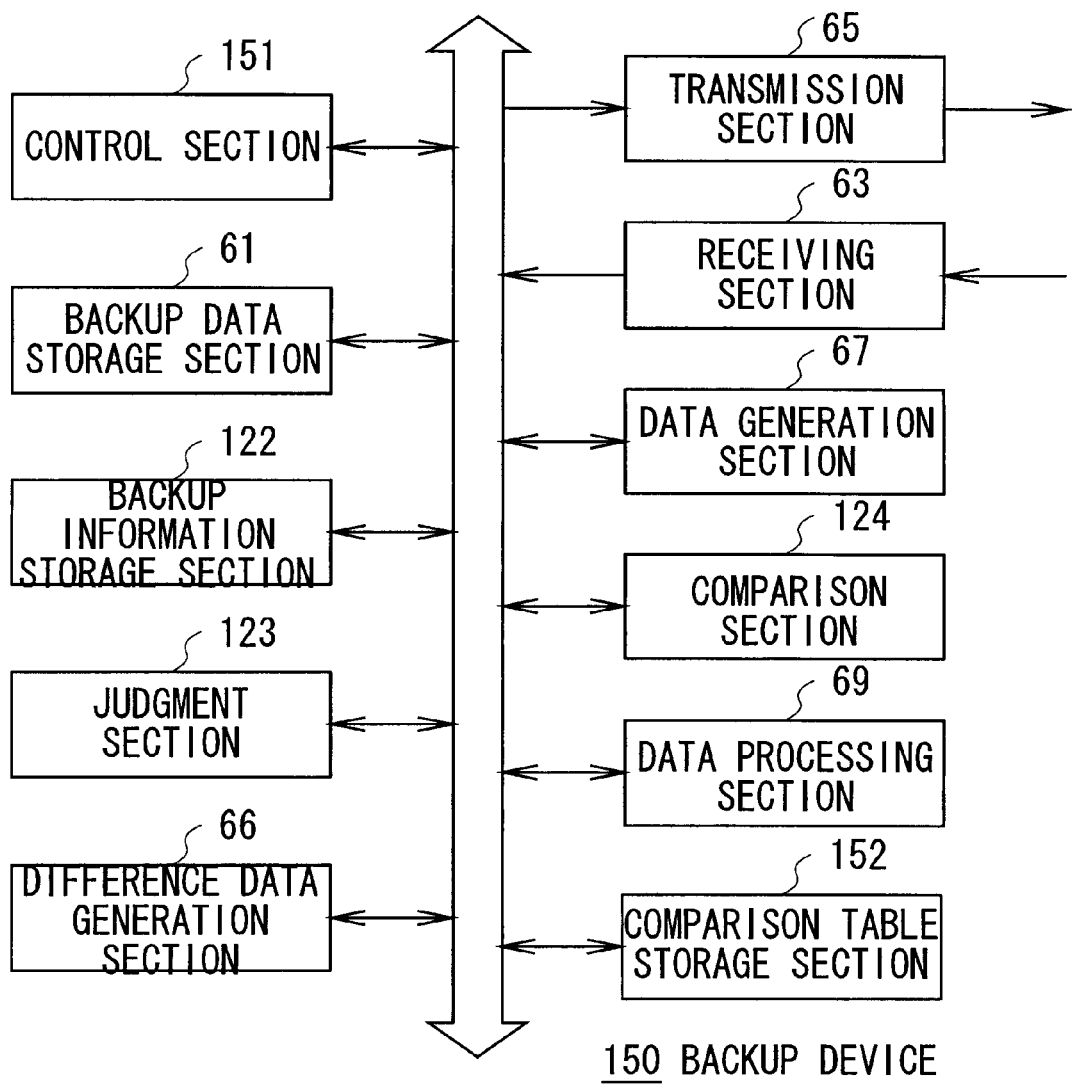
FIG. 23 is a block diagram illustrating the hardware circuit configuration of a backup device according to another embodiment of the present invention, by using functional circuit blocks.

The following describes how a backup device stores a backup target file as backup data. As shown in FIG. 23 whose corresponding parts have been designated by the same reference numerals and symbols as the corresponding parts of FIG. 18, a control section 151 of a backup device 150 stores in a correlation table storage section 152 a correlation table that lists a hash value HS of each piece of music and a piece of data quality information DQ of each piece of music in order of data quality.

Figure 21:
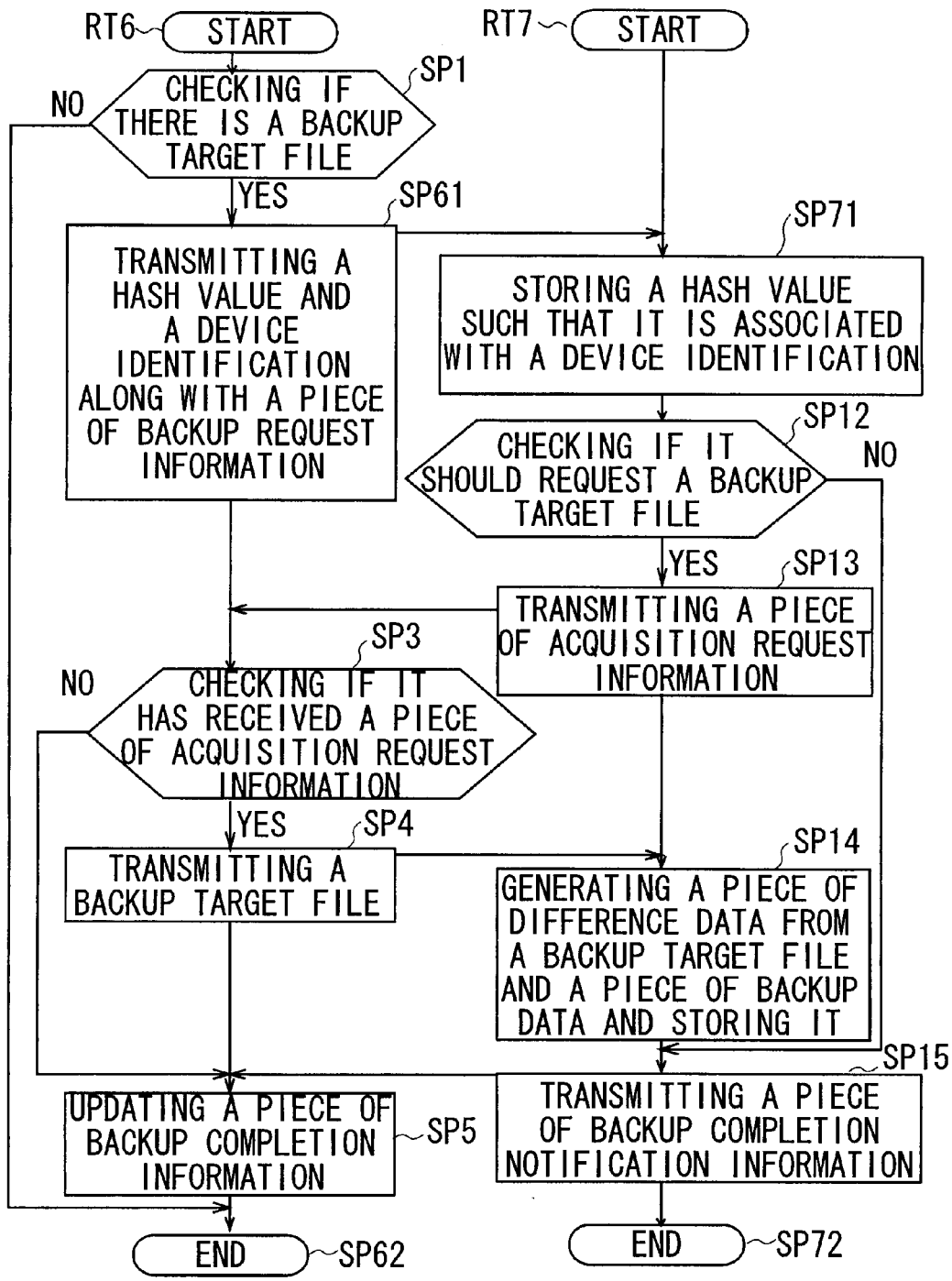
FIGS. 21A and 21B are flowcharts illustrating the procedure of a third backup request execution process.
Figure 24:
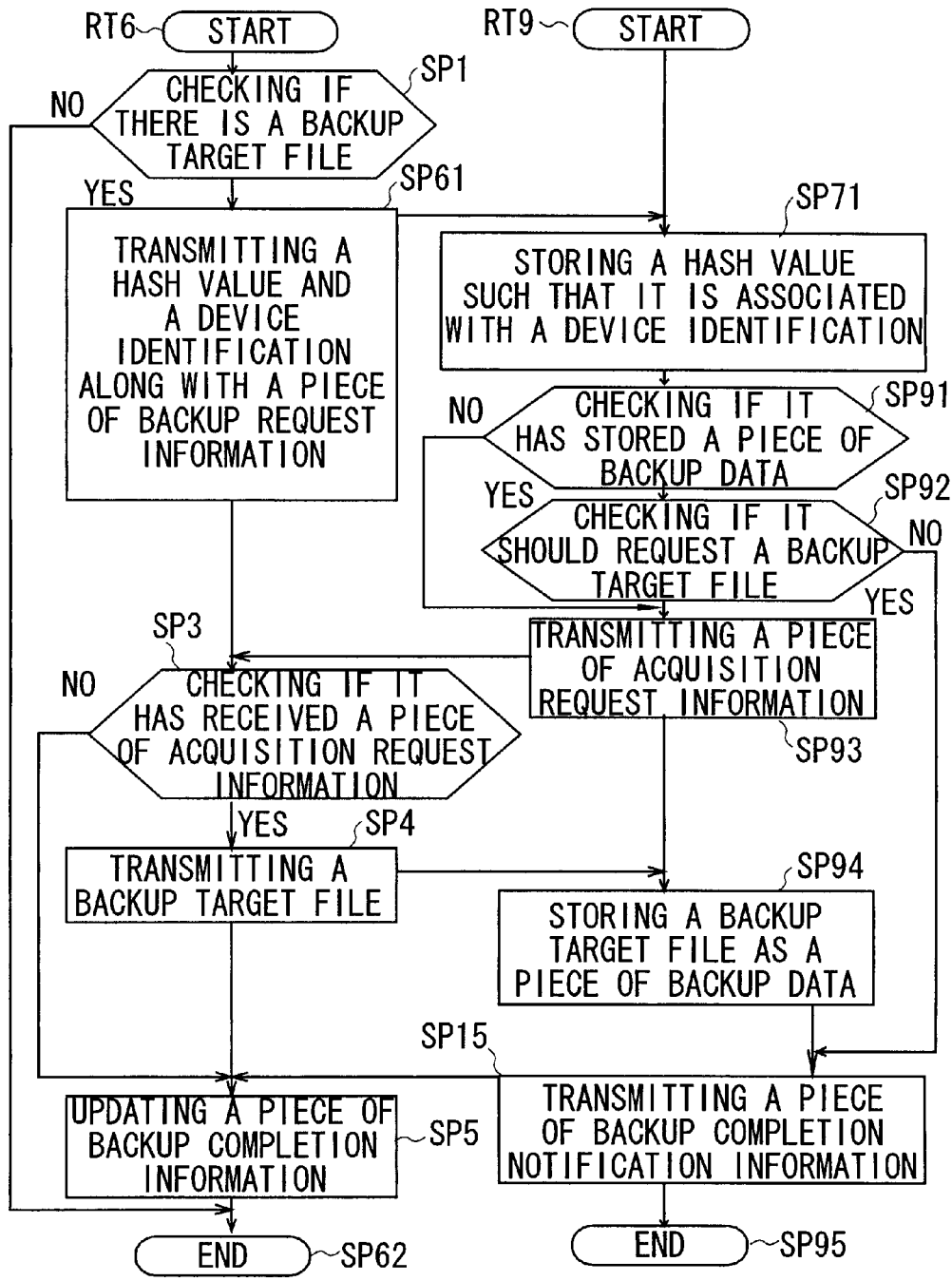
FIGS. 24A and 24B are flowcharts illustrating the procedure of a fourth backup request execution process.

Following a procedure RT9 of fourth backup request process illustrated in FIGS. 24A and 24B whose parts have been designated by the same reference numerals and symbols as the corresponding parts of FIG. 21, the control section 151 of the backup device 150 starts a procedure RT9 (FIG. 24B) after establishing the communication connection with the backup request device 101A1 to 101AN. The control section 151 of the backup device 150 proceeds to step SP91 after completing the process of step SP71.

At step SP91, the control section 151 retrieves from the correlation table stored in the correlation table storage section 152 a music identification MID corresponding to the hash value HS received. The control section 151 checks if the backup data storage section 61 keeps a piece of backup data corresponding to the music identification MID retrieved. If the negative result is obtained at step SP91, then it means that the backup data storage section 61 does not have the piece of backup data (regardless of its data quality) because it is the first time for the backup device 150 to receive a backup request for the backup target file (or piece of music data). In this case, the control section 151 skips the process of step SP92 and proceeds to step SP93.

Whereas if the affirmative result is obtained at step SP91, then it means that the backup data storage section 61 already keeps a highest-data-quality piece of music data as the piece of backup data (the one corresponding to the music identification MID retrieved) because the backup of the backup target file (or backup target files), whose source is not a radio station and which corresponds to the music identification MID retrieved, had already been requested. In this case, the piece of backup data stored in the backup data storage section 61 is associated with the corresponding music identification MID.

By the way, even if the backup data storage section 61 has already kept a piece of backup data or backup target file whose source is not a radio station, the control section 151 is designed to replace it with a higher-data-quality piece of backup data (whose source is not a radio station) when its backup is requested. Accordingly, even if the control section 151 stores in the backup data storage section 61 a piece of backup data whose source is not a radio station and which does not have the highest data quality, the control section 151 keeps various qualities of backup target files whose sources are radio stations as backup data until it stores a highest-data-quality piece of backup data whose source is not a radio station.

Accordingly, the above affirmative result also means that a backup target file of a certain quality, which corresponds to the music identification MID retrieved and whose source is a radio station, has been already stored as backup data. Thus, after obtaining the affirmative result, the control section 151 proceeds to step SP92.

At step 92, the control section 151 checks if it should request the acquisition of a backup target file corresponding to the hash value HS from the backup request device 101A1 to 101AN that requested backup. If the affirmative result is obtained at step SP92, then it means that the backup data storage section 61 has already stored a piece of backup data which corresponds to the music identification MID retrieved by the hash value HS and whose source is not a radio station; but after the comparison section 124, based on the correlation table stored in the correlation table storage section 152, compares the data quality of the backup target file, for which backup was requested and whose source is not a radio station, with the data quality of a corresponding piece of backup data, it is revealed that the data quality of the backup target file is higher than the piece of backup data.

In addition, the above affirmative result also means that the source of the backup target file, for which backup was requested, is a radio station; and that the backup data storage section 61 has not stored a piece of backup data identical to the backup target file (or a piece of backup data whose data quality is the same as the backup target file and whose source is a radio station). In this case, the control section 151 proceeds to step SP93.

At step SP93, the control section 151 controls the transmission section 65 to transmit a piece of acquisition request information containing the music identification MID retrieved to the backup request device 101A1 to 101AN that requested backup, and then proceeds to step SP94. In response, the backup request device 101A1 to 101AN transmits a backup target file and a corresponding music identification MID, and the control section 151 at step SP94 receives them through the receiving section 63. The control section 151 stores in the backup data storage section 61 the backup target file as backup data such that it is associated with the music identification MID. The control section 151 subsequently performs the process of step SP15 and then proceeds to step SP95 to end the procedure RT9 of fourth backup process. In that manner, the backup device 150 completes the fourth backup request process in concert with the backup request device 101A1 to 101AN.

By the way, if the control section 151 at step SP94 has not stored in the backup data storage section 61 backup data of any data quality which corresponds to the music identification MID retrieved yet, it stores a backup target file, which was acquired from the backup request device 101A1 to 101AN, as backup data. The control section 151 also stores in the backup data storage section 61 a piece of data quality information DQ, which was retrieved based on the hash value HS from the correlation table stored in the correlation table storage section 152, such that it is associated with the piece of backup data.

Whereas if the control section 151 at step SP94 has already stored in the backup data storage section 61 a backup target file or piece of backup data, which corresponds to the music identification MID retrieved and whose source is not a radio station, the control section 151 replaces the piece of backup data with a backup target file, which was acquired from the backup request device 101A1 to 101AN at this time, as new backup data because its data quality is higher than that piece of backup data and its source is not a radio station. The control section 151 also stores in the backup data storage section 61 a new corresponding piece of data quality information DQ such that it is associated with the new piece of backup data.

Whereas if the control section 151 at step SP94 has already stored in the backup data storage section 61 a piece of backup data that corresponds to the music identification MID retrieved but has yet to store a backup target file for which backup was requested and whose source is a radio station, the control section 151 stores, along with the existing piece of backup data, a backup target file, which was acquired from the backup request device 101A1 to 101AN at this time and whose source is a radio station, as a piece of backup data. The control section 151 also associates it with the music identification MID and a corresponding piece of data quality information DQ in the backup data storage section 61.

By the way, if the control section 151 has already stored in the backup data storage section 61 a highest-data-quality piece of backup data (whose source is not a radio station) for each piece of music, it is designed to store, in the same way as described in the second embodiment, a piece of difference data, when the backup of a piece of music data whose source is a radio station is requested, by calculating the difference between it and a highest-data-quality piece of backup data. In that manner, the control section 151 had first stored in the backup data storage section 61 a piece of difference data by calculating the difference between a piece of backup data (or music data) whose source is not a radio station and a lower-data-quality piece of backup data whose source is a radio station; and then the control section 151 replaces the lower-data-quality piece of backup data with a higher-data-quality piece of backup data. This allows the piece of difference data to be restored to be the same as the original backup target file.

By the way, if the negative result is obtained at step SP92, then it means that, after the comparison section 124, based on the correlation table stored in the correlation table storage section 152, compares the data quality of the backup target file, for which backup was requested and whose source is not a radio station, with the data quality of a corresponding piece of backup data (or the one whose source is not a radio station), it is revealed that the data quality of the backup target file is less than or equal to the piece of backup data.

In addition, the above negative result also means that the source of the backup target file, for which backup was requested, is a radio station; and that the backup data storage section 61 has already stored a piece of backup data identical to the backup target file (or a piece of backup data whose data quality and source are the same as the backup target file). In this case, the control section 151 proceeds to step SP15.

With the above configuration, the backup device 150 only makes backup copies of backup target files the backup request devices 101A1 to 101AN requested to backup. Accordingly, the backup device 150 can efficiently use storage space because it does not store pieces of music data (as backup data) that the backup request devices 101A1 to 101AN have not acquired yet. Thus, the backup device 150 can back up various qualities of music data (as backup target files) more efficiently than the above-noted second embodiment.

(4) Third Embodiment

Figure 25:
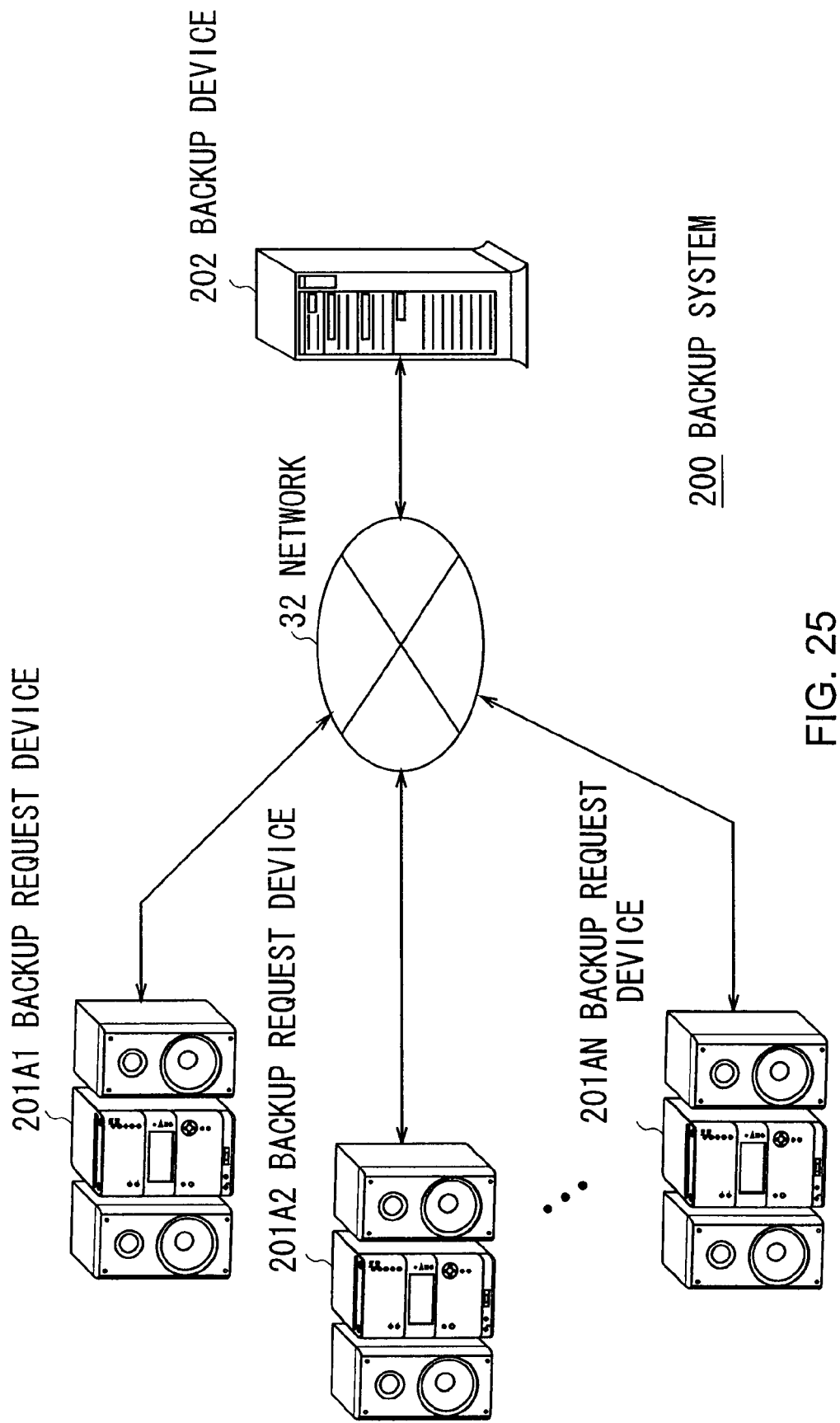
FIG. 25 is a block diagram illustrating the configuration of a backup system according to a third embodiment of the present invention.

With reference to FIG. 25, the following describes a backup system 200 according to a third embodiment of the present invention. The backup system 200 has a plurality of backup request devices 201A to 201AN, which are the equivalent of audio components and are used by different users. The backup request devices 201A to 201AN can communicate with a backup device 202, which works as a server, via a network 32.

Figure 26:
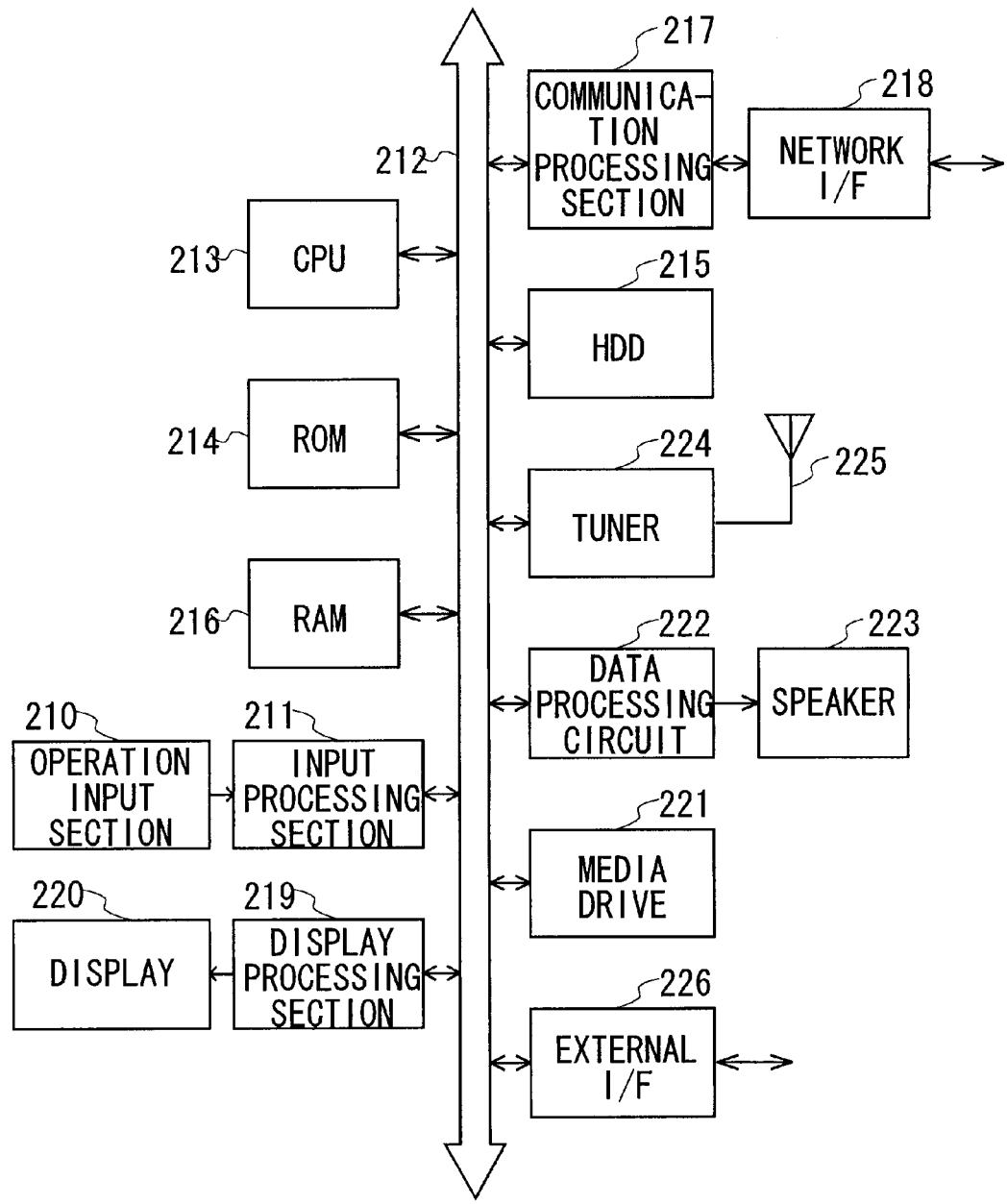
FIG. 26 is a block diagram illustrating the hardware circuit configuration of a backup request device by using functional circuit blocks.

Since the backup request devices 201A to 201AN have the same structure in this case, one of them, the backup request device 201A1, will be described with reference to FIG. 26, which illustrates its hardware circuit configuration by using hardware circuit blocks. Since the other backup request devices 201A2 to 201AN have the same circuit configuration, they will not be described.

The backup request device 201A has an operation input section 210 that has various operation keys on the surface of the backup request device 201A or on a remote controller. When a user operates the operation input section 210, the operation input section 210 recognizes it and transmits an operation input signal to an input processing section 211. The input processing section 211 performs a predetermined process to the operation input signal to convert it into an operation command, which is then supplied to a Central Processing Unit (CPU) 213 via a bus 212.

The CPU 213 reads out from a Read Only Memory (ROM) 214 or a hard disk drive 215 a basic program, an application program or the like and loads it onto a Random Access Memory (RAM) 216 via the bus 212. The CPU 213 then takes overall control of the device in accordance with the program loaded on the RAM 216. In addition, the CPU 213 performs a predetermined arithmetic process or other processes in accordance with the operation command supplied from the input processing section 211.

The CPU 213 therefore connects to the network 32 via a communication processing section 217 and a network interface 218 and accesses various devices on the network 32, such as the backup device 202 or a music data delivery device. When a user inputs through the operation input section 210 an operation input signal that requests the acquisition of music introduction screen data or music purchase screen data, the CPU 213 requests them from the music data delivery device by accessing it.

When the music data delivery device transmits the music introduction screen data or the music purchase screen data via the network 32, the CPU 213 receives them through the network interface 218 and the communication processing section 217. The CPU 213 then supplies the music introduction screen data or the music purchase screen data to a display processing section 219, which then displays a music introduction screen or a music purchase screen on a display 220.

With the display 220 displaying the music purchase screen, a user may choose a piece of music on the music purchase screen by controlling the operation input section 210. In this case, the CPU 213 transmits, through the communication processing section 217 and the network interface 218, a piece of music purchase request information to the music data delivery device via the network 32. When the music data delivery device transmits the piece of music data and a corresponding piece of music related information via the network 32, the CPU 213 receives them through the network interface 218 and the communication processing section 217. The CPU 213 then supplies the piece of music data and the piece of music related information to the hard disk drive 215, which then stores them. In this manner, the CPU 213 allows a user to buy the pieces of music data offered from the music data delivery device.

When a user inputs through the operation input section 210 a operation input signal that requests the playback of a piece of music data recorded on a medium such as a CD, the CPU 213 reads out through a media drive 221 a piece of music data from the medium and transmits it to a data processing circuit 222. The data processing circuit 222 performs a playback process, such as decoding, digital-to-analog conversion and amplification, to the piece of music data supplied from the media drive 221, and then supplies resultant music signals to a speaker 223, which then outputs the sound that the user can listen to.

When a user inputs through the operation input section 210 an operation input signal that requests the recording of a piece of music data from a medium such as a CD, the CPU 213 reads out through the media drive 221 a piece of music data from the medium and transmits it to the data processing circuit 222. The data processing circuit 222 records the piece of music data on the hard disk drive 215 without processing it, or after performing a compression-coding process to it.

When a user inputs through the operation input section 210 an operation input signal to tune in and listen to a radio program broadcast from a radio station, the CPU 213 controls a tuner 224 to extract a target frequency of radio wave from various frequencies of radio wave received by an antenna 225. The tuner 224 then performs a predetermined receiving process, such as demodulation, and then supplies resultant sound signals of the radio program to the data processing circuit 222.

The data processing circuit 222 performs a digital process, such as analog-to-digital conversion and equalizing, to the sound signals supplied from the tuner 224, and then performs an analog process, such as digital-to-analog conversion and amplification, to resultant radio program data. After performing the analog process, the data processing circuit 222 supplies resultant radio program signals to the speaker 223, which then outputs the sound that the user can listen to. In this manner, the CPU 213 allows a user to listen to his desired radio programs.

When a user inputs through the operation input section 210 an operation input signal to tune in and record a radio program broadcast from a radio station, the CPU 213 controls the tuner 224 to extract a target frequency of radio wave from various frequencies of radio wave received by the antenna 225. The tuner 224 then performs a predetermined receiving process and then supplies resultant sound signals of the radio program to the data processing circuit 222.

The data processing circuit 222 performs a digital process to the sound signals supplied from the tuner 224 to generate the radio program data. The data processing circuit 222 then clips a piece of music data from the radio program data. The data processing circuit 222 subsequently compresses and codes the piece of music data and then supplies it to the CPU 213. The CPU 213 transmits the piece of music data (i.e. the one clipped from the radio program data) supplied from the data processing circuit 222 to the hard disk drive 215, which then records it in the hard disk. In this manner, the CPU 213 records a piece of music data that is aired in a radio program.

After an external electronic device is connected to an external interface 226, a user may input through the operation input section 210 an operation input signal that requests the acquisition of a piece of music data. In this case, the CPU 213 receives a piece of music data supplied from the electronic device via the external interface 226. The CPU 213 then transmits the piece of digital music data to the hard disk drive 215, which then records in on the hard disk.

If analog music signals are supplied from the electronic device, the CPU 213 receives them through the external interface 226 and then transmits them to the data processing circuit 222. The data processing circuit 222 performs a digital process to the music signals supplied from the CPU 213, and then transmits a resultant piece of music data to the CPU 213 without processing it or after coding and compressing it. The CPU 213 transmits the piece of music data supplied from the data processing circuit 222 to the hard disk drive 215, which then stores it in the hard disk. In this manner, the CPU 213 records a piece of music data or music signals supplied from an external electronic device.

When a user inputs through the operation input section 210 an operation input signal that selects one of the pieces of music data stored in the hard disk drive 215 for playback, the CPU 213 reads out from the hard disk drive 215 the selected piece of music data and then supplies it to the data processing circuit 222. The data processing circuit 222 performs a playback process, such as decoding, digital-to-analog conversion and amplification, to the piece of music data and then supplies resultant music signals to the speaker 223, which then outputs the sound that the user can listen to.

After performing a program's process (such as recording or playing a piece of music data), the CPU 213 generates a piece of screen data depending on the result of the process, and then supplies it to the display 220 via the display processing section 219, which then displays the screen showing the result of the process. In this manner the CPU 213 can provide a user with various screens (which are for example related to the recording of a piece of music data, the playback of a piece of music data or the like) on the display 220.

By the way, basically, in the backup request devices 201A1 to 201AN, the CPU 213 performs various processes to control hardware circuits in accordance with various programs stored in the ROM 214 or the hard disk drive 215. If the programs stored in the ROM 214 or the hard disk drive 215 are selected in accordance with the functions of the backup request devices 31A1 to 31AN (FIG. 5) so that the backup request devices 201A1 to 201AN can perform the procedure RT1 of first backup request process and the procedure RT3 of first restore request process (i.e. if a backup request program for the procedures RT1 and RT3 is selected), the CPU 213 may work in the same way as the control section 40.

Moreover, in the backup request devices 201A1 to 201AN, the operation input section 210 and the input processing section 211 may work in the same way as the operation section 41; the hard disk drive 215 may work in the same way as the content data storage section 43; the hard disk drive 215 and the RAM 216 may work in the same way as the attribute information storage section 50; and the ROM 214 or the hard disk drive 215 may work in the same way as the identification information storage section 51.

Furthermore, in the backup request devices 201A1 to 201AN, the communication processing section 217 and the network interface 218 may work in the same way as the transmission section 44 and the receiving section 45; the display processing section 219 and the display 220 may work in the same way as the display section 46; the media drive 221 may work in the same way as the readout section 42A; the data processing circuit 222 may work in the same way as the data processing section 42B and the data clipping section 48; the speaker 223 may work in the same way as the output section 42C; the tuner 224 and the antenna 225 may work in the same way as the radio receiving section 47; and the external interface 226 may work in the same way as the input section 49.

If the programs stored in the ROM 214 or the hard disk drive 215 are selected in accordance with the functions of the backup request devices 101A1 to 101AN (FIG. 16) so that the backup request devices 201A1 to 201AN can perform the procedure RT6 of second backup request process and the procedure RT3 of first restore request process (i.e. if a backup request program for the procedures RT6 and RT3 is selected), the CPU 213 may work in the same way as the control section 110 and the calculation section 112.

Moreover, in the backup request devices 201A1 to 201AN, the operation input section 210 and the input processing section 211 may work in the same way as the operation section 41; the hard disk drive 215 may work in the same way as the content data storage section 43; the hard disk drive 215 and the RAM 216 may work in the same way as the attribute information storage section 111; and the ROM 214 or the hard disk drive 215 may work in the same way as the identification information storage section 51.

Furthermore, in the backup request devices 201A1 to 201AN, the communication processing section 217 and the network interface 218 may work in the same way as the transmission section 44 and the receiving section 45; the display processing section 219 and the display 220 may work in the same way as the display section 46; the media drive 221 may work in the same way as the readout section 42A; the data processing circuit 222 may work in the same way as the data processing section 42B and the data clipping section 48; the speaker 223 may work in the same way as the output section 42C; the tuner 224 and the antenna 225 may work in the same way as the radio receiving section 47; and the external interface 226 may work in the same way as the input section 49.

Accordingly, if the programs stored in the ROM 214 or the hard disk drive 215 are selected in accordance with the functions of the backup request devices 31A1 to 31AN and the backup request devices 101A1 to 101AN, the backup request devices 201A1 to 201AN can perform the procedures RT1, RT6 and RT3 and offer the same effects as the above-noted first and second embodiments.

By the way, the backup request program may be previously stored in the ROM 214 or the hard disk drive 215 of the backup request device 201A1 to 201AN. Alternatively, the backup request program may be installed on the ROM 214 or the hard disk drive 215 from program storage media, such as package media (like a flexible disk, CD-ROM (Compact Disc-Read Only Memory), DVD (Digital Versatile Disc)), semiconductor memories and magnetic disks, on which various programs are permanently or temporarily recorded. To store the backup request program in the program storage media, various communication means may be used, such as Local Area Network, the Internet, wired or wireless communication means (such as digital satellite broadcast), and various communication interfaces (such as routers and modems).

Figure 27:
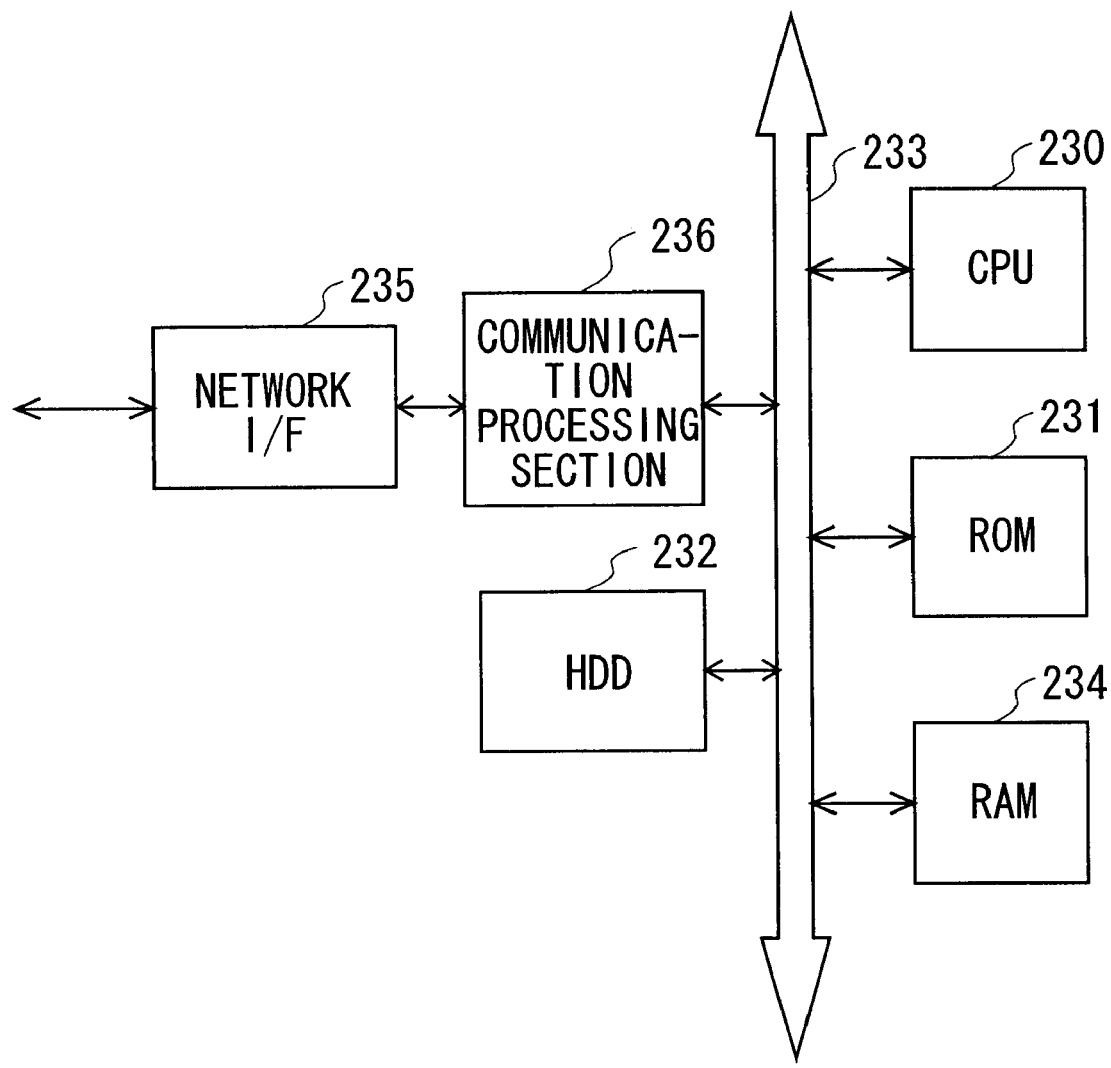
FIG. 27 is a block diagram illustrating the hardware circuit configuration of a backup device by using functional circuit blocks.

FIG. 27 illustrates the hardware circuit configuration of the backup device 202 by using hardware circuit blocks. A CPU 230 of the backup device 202 reads out from a ROM 231 or a hard disk drive 232 a basic program, an application program or the like and loads it onto a RAM 234 via the bus 233. The CPU 230 then takes overall control of the device and performs various processes in accordance with the program loaded on the RAM 234.

When the backup request device 201A1 to 201AN transmits via the network 32 a piece of music data for backup, the CPU 230 receives it through a network interface 235 and a communication processing section 236, and transmits it to the hard disk drive 232, which then stores it in the hard disk. In this manner, the CPU 230 backs up a piece of music data from the backup request device 201A1 to 201AN.

When the backup request device 201A1 to 201AN requests restoration of data, the CPU 230 reads out from the hard disk drive 232 a piece of music data and transmits, through the communication processing section 236 and the network interface 235, it to the backup request device 201A1 to 201AN via the network 32. In this manner, the CPU 230 can restore a piece of music data, which it has backed up, in the backup request device 201A1 to 201AN.

By the way, basically, in the backup device 202, the CPU 230 performs various processes to control hardware circuits in accordance with various programs stored in the ROM 231 or the hard disk drive 232. If the programs stored in the ROM 231 or the hard disk drive 232 are selected in accordance with the functions of the backup device 33 (FIG. 8) so that the backup device 202 can perform the procedure RT2 of first backup process and the procedure RT4 of first restore process (i.e. if a backup program for the procedures RT2 and RT4 is selected), the CPU 230 may work in the same way as the control section 60, the judgment section 64, the difference data generation section 66, the data generation section 67, the comparison section 68 and the data processing section 69; the hard disk drive 232 may work in the same way as the backup data storage section 61 and the backup information storage section 62; the communication processing section 236 and the network interface 235 may work in the same way as the transmission section 65 and the receiving section 63.

If the programs stored in the ROM 231 or the hard disk drive 232 are selected in accordance with the functions of the backup device 80 (FIG. 12) so that the backup device 202 can perform the procedure RT5 of second backup process (i.e. if a backup program for the procedure RT5 is selected), the CPU 230 may work in the same way as the control section 81, the judgment section 64, the difference data generation section 66, the data generation section 67, the comparison section 83 and the data processing section 69; the hard disk drive 232 may work in the same way as the backup data storage section 61, the backup information storage section 62 and the comparison table storage section 82; the communication processing section 236 and the network interface 235 may work in the same way as the transmission section 65 and the receiving section 63.

If the programs stored in the ROM 231 or the hard disk drive 232 are selected in accordance with the functions of the backup device 102 (FIG. 18) so that the backup device 202 can perform the procedure RT7 of third backup process and the procedure RT8 of second restore process (i.e. if a backup program for the procedures RT7 and RT8 is selected), the CPU 230 may work in the same way as the control section 120, the judgment section 123, the difference data generation section 66, the data generation section 67, the comparison section 124 and the data processing section 69; the hard disk drive 232 may work in the same way as the backup data storage section 61, the backup information storage section 122 and the correlation table storage section 121; the communication processing section 236 and the network interface 235 may work in the same way as the transmission section 65 and the receiving section 63.

If the programs stored in the ROM 231 or the hard disk drive 232 are selected in accordance with the functions of the backup device 150 (FIG. 23) so that the backup device 202 can perform the procedure RT9 of fourth backup process (i.e. if a backup program for the procedure RT9 is selected), the CPU 230 may work in the same way as the control section 151, the judgment section 123, the difference data generation section 66, the data generation section 67, the comparison section 124 and the data processing section 69; the hard disk drive 232 may work in the same way as the backup data storage section 61, the backup information storage section 122 and the correlation table storage section 152; the communication processing section 236 and the network interface 235 may work in the same way as the transmission section 65 and the receiving section 63.

Accordingly, if the programs stored in the ROM 231 or the hard disk drive 232 are selected in accordance with the functions of the backup devices 33, 80, 102 and 150, the backup device 202 can perform the procedures RT2, RT5, RT7, RT9, RT4 and RT8 and offer the same effects as the above-noted first and second embodiments.

By the way, the backup program may be previously stored in the ROM 231 or the hard disk drive 232 of the backup device 202. Alternatively, the backup program may be installed on the ROM 231 or the hard disk drive 232 from program storage media, such as package media (like a flexible disk, CD-ROM, DVD), semiconductor memories and magnetic disks, on which various programs are permanently or temporarily recorded. To store the backup program in the program storage media, various communication means may be used, such as Local Area Network, the Internet, wired or wireless communication means (such as digital satellite broadcast), and various communication interfaces (such as routers and modems).

(5) Other Embodiments

In the above-noted first to third embodiments, the pieces of music data are backed up. However, the present invention is not limited to this. Various kinds of content data can also be backed up, such as video and audio data of movies or TV programs, motion pictures, and still images (like photographs or computer graphics).

Moreover, in the above-noted first to third embodiments, a piece of data quality information indicating the quality of music data is a piece of data quality information DQ generated by combining a piece of data provider information DH1 and a piece of format information DF1 including a codec type CT, a sampling rate SR, a bit rate BR, a resolution BN, a channel CH, and a pre-emphasis PE (FIG. 6). However, the present invention is not limited to this. Alternatively, a piece of data quality information may include at least a codec type CT, a sampling rate SR, a bit rate BR, a resolution BN, a channel CH, a pre-emphasis PE or a piece of data provider information DH1. It may also include other kinds of information.

Furthermore, in the above-noted first to third embodiments, the backup system 1, 30, 100 or 200 (illustrated in FIGS. 1 to 27) is applied as a backup system. However, the present invention is not limited to this. The backup system can be configured in a different manner: It may include a backup device that can deliver the pieces of video-and-audio data as well as the pieces of music data.

Furthermore, in the above-noted first to third embodiments, the backup request devices (2A1 to 2AN, 31A1 to 31AN, 101A1 to 101AN, or 201A1 to 201AN), illustrated in FIGS. 1 to 27, are applied as a backup request device. However, the present invention is not limited to this. The backup request device may be configured in a different way: It may be an information processing device (such as a personal computer, mobile phone, PDA (Personal Digital Assistance), gaming machine, and vehicle navigation system), a recording/playback device (such as a hard disk recorder), or the like.

Furthermore, in the above-noted first to third embodiments, the backup device 3, 33, 80, 102, 150 and 202 (illustrated in FIGS. 1 to 27) is applied as a backup device. However, the present invention is not limited to this. The backup device may be configured in a different way: It may be an information processing device (such as a personal computer), a recording/playback device (such as a hard disk recorder), or the like.

The above method can be applied to a backup system in which backup request devices (which are the equivalent of audio devices) are connected to a backup device (which is the equivalent of a server) via the Internet.

It should be understood by those skilled in the art that various modifications, combinations, sub-combinations and alterations may occur depending on design requirements and other factors insofar as they are within the scope of the appended claims or the equivalents thereof.

What is claimed is:

1. A backup system in which a plurality of backup request devices is connected to a backup device, wherein:
   each backup request device includes:
      a content data storage section that stores a piece of content data; and
      a transmission section that regards the piece of content data as a piece of backup target data and transmits to the backup device, along with a piece of device identification information, a piece of backup information that includes a piece of data quality information indicating a data quality of the piece of backup target data and a piece of content identification information, and
   the backup device includes:
      a storage section that stores a piece of backup data having a same content as the piece of backup target data and whose data quality is higher than or equal to the piece of backup target data such that the piece of backup data is associated with the piece of content identification information;
      a receiving section that receives from the backup request device the piece of backup information and the piece of device identification information; and
      a control section that stores, when the receiving section receives the piece of backup information and the piece of device identification information, the piece of backup information in the storage section such that the piece of backup information is associated with the piece of device identification information.

2. A backup device connected to a plurality of backup request devices, the backup device comprising:
   a storage section that stores a piece of backup data having a same content as a piece of backup target data or piece of content data stored in a backup request device and whose data quality is higher than or equal to the piece of backup target data such that the piece of backup data is associated with a piece of content identification information;
   a receiving section that receives from the backup request device a piece of backup information and a piece of device identification information, the piece of backup information containing a piece of data quality information indicating a data quality of the piece of backup target data and the piece of content identification information; and
   a control section that stores, when the receiving section receives the piece of backup information and the piece of device identification information, the piece of backup information in the storage section such that the piece of backup information is associated with the piece of device identification information.

3. The backup device according to claim 2, further comprising
   a transmission section that transmits to the backup request device a piece of request information to request the piece of backup target data, wherein
   if the storage section does not keep the piece of backup data corresponding to the piece of content identification information included in the piece of backup information received by the receiving section, the control section controls the transmission section to transmit the piece of request information and then stores the piece of backup target data received by the receiving section in the storage section as the piece of backup data.

4. The backup device according to claim 2, further comprising:
   a transmission section that transmits to the backup request device a piece of request information to request the piece of backup target data; and
   a judgment section that checks if the data quality indicated by the piece of backup information received by the receiving section is higher than the data quality of the piece of backup data, wherein
   based on the result of checking by the judgment section, the control section controls the transmission section to transmit the piece of request information and then stores the piece of the backup target data received by the receiving section in the storage section as the piece of backup data.

5. The backup device according to claim 4, wherein
   if the judgment section determines that the data quality of the piece of backup target data is higher than the data quality of the piece of backup data, the control section controls the transmission section to transmit the piece of request information and then stores the piece of backup target data received by the receiving section in the storage section as the new piece of backup data.

6. The backup device according to claim 2, further comprising:
   a transmission section that transmits to the backup request device a piece of request information to request the piece of backup target data; and
   a difference data generation section that generates, if the piece of backup target data received by the receiving section is a piece of music data clipped from radio program data, a piece of difference data indicating a difference between the piece of backup target data and the corresponding piece of backup data, wherein
   if the piece of data quality information included in the received piece of backup information indicates the fact that the source of the piece of backup target data is a radio station, the control section controls the transmission section to transmit the piece of request information, controls the difference data generation section to generate the piece of difference data from the piece of backup target data received by the receiving section, and then stores the piece of difference data such that the piece of difference data is associated with the piece of backup information.

7. The backup device according to claim 2, wherein
   the piece of data quality information indicates at least a codec type of the piece of backup target data, a sampling rate of the piece of backup target data, a bit rate of the piece of backup target data, or a provider of the piece of backup target data.

8. The backup device according to claim 2, wherein:
   the storage section also stores a correlation table in which a hash value calculated from each piece of backup target data is associated with a corresponding piece of data quality information and a corresponding piece of content identification information; and
   the control section controls the receiving section to receive the hash value as the piece of backup information.

9. The backup device according to claim 2, further comprising:

a comparison section that compares, when the receiving section receives from the backup request device the piece of device identification information and a piece of transmission request information that requests the transmission of a piece of backup target data, all the pieces of backup target data with the corresponding pieces of backup data in data quality, based on all the pieces of backup information corresponding to the piece of device identification information stored in the storage section; and a data generation section that generates, based on the result of comparison by the comparison section, all the pieces of backup target data from all the pieces of backup data, wherein when the receiving section receives the piece of transmission request information and the piece of device identification information, the control section controls the transmission section to transmit all the pieces of backup target data generated by the data generation section.

10. The backup device according to claim 9, wherein:

when the data quality of the piece of backup target data is lower than the data quality of the corresponding piece of backup data, the data generation section processes the piece of backup data to generate the piece of backup target data; and when the data quality of the piece of backup target data is the same as the data quality of the corresponding piece of backup data, the data generation section regards the piece of backup data as the piece of backup target data.

11. The backup device according to claim 6, further comprising a radio data generation section that generates, when the receiving section receives from the backup request device the piece of device identification information and a piece of transmission request information that requests the transmission of a piece of backup target data and when the requested piece of backup target data is the piece of music data clipped from the radio program data, the piece of backup target data by using the piece of difference data associated with the piece of backup information and the corresponding piece of backup data, wherein the control section controls the transmission section to transmit the piece of backup target data generated by the radio data generation section.

12. A backup request device connected to a backup device, the backup request device comprising:

a storage section that stores a piece of content data; and a transmission section that regards the piece of content data stored in the storage section as a piece of backup target data and transmits to the backup device, along with a piece of device identification information, a piece of backup information that includes a piece of data quality information indicating a data quality of the piece of backup target data and a piece of content identification information, the backup device storing a piece of backup data having a same content as the piece of backup target data and whose data quality is higher than or equal to the piece of backup target data such that the piece of backup data is associated with the piece of content identification information.

13. The backup request device according to claim 12, further comprising:

a receiving section that receives a piece of request information that requests the piece of backup target data; and a control section that controls the transmission section to transmit, when the receiving section receives the piece of request information, the piece of backup target data stored in the storage section depending on the piece of request information.

14. The backup request device according to claim 13, further comprising a data clipping section that clips a piece of music data form radio program data containing the piece of music data as the piece of content data, wherein the control section regards the piece of music data as the piece of backup target data and controls the transmission section to transmit, along with the piece of device identification information, the piece of backup information that includes the piece of data quality information indicating that the source of the piece of backup target data is a radio station.

15. The backup request device according to claim 12, wherein the piece of data quality information indicates at least a codec type of the piece of backup target data, a sampling rate of the piece of backup target data, a bit rate of the piece of backup target data, or a provider of the piece of backup target data.

16. The backup request device according to claim 12, further comprising a calculation section that calculates a hash value from the piece of backup target data stored in the storage section, the hash value representing both the corresponding piece of data quality information and the corresponding piece of content identification information, wherein the transmission section transmits, along with the piece of device identification information, the hash value calculated by the calculation section as the piece of backup information.

17. The backup request device according to claim 12, further comprising:

a receiving section that receives the piece of backup target data from the backup device; and a control section that controls the transmission section to transmit, along with the piece of device identification information, a piece of transmission request information that requests the transmission of the piece of backup target data, and then stores, when the receiving section receives the piece of backup target data, the piece of backup target data in the storage section.

18. A backup method comprising:

storing in a storage section a piece of backup data, which is the same content as a piece of backup target data or piece of content data that a backup request device requests to be backed up and whose data quality is higher than or equal to the piece of backup target data, such that the piece of backup data is associated with a piece of content identification information;

receiving from the backup request device a piece of backup information and a piece of device identification information, the piece of backup information containing a piece of data quality information indicating a data quality of the piece of backup target data and the piece of content identification information; and storing the piece of backup information in the storage section such that the piece of backup information is associated with the piece of device identification information.

19. A backup request method comprising:

storing a piece of content data in a storage section; and regarding the piece of content data as a piece of backup target data and transmitting to a backup device, along with a piece of device identification information, a piece of backup information that includes a piece of data quality information indicating a data quality of the piece of backup target data and a piece of content identification information, the backup device storing a piece of backup data having a same content as the piece of backup target data and whose data quality is higher than or equal to the piece of backup target data such that the piece of backup data is associated with the piece of content identification information.

20. A computer readable storage medium storing computer readable instructions thereon which, when executed by a computer, cause the computer to perform a method comprising:

storing in a storage section a piece of backup data, which is the same content as a piece of backup target data or piece of content data that a backup request device requests to be backed up and whose data quality is higher than or equal to the piece of backup target data, such that the piece of backup data is associated with a piece of content identification information;

receiving from the backup request device a piece of backup information and a piece of device identification information, the piece of backup information containing a piece of data quality information indicating a data quality of the piece of backup target data and the piece of content identification information; and storing the piece of backup information in the storage section such that the piece of backup information is associated with the piece of device identification information.

21. A computer readable storage medium storing computer readable instructions thereon which, when executed by a computer, cause the computer to perform a method comprising:

storing a piece of content data in a storage section; and regarding the piece of content data as a piece of backup target data and transmitting to a backup device, along with a piece of device identification information, a piece of backup information that includes a piece of data quality information indicating a data quality of the piece of backup target data and a piece of content identification information, the backup device storing a piece of backup data having a same content as the piece of backup target data and whose data quality is higher than or equal to the piece of backup target data such that the piece of backup data is associated with the piece of content identification information.

* * * * *